(12) United States Patent
Terahara

(10) Patent No.: US 9,036,077 B2
(45) Date of Patent: May 19, 2015

(54) LENS BARREL

(75) Inventor: Daisuke Terahara, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 743 days.

(21) Appl. No.: 13/284,207

(22) Filed: Oct. 28, 2011

(65) Prior Publication Data

US 2012/0105712 A1 May 3, 2012

(30) Foreign Application Priority Data

Oct. 29, 2010 (JP) .................................. 2010-243810

(51) Int. Cl.
*G02B 7/02* (2006.01)
*G03B 5/00* (2006.01)

(52) U.S. Cl.
CPC ........ *G02B 7/021* (2013.01); *G03B 5/00* (2013.01); *G03B 2205/0046* (2013.01); *G03B 2205/0053* (2013.01); *G03B 2205/0092* (2013.01)

(58) Field of Classification Search
CPC .................................. G02B 7/021; G03B 5/00
USPC .................. 348/335, 340, 360; 359/811, 813
See application file for complete search history.

(56) References Cited

U.S. PATENT DOCUMENTS

| | | | |
|---|---|---|---|
| 5,526,192 A | 6/1996 | Imura et al. | |
| 7,791,821 B2 | 9/2010 | Katsumata et al. | |
| 7,808,731 B2 | 10/2010 | Ishimoda et al. | |
| 7,864,446 B2 | 1/2011 | Terahara | |
| 2004/0174622 A1* | 9/2004 | Kang et al. ................. | 359/824 |
| 2010/0178044 A1 | 7/2010 | Ohno | |
| 2010/0259837 A1* | 10/2010 | Terahara ..................... | 359/691 |
| 2011/0188841 A1 | 8/2011 | Ohno | |
| 2011/0194194 A1 | 8/2011 | Terahara | |
| 2012/0063014 A1 | 3/2012 | Terahara et al. | |

FOREIGN PATENT DOCUMENTS

| | | |
|---|---|---|
| JP | 02-089012 A | 3/1990 |
| JP | 6-289453 | 10/1994 |
| JP | 7-151949 | 6/1995 |
| JP | 7-281066 | 10/1995 |
| JP | 2000-338554 | 12/2000 |

(Continued)

OTHER PUBLICATIONS

U.S. Appl. No. 13/230,013, filed Sep. 12, 2011, Terahara, et al.

(Continued)

*Primary Examiner* — Paul Berardesca
(74) *Attorney, Agent, or Firm* — Oblon, McClelland, Maier & Neustadt, L.L.P.

(57) ABSTRACT

A lens barrel includes a lens group having at least two lenses, a lens holding frame configured to hold the lens group, a holding cylinder configured to hold the lens holding frame movably in an optical axis direction of the lens group, a forward-backward moving mechanism configured to move the lens holding frame forward and backward with respect to the holding cylinder, first to third guide shafts fixed on the holding cylinder so as to surround the lens holding frame and each extend in the optical axis direction, and a biasing mechanism configured to be held by the lens holding frame between the first guide shaft and the lens holding frame and bias the lens holding frame in a direction so as to separate the lens holding frame from the first guide shaft toward the second and third guide shafts on a plane orthogonal to the optical axis direction.

15 Claims, 36 Drawing Sheets

(56) References Cited

FOREIGN PATENT DOCUMENTS

| JP | 2004-264809 A | 9/2004 |
|----|---------------|--------|
| JP | 2007-232889 A | 9/2007 |
| JP | 2008-77047 | 4/2008 |
| JP | 2008-96566 | 4/2008 |
| JP | 2008-233575 | 10/2008 |
| JP | 2008-249883 | 10/2008 |
| JP | 2009-198876 | 9/2009 |
| JP | 2010-72251 | 4/2010 |
| JP | 2010-217511 | 9/2010 |
| JP | 2010-262260 | 11/2010 |
| JP | 2011-53654 | 3/2011 |
| JP | 2011-164156 | 8/2011 |
| JP | 2012-58631 | 3/2012 |

OTHER PUBLICATIONS

Office Action issued Jun. 24, 2014 in Japanese Patent Application No. 2010-243810.

* cited by examiner

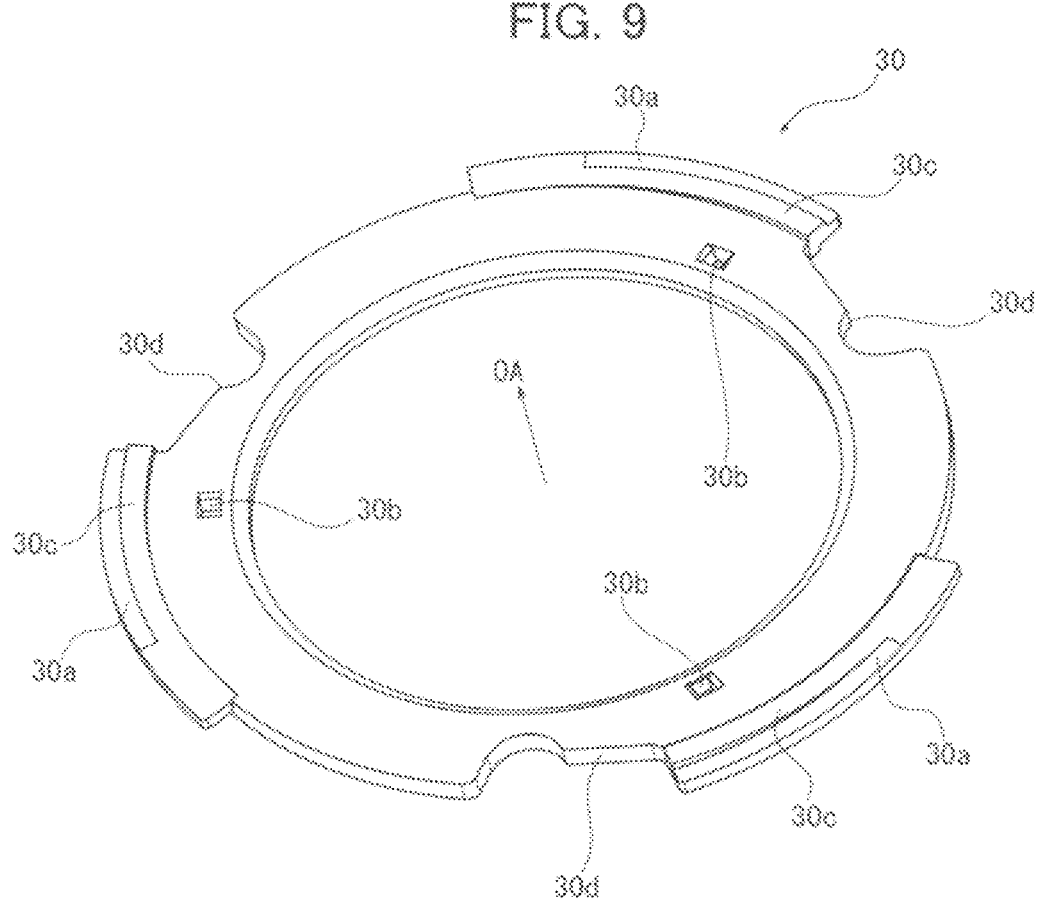

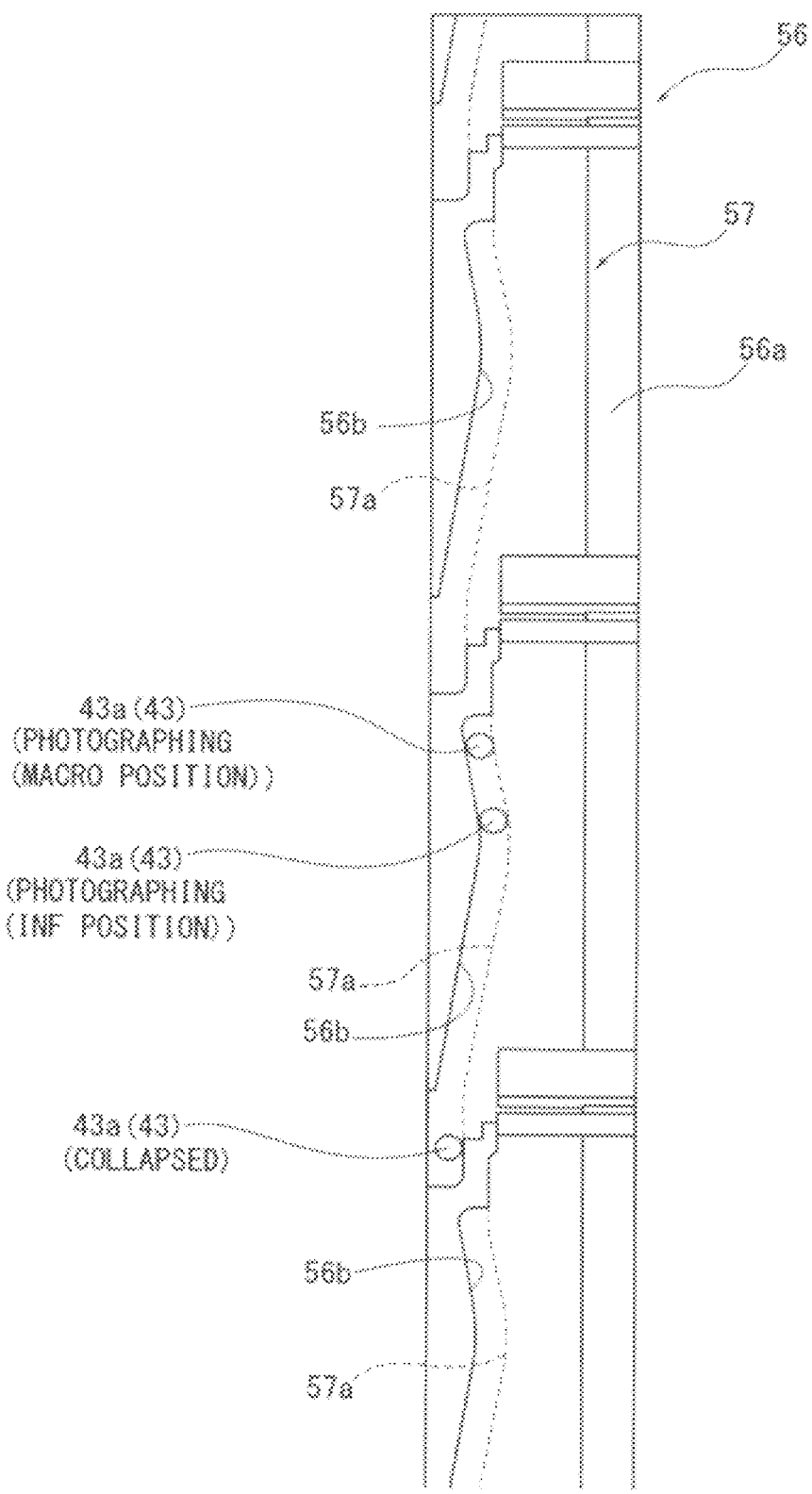

LENS BARREL

CROSS REFERENCE TO RELATED APPLICATIONS

The present application is based on and claims priority from Japanese Application Number 2010-243810, filed on Oct. 29, 2010, the disclosure of which is hereby incorporated by reference herein in its entirety.

BACKGROUND OF THE INVENTION

1. Field of the Invention

The present invention relates to a lens barrel holding a plurality of lenses, more particularly, relates to the lens barrel holding the lenses movably in forward and backward directions in a photographic optical axis direction.

2. Description of the Related Art

In recent years, in a photographing apparatus such as a digital camera or the like, a small size and high image quality of a photographed image have been required. In order to satisfy the high image quality requirement, it has been proposed to increase a number of lenses used in an optical system. In order to satisfy the small size requirement, a lens barrel having configurations in that each lens is collapsed in a camera body in a non-photographing mode, and extends from the camera body in a photographing mode has been proposed. In order to satisfy the high image quality requirement, a position of each lens with respect to the photographic optical axis viewed in a direction orthogonal to the photographic optical axis is preferably positioned in a predetermined position regardless of the forward and backward positions. Therefore, a frame moving mechanism in which accuracy for supporting lenses can be easily ensured in the lens barrel is proposed (see Japanese Patent Application Publication Number H07-151949).

In the lens barrel (the frame moving mechanism), two projection portions are provided on an inner surface of a fixed frame holding a lens holding frame movably in a photographic optical axis direction and a plate spring is provided on a circumferential wall portion of the fixed frame so as to face the two projection portion across the photographic optical axis. The lens holding frame in the fixed frame is pressed by the plate spring toward the two projections. Therefore, in the lens barrel (the frame moving mechanism), the position of the lens holding frame holding each lens in the fixed frame is positioned in a position so as to come into contact with the two projections regardless of the forward and backward direction.

However, in the above described conventional lens barrel (the frame moving mechanism), although the lens holding frame is movable in forward and backward directions in the photographic optical axis direction in the fixed frame, the lens holding frame is pressed by the plate spring fixedly provided on the fixed frame is pressed and therefore a biased position with respect to the lens holding frame by the plate spring varies in accordance with the position of the lens holding frame in the photographic optical axis direction. Therefore, there is a problem in that the biasing force applied to the lens holding frame and an applied state of the biasing force is not necessarily maintained constant.

SUMMARY OF THE INVENTION

An object of the present invention is to provide a lens barrel in which a position of each lens with respect to the photographic optical axis as viewed in a direction orthogonal to the photographic optical axis is positioned in a predetermined position regardless of the forward and backward positions.

To achieve the above object, a lens barrel according to an embodiment of the present invention includes a lens group having at least two lenses, a lens holding frame configured to hold the lens group, a holding cylinder configured to hold the lens holding frame movably in an optical axis direction of the lens group, a forward-backward moving mechanism configured to move the lens holding frame forward and backward with respect to the holding cylinder, first to third guide shafts fixedly provided in the holding cylinder so as to surround the lens holding frame and each extend in the optical axis direction, and a biasing mechanism held by the lens holding frame between the first guide shaft and the lens holding frame and configured to bias the lens holding frame in a direction so as to separate the lens holding frame from the first guide shaft toward the second and third guide shafts on a plane orthogonal to the optical axis direction.

BRIEF DESCRIPTION OF THE DRAWINGS

FIG. 9 is a perspective view schematically showing an adjustment cam member as viewed from the object side.

FIG. 30 is a development view schematically showing a cam groove formed on the cylindrical body formed by the first rotary cam cylinder and the second rotary cam cylinder.

DETAILED DESCRIPTION OF THE PREFERRED EMBODIMENTS

Figure 1:
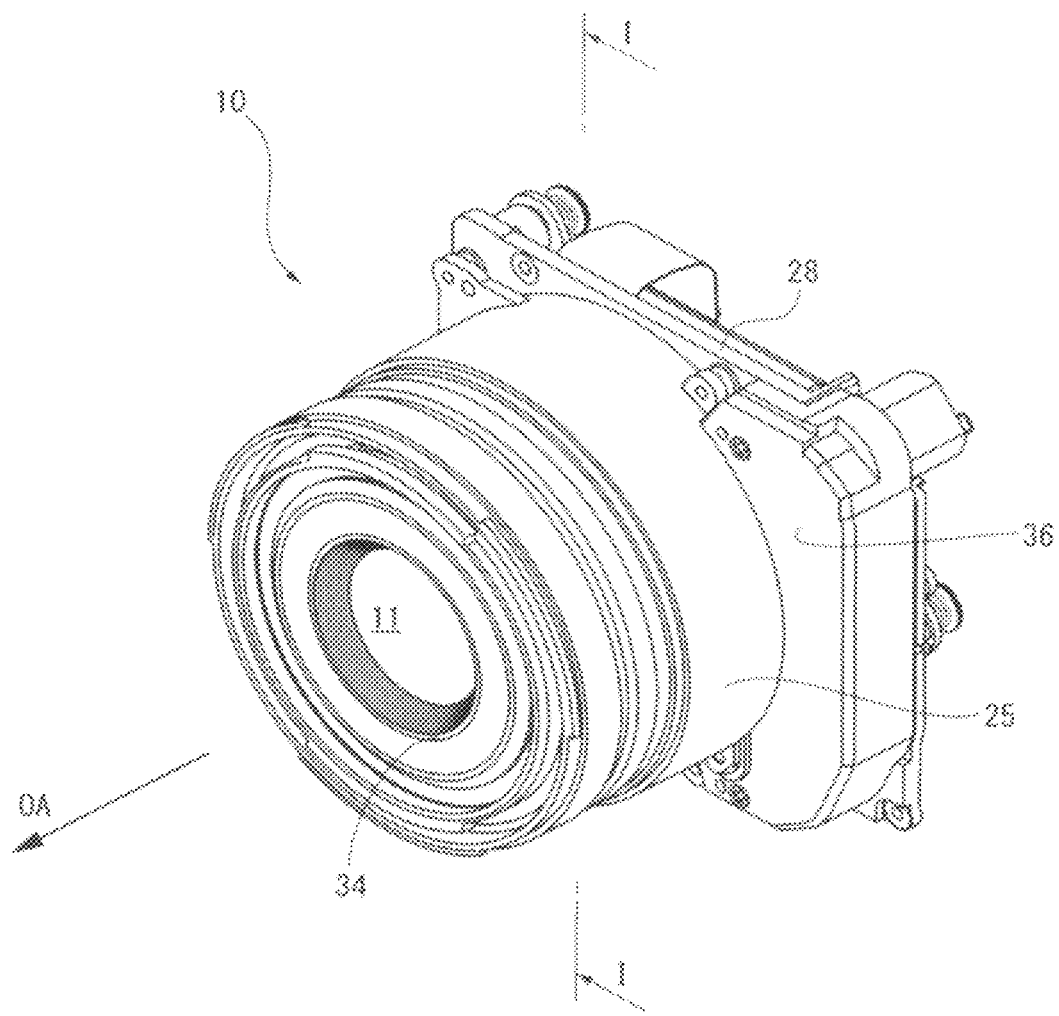
FIG. 1 is a perspective view schematically showing a lens barrel according to an embodiment of the present invention, viewed from an object side.
Figure 2A:
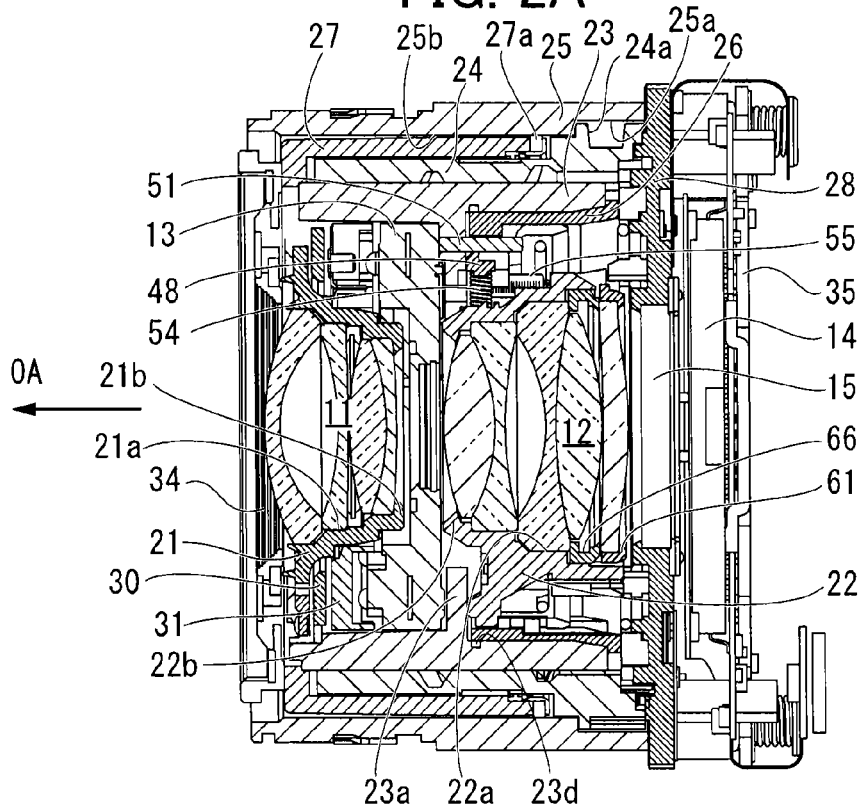
FIG. 2A is a section view along an I-I line of FIG. 1, showing the lens barrel in a collapsed state.
Figure 2B:
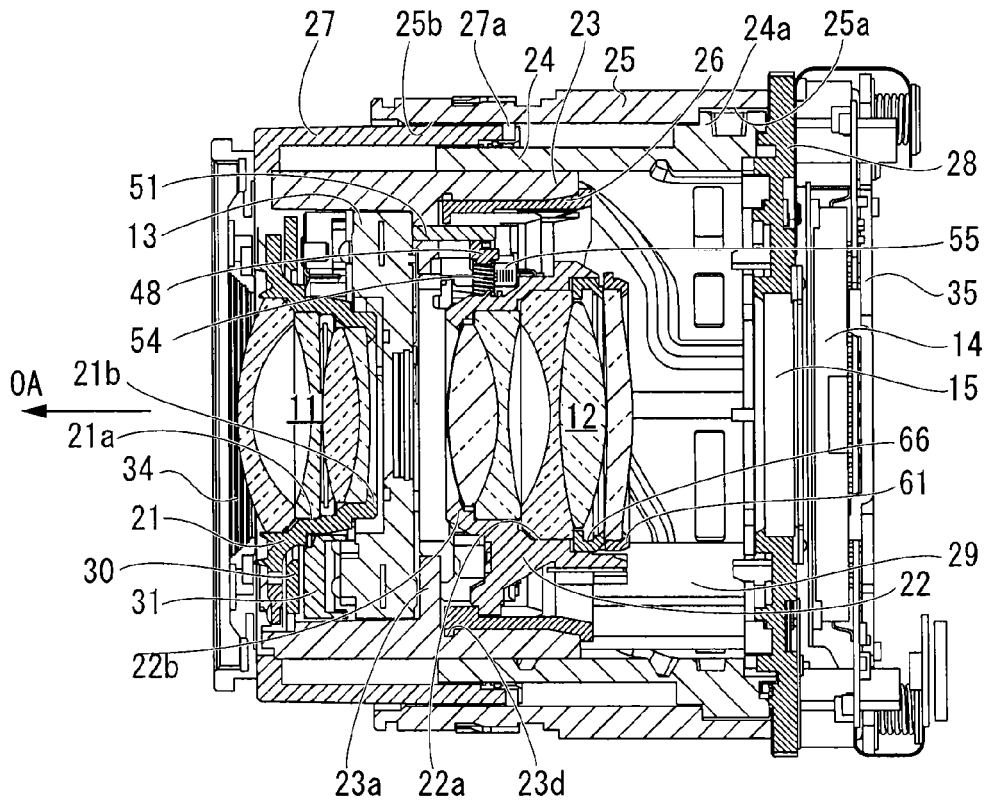
FIG. 2B is a section view along the I-I line of FIG. 1, showing the lens barrel in a photographing state.

Hereinafter, a lens barrel according to an embodiment of the present invention will be described with reference to the accompanying drawings.

[Embodiment]

A schematic configuration of a lens barrel 10 according to an embodiment of the present invention will be explained with reference to FIGS. 1 to 42.

The lens barrel 10 includes, as shown in FIG. 2, a lens group 12 having at least two lenses, a lens holding frame 22 configured to hold the lens group 12, a holding cylinder 23 configured to hold the lens holding frame 22 movably in an optical axis direction of the lens group 12, a forward-backward moving mechanism configured to move the lens holding frame 22 in forward and backward directions with respect to the holding cylinder 23, first to third guide shafts 51, 52, 53 fixedly provided in the holding cylinder 23 so as to surround the lens holding frame 22 and each extend in the optical axis direction, and a biasing mechanism (48, 54) held by the lens holding frame 22 between the first guide shaft 51 and the lens holding frame 22 and configured to bias the lens holding frame 22 in a direction so as to separate the lens holding frame 22 from the first guide shaft toward the second and third guide shafts on a plane orthogonal to the optical axis direction. Each guide shaft 51, 52, 53 may be fixed to the holding cylinder 23. Each guide shaft is configured to guide the lens holding frame 22, and the forward-backward moving mechanism (24, 25, 26, 27, 28, 29) may be configured to apply a moving force in the optical axis direction to the lens holding frame 22 guided by each guide shaft 51, 52, 53.

An optical device including the lens barrel 10 includes a first lens group 11, a second lens group 12 as the lens group, a shutter/aperture unit 13, a solid-state image pickup device 14, a cover glass 15, a first lens holding frame 21, a second holding frame 22 as the holding frame, a linearly-moving cylinder 23 as the holding cylinder, a rotary cylinder 24, a fixed cylinder 25, a rotary cam unit 26, a connection frame 27, a base member 28, a liner 29, an adjustment came member 30, a spring receiving member 31, a first biasing member 32 (see FIGS. 7 and 8), a second biasing member 33 (see FIG. 4), a stepped frame 34, a base 35, and a driving device 36 (see FIG. 1). The forward-backward moving mechanism includes the rotary cylinder 24, the fixed cylinder 25, the rotary cam unit 26, the connection frame 27, the base member 28, and the liner 29.

The optical device which is a photographing optical system has the first lens group 11 and the second lens group 12, which are disposed in order from the object side (subject side), and the shutter/aperture unit 13 disposed therebetween. The solid-state image pickup device 14 using a CCD (charge-coupled device) or the like and the cover glass 15 covering a light-receiving surface of the solid-state image pickup device 14 are disposed on an image side of the second lens group 12. The solid-state image pickup device 14 is mounted on the base 35 and the cover glass 15 is provided on the base member 28. The base 35 is fixed on the base member 28 and not-illustrated electronic components are mounted on the base member 28 to form an electronic circuit part.

The first lens group 11 has at least one lens. The first lens group 11 is fixedly held on the linearly-moving cylinder 23 through the connection frame 27 and the first lens holding frame 21 which integrally hold the at least one lens.

Figure 26:
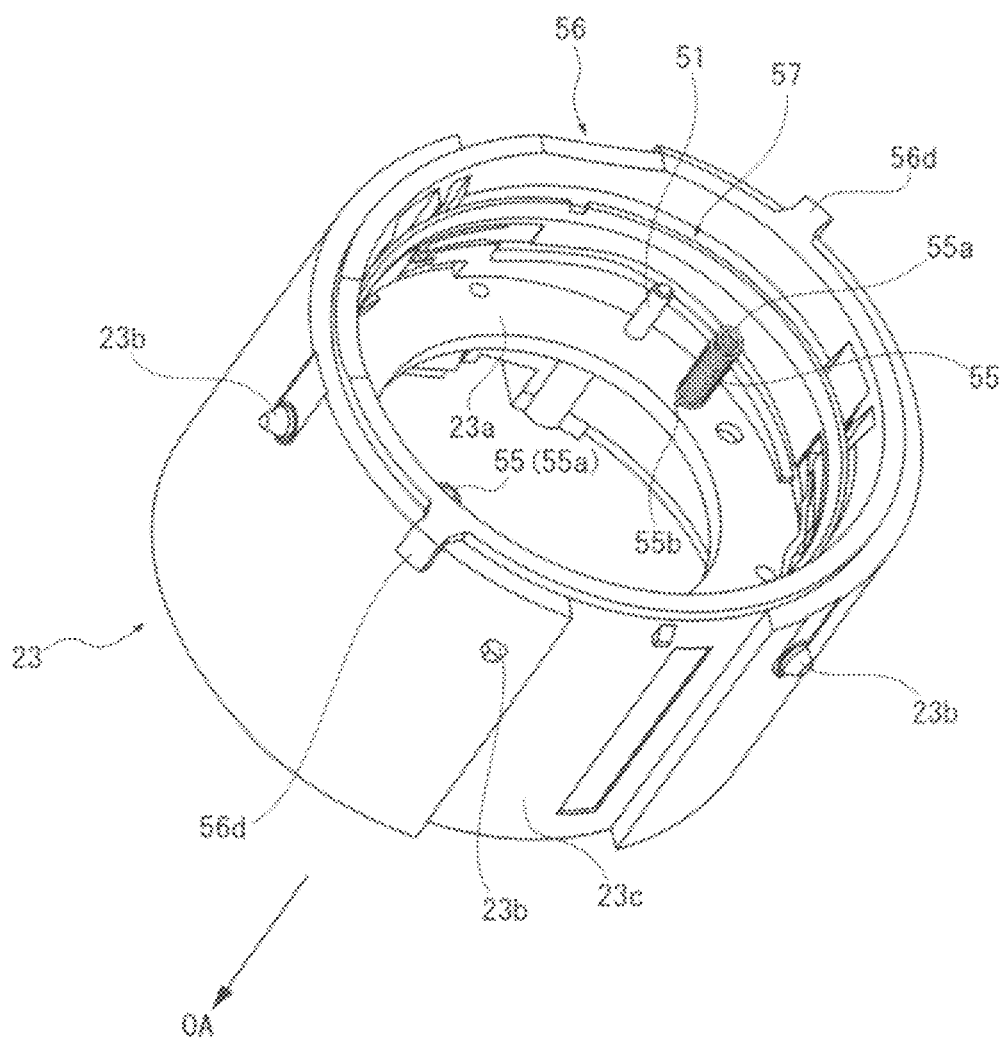
FIG. 26 is a perspective view schematically showing a state where a cylindrical body in which a second rotary cam cylinder is fitted into a first rotary cam cylinder in the linearly-moving cylinder.
Figure 27:
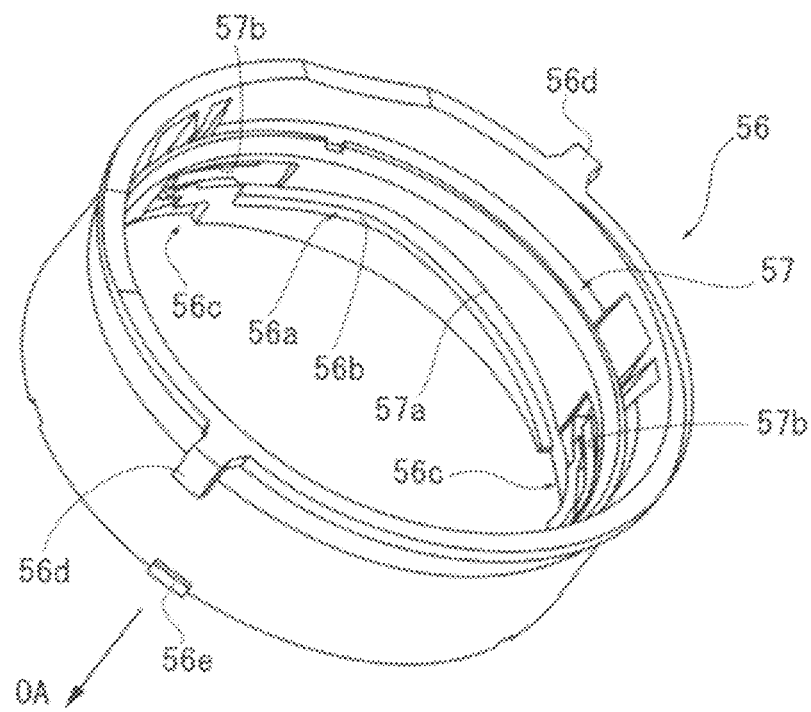
FIG. 27 is a perspective view schematically showing the cylindrical body where the second rotary cam cylinder is fitted into the first cam cylinder.
Figure 28:
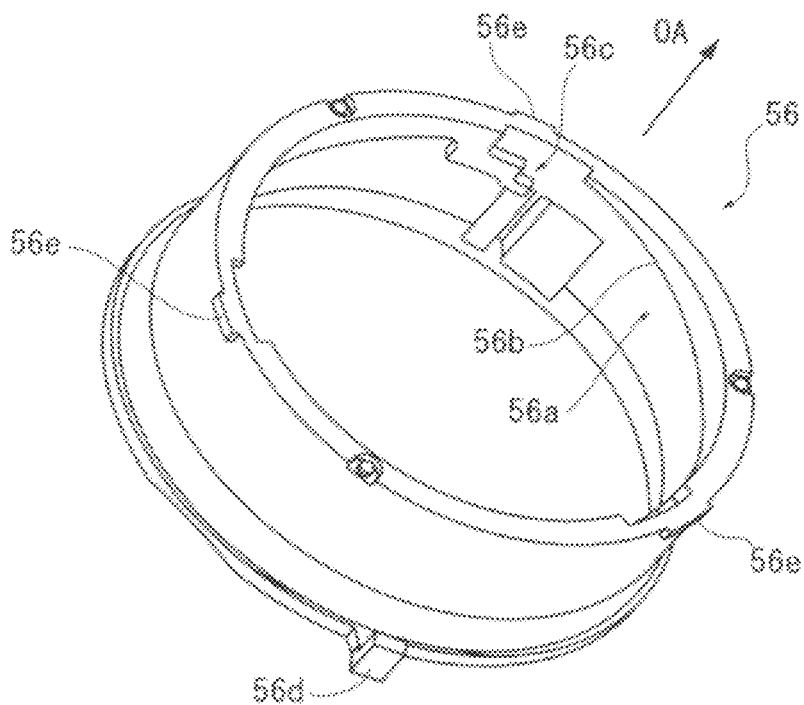
FIG. 28 is a perspective view schematically showing the first rotary cam cylinder.

The second lens group 12 has at least one lens. The second lens group 12 is held by the second lens holding frame 22 in cooperation with an interval ring 66 and an adjustment lens holding frame 61. In this embodiment, each lens of the second lens group 12 except for the most image-side (right side in FIG. 2) lens is fixedly held by the second lens holding frame 22 and the most-image side lens is held by the adjustment lens holding frame 61 so as to adjust the position of the most-image side lens relative to the other lenses of the second lens group 12. The second lens group 12 is held by the linearly-moving cylinder 23 through the second lens holding frame 22 via the rotary cam unit 26. The rotary cam unit 26 is formed by a first rotary cam cylinder 56 and a second rotary cam cylinder 57, as shown in FIGS. 26 to 28.

The shutter/aperture unit 13 has a shutter and an aperture stop. The shutter/aperture unit 13 has a circular annular shape as a whole having a dimension to be contained in the linearly-moving cylinder 23 (see FIG. 13). Screw inserting holes 13a (see FIG. 13) to fix the spring receiving member 31 to the linearly-moving cylinder 23, as described below, are provided on the shutter/aperture unit 13. The first and second lens groups 11, 12 form the photographic optical system having a zoom lens with a variable focal length or a lens with a fixed focal length. The above-described electronic circuit part (solid-state image pickup device 14) is disposed at an imaging position of the photographic optical system. Here, an optical axis in the photographic optical system, that is, a rotational symmetrical axis which is a center axis position of the first lens group 11 and the second lens group 12 is a photographic optical axis OA that is, of the lens barrel 10.

The fixed cylinder 25 has a cylindrical shape as a whole (see FIG. 1) and is fixed on the base member 28. A guide groove 25a and a linear groove 25b are provided on an inner surface of the fixed cylinder 25. The guide groove 25a is provided along a plane orthogonal to the photographic optical axis OA and has an annular shape. The linear groove 25b is provided along the photographic optical axis OA. The rotary cylinder 24 is fitted into an inner surface of the fixed cylinder 25.

The rotary cylinder 24 has a cylindrical shape as a whole. A key portion 24a is provided on an outer surface of the rotary cylinder 24. The key portion 24a is formed so as to be projected from a base end portion in a radial direction from a rotational center along a plane orthogonal to the photographic optical axis OA and is engaged with the guide groove 25a of the fixed cylinder 25. According to the above-described configurations, a movement of the rotary cylinder 24 with respect to the fixed cylinder 25 in a direction of the photographic optical axis OA (photographic path), that is, the OA direction hereinafter is suppressed and a rotational movement of the rotary cylinder 24 with respect to the fixed cylinder 25 about the photographic optical axis OA is achieved. Therefore, the rotary cylinder 24 is capable of rotating about the photographic optical axis OA with respect to the base member 28 while fixing the position in the OA direction (photographic path). The rotary cylinder 24 is rotationally driven with respect to the fixed cylinder by transmitting a driving force from the driving device 36 (see FIG. 1) fixedly provided on the base 35, that is, the fixed cylinder 25.

Figure 3:
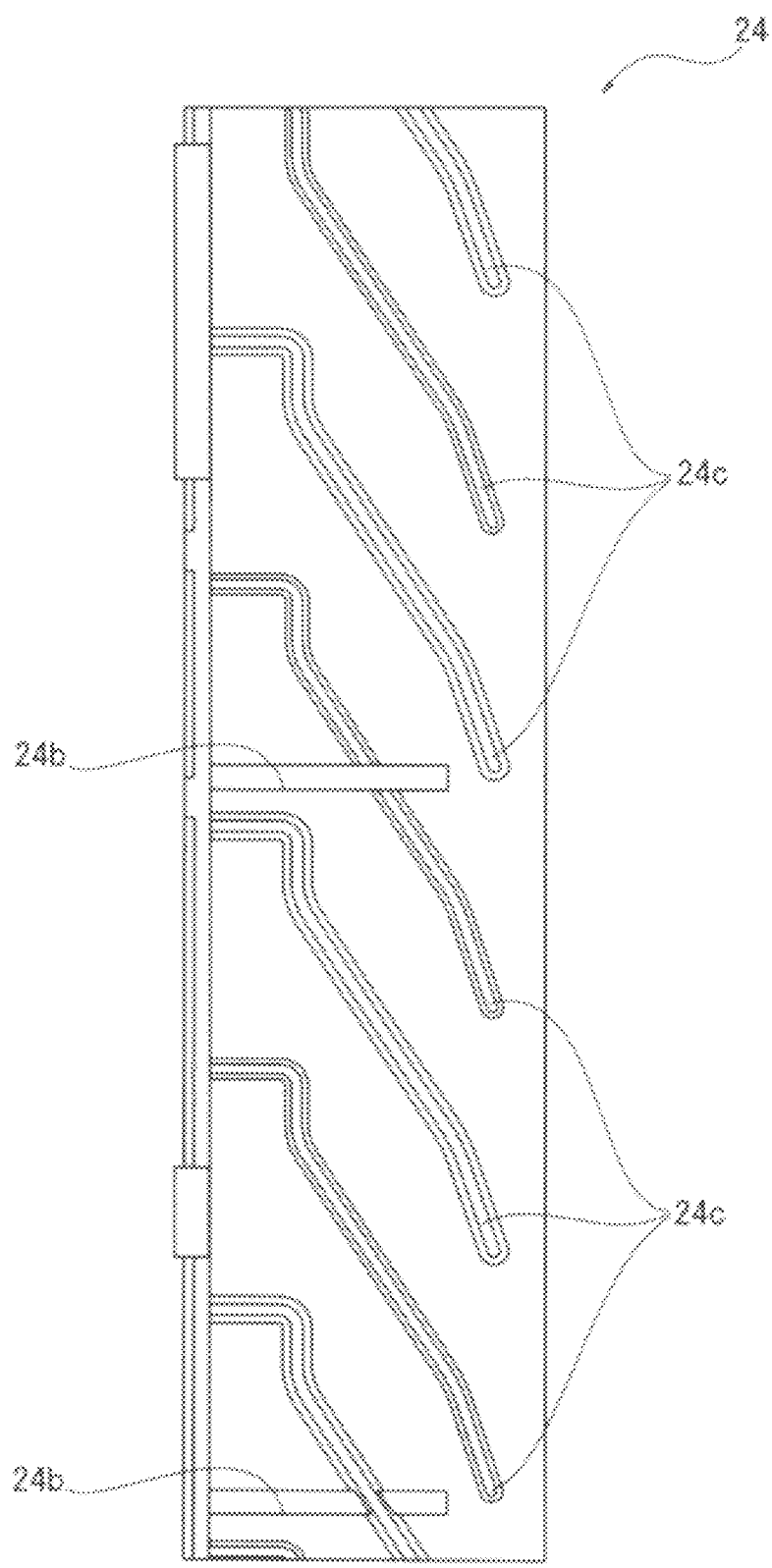
FIG. 3 is a development view schematically showing shapes of cam grooves formed on a rotary cylinder.

As shown in FIG. 3, linear grooves 24b each extending along the axis direction and cam grooves 24c are formed on an inner surface of the rotary cylinder 24. The later-described first key projection 56d of the rotary cam unit 26 (see FIGS. 26 and 27) is engaged with the linear groove 24b. Therefore, the rotary cam unit 26 is capable of being rotationally driven with respect to the fixed cylinder 25 (base member 28) in accordance with the rotary drive of the rotary cylinder 24 with respect to the fixed cylinder 25 (base member 28).

As shown in FIG. 2, a base end side of the connection frame 27 is inserted between the rotary cylinder 24 and the fixed cylinder 25. A projected portion 27a is provided on an outer surface of the base end side of the connection frame 27. The projected portion 27a is engaged with the linear groove 25b of the fixed cylinder 25. Therefore, the connection frame 27 is capable of moving (linearly moving) in the OA direction (photographic path direction) with respect to the fixed cylinder 25 while being prevented from rotating about the photographic optical axis OA. An object-side end portion of the connection frame 27 is fixed on an end portion of the linearly-moving cylinder 23. The linearly-moving cylinder 23 is fitted into an inner periphery of the rotary cylinder 24.

Figure 6:
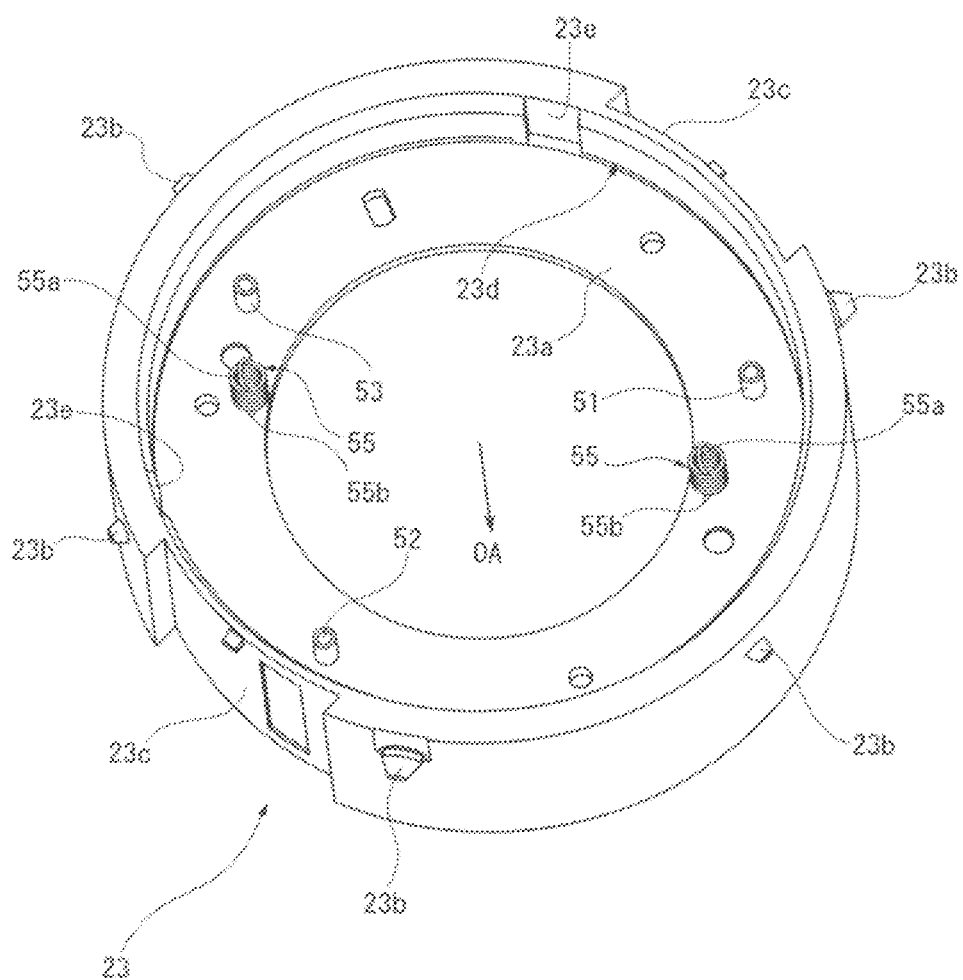
FIG. 6 is a perspective view schematically showing the linearly-moving cylinder, as viewed from an image side.

The linearly-moving cylinder 23 has a cylindrical shape as a whole (see FIG. 4) and a flange portion 23a having a smaller inner diameter is provided on the linearly-moving cylinder 23 at an intermediate position viewed in an axial direction equal to the OA direction (see FIG. 6). In the linearly-moving cylinder 23, the first lens group 11 (the first lens holding frame 21) and the shutter/aperture unit 13 are contained and held in a space at a front (object) side of the flange portion 23a. The second lens holding frame 22 holding the second lens group 12 and the rotary cam unit 26 are contained and held in a space at a back (image) side of the flange portion 23a. The containing and holding state will be explained in detail below.

Figure 4:
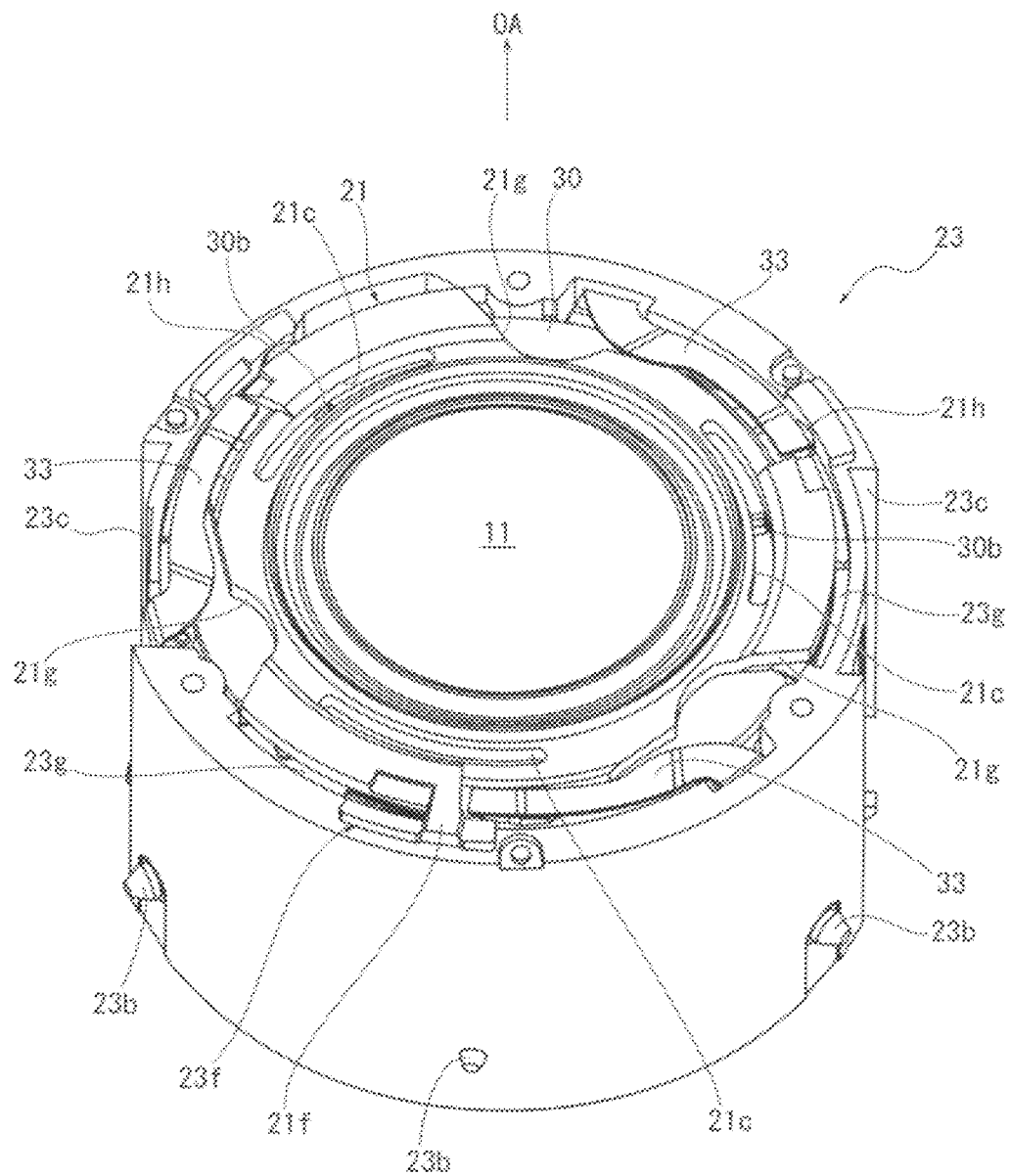
FIG. 4 is a perspective view schematically showing a state where a first lens holding frame and a second lens holding frame are installed in a linearly-moving cylinder.
Figure 5:
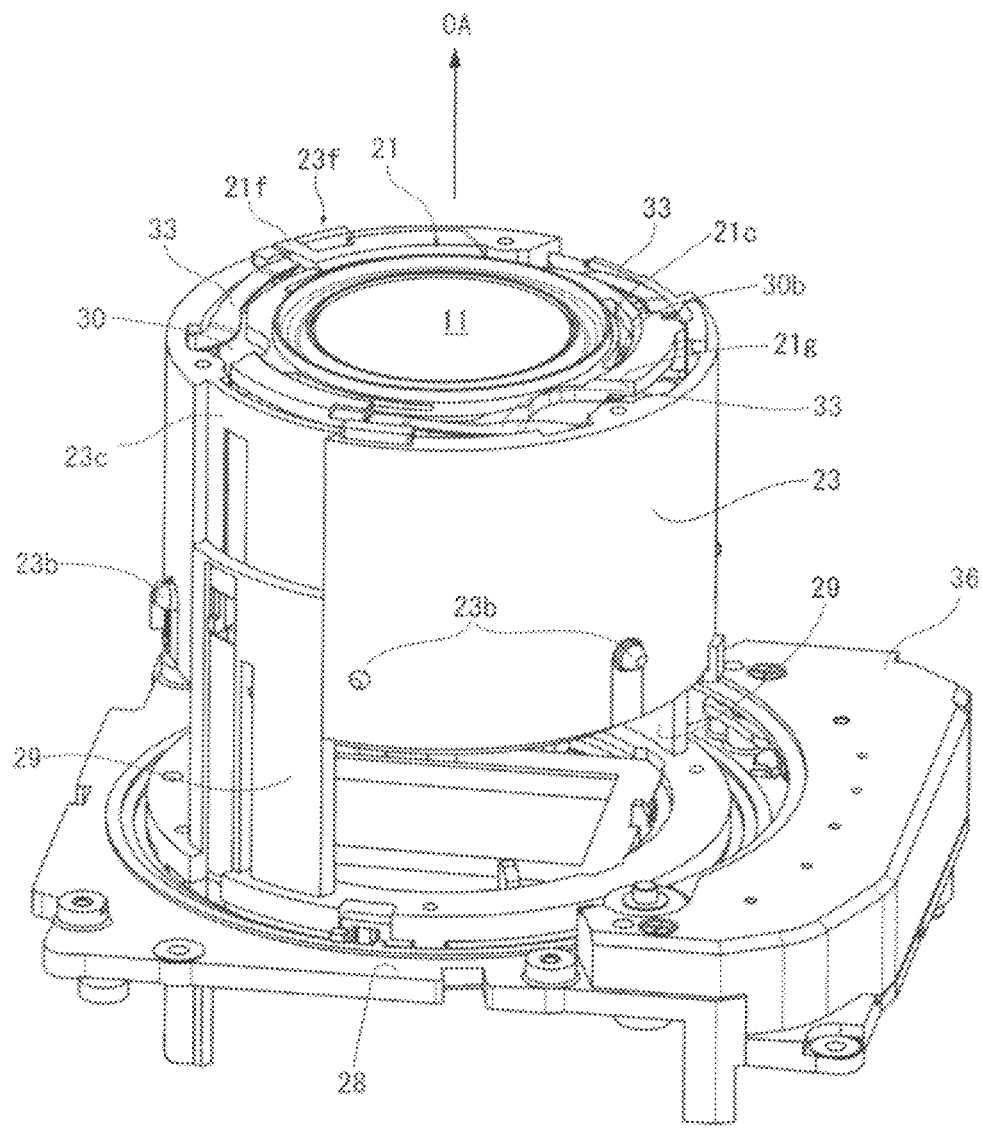
FIG. 5 is a perspective view schematically showing a state where the linearly-moving cylinder 23 is provided on a base member 28 so as to be capable of linearly moving.

As shown in FIG. 4, cam followers 23b and linear grooves 23c are provided on the outer peripheral surface of the linearly-moving cylinder 23. The cam follower 23b is projected from the outer peripheral surface and engaged with the cam groove 24c of the rotary cylinder 24 (see FIG. 3). In this embodiment, the cam followers 23b are provided at six positions (only three are shown in FIG. 4) with intervals in a circumferential direction and the cam grooves 24c are also provided at six positions (see FIG. 3). The linear groove 23c is formed in a concave form on the outer circumferential surface and extends in the OA direction. In this embodiment, the linear grooves 23c are provided in a pair. As shown in FIG. 5, the liner 29 is fitted in the linear groove 23c slidably in the extending direction (the OA direction). The liner 29 is in a plate-like form and extends from the base member 28 in the OA direction. In this embodiment, the liners 29 are provided in a pair corresponding to the linear grooves 23c. Therefore, the linearly-moving cylinder 23 is capable of moving (linearly moving) in the OA direction (photographic path) with respect to the base member 28, that is, the fixed cylinder 25 (see FIG. 2) fixed on the base member 28 while being prevented from rotating about the photographic optical axis OA. Thereby, as shown in FIG. 2, the linearly-moving cylinder 23 linearly moves in the OA direction (photographic path direction) with respect to the base member 28 (fixed cylinder 25) according to the rotational orientation of the rotary cylinder 24 which is rotationally driven with respect to the fixed cylinder 25 such that the cam follower 23b follows a cam trajectory of the cam groove 24c of the rotary cam cylinder 24 with the cam followers 23b are engaged.

As shown in FIGS. 2 and 6, an annular groove 23d is provided on an inner peripheral surface of the linearly-moving cylinder 23 at a back side (image side) of the flange portion 23a. The annular groove 23d extends in a circumferential direction in vicinity of the flange portion 23a. The annular groove 23d has an annular shape provided along a plane orthogonal to the photographic optical axis OA and is opened at an end (opened end 23e) toward the image side in the OA direction.

Figure 7:
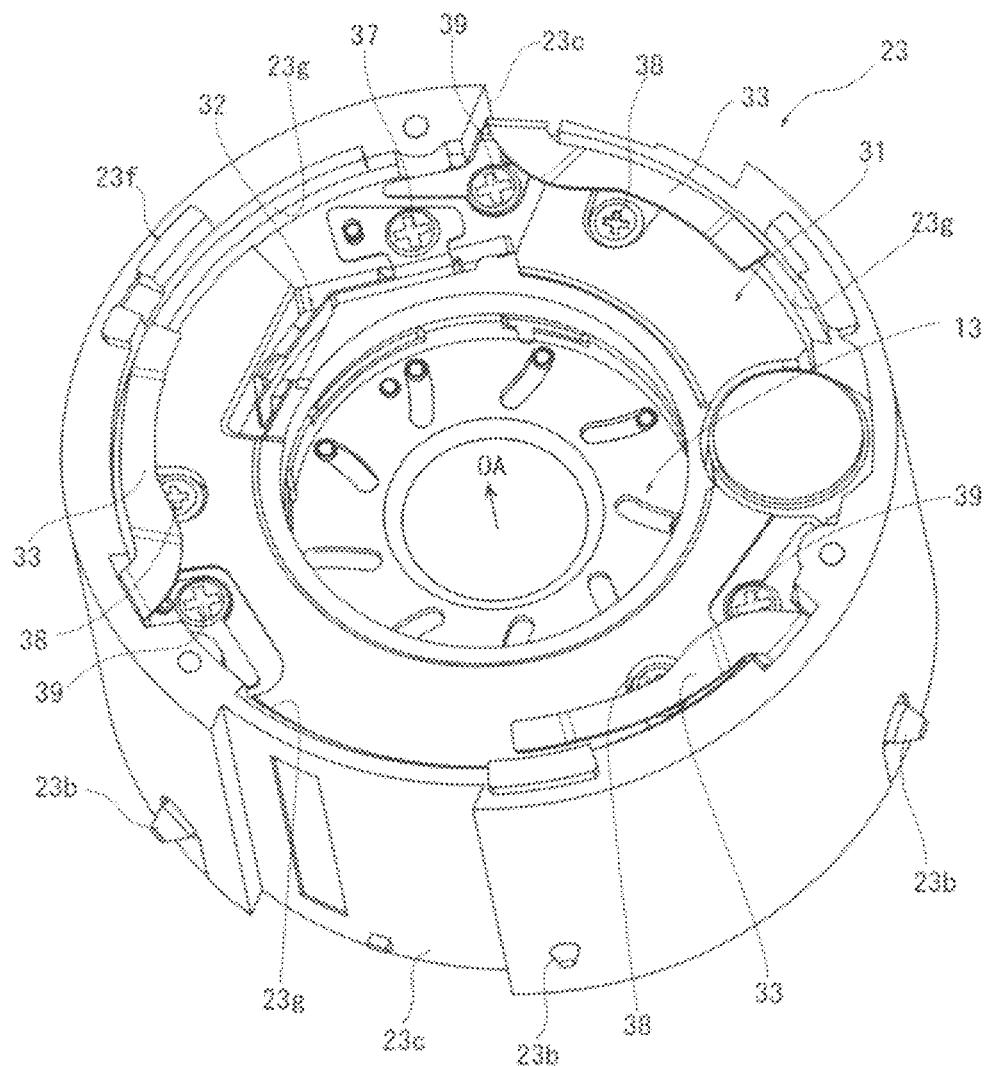
FIG. 7 is a perspective view schematically showing the linearly-moving cylinder in which a shutter/aperture unit, a spring receiving member, a first biasing member and a second biasing member are installed, as viewed from the object side.

As shown in FIGS. 4 and 7, a fitting portion 23f and three fitting grooves 23g are provided on a front end surface (object side end surface, which is shown in FIGS. 4 and 7 as an upper side) of the linearly-moving cylinder 23. The fitting portion 23f has a cuboid-like shape projection projected in the OA direction from the front end surface and a concave portion at a center of the projection. The later-described fitted projection 21f of the first lens holding frame 21 is fitted to the fitting portion 23f. Each fitting groove 23g has an arc-like shape and is notched at an inner side of the arc-like front end of the linearly-moving cylinder 23 in a circumferential direction. An outer inner-circumferential edge portion is positioned on a concyclic position about a center axis of the linearly-moving cylinder 23, which is matched with the photographic optical axis OA (see FIG. 12). Each fitting groove 23g is capable of being engaged with the later-described engagement edge portion 30a of the adjustment cam member 30 (see FIG. 9).

As described above, the first lens group 11 (the first lens holding frame 21 and the shutter/aperture unit 13 are contained and held in the space at the front side (object side) of the flange portion 23a of the linearly-moving cylinder 23. In the linearly-moving cylinder 23, three screw holes 23h (see FIG. 12) are provided on the flange portion 23a at the space side. Each screw hole 23h is capable of screwing with the later-described second screw member 38 (see FIG. 17). The shutter/aperture unit 13 is, as shown in FIG. 2, contained in the linearly-moving cylinder 23 so as to be pressed on the flange portion 23a. The first lens holding frame 21 holding the first lens group 11 and the adjustment cam member 30 and the spring receiving member 31, which surround the first lens holding frame 21 are contained at the object side.

Figure 8:
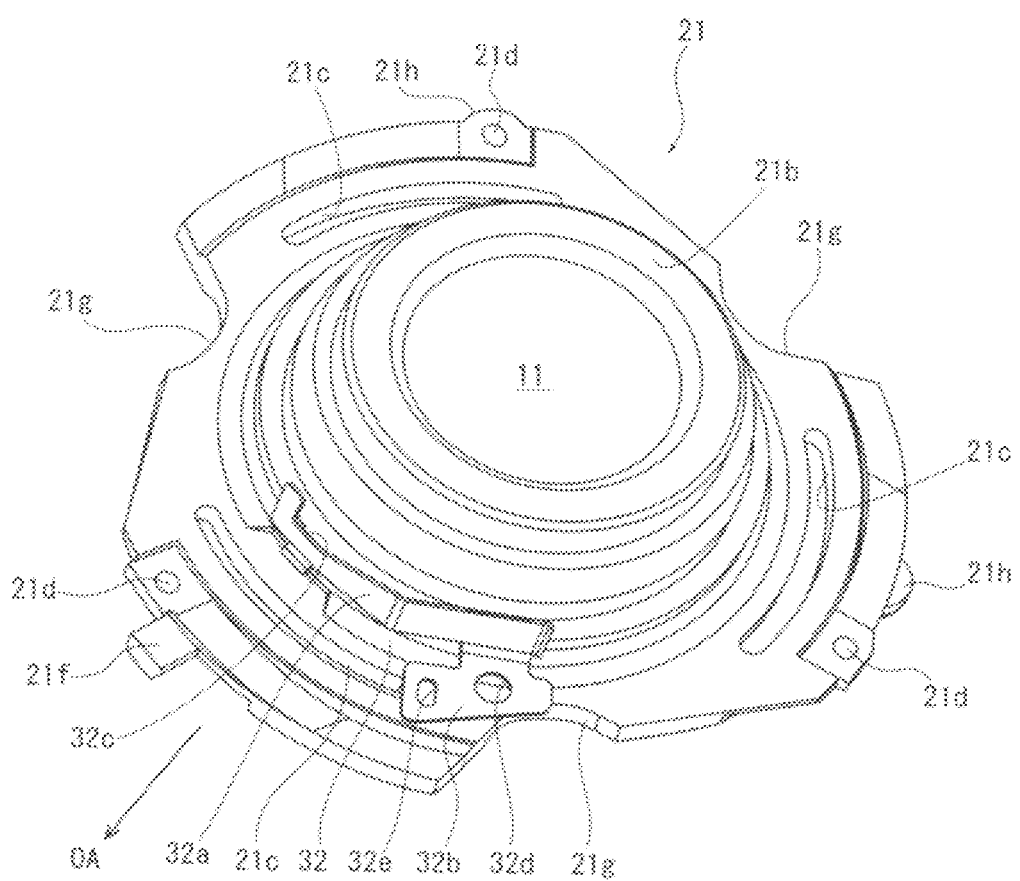
FIG. 8 is a perspective view schematically showing the first lens holding frame, as viewed from the image side.

The first lens holding frame 21 has, as shown in FIGS. 2 and 8, a cylindrical shape as a whole and a stepped shape with a relatively small diameter (diameter about the photographic optical axis OA) at a back side (image side which is shown as an upper side in FIG. 8). The first lens holding frame 21 has an outer diameter so as to be inserted in the front side (object side) of the flange portion 23a of the linearly-moving cylinder 23 but not to be inserted in the inner side (inner diameter position defined by the flange portion 23a) of the flange portion 23a (see FIG. 2).

The first lens holding frame 21 has a holding hole 21a (see FIG. 2) penetrating along the OA direction at the center position so as to hold the first lens group 11. The holding hole 21a has an inner diameter shape so as to fit the first lens group 11 and a stepped shape with stepwise diameters gradually reduced from the front side (object side, which is shown as a left side in FIG. 2 to the back side (image side, which is shown as a right side in FIG. 2). Therefore, the center axis line of the holding hole 21a is the optical axis of the first lens group 11. In this embodiment, the optical axis of the first lens group 11 is matched with the photographic optical axis OA. An inner edge projection portion 21b is provided at the back side (image side) of the holding hole 21a, that is, the back end of the first lens holding frame 21 so as to prevent the fitted and contained first lens group 11 from falling. In the first lens holding frame 21, the first lens group 11 is inserted into the holding hole 21a of the first lens holding frame 21 via the opening at the object side and contained.

In the first lens holding frame 21, as shown in FIG. 8, three arc-like holes 21c, three pressing projections 21d, three pressing receiving portions 21e (see FIGS. 19 and 24), the fitted projection 21f, three peripheral notched portions 21g and a pair of contact projection portions 21h are provided. Each arc-like hole 21c is provided such that the later-described adjustment engagement hole 30b of the adjustment cam member 30 is exposed to achieve contact with the adjustment engagement hole 30b. Since the adjustment cam member 30 is rotatable about the photographic optical axis OA, as described below, the arc-like hole 21c has an arc shape so as to fit with the movement trajectory of each adjustment engagement hole 30b in accordance with the rotation of the adjustment cam member 30.

The three pressing projections 21d are projected toward the image side from the back surface (image side surface, which is shown as an upper side in FIG. 8) in the OA direction at the peripheral portion and provided at an even interval with each other in a circumferential direction. The pressing receiving portions 21e are provided on an opposite surface to each pressing projection 21d in the OA direction, that is, on a front surface at the peripheral portion (see FIG. 24). Each pressing receiving portion 21e receives the pressing force from the later-described second biasing member 33 (see FIG. 4). By receiving the pressing force, each pressing projection 21d presses the later-described adjustment cam surface 30c of the adjustment cam member 30 (see FIG. 24).

The fitted projection 21f has a plate-like shape extending outwardly in a radial direction from the photographic optical axis OA along a plane orthogonal to the photographic optical axis OA from the peripheral portion of the first lens holding frame 21. The fitted projection 21f is fitted into the fitting portion 23f of the linearly-moving cylinder 23 when, as described below, the first lens holding frame 21 is contained in the linearly-moving cylinder 23 (see FIG. 4) so that the first lens holding frame 21 is prevented from rotating with respect to the linearly-moving cylinder 23.

Each peripheral notched portion 21g is formed by notching the peripheral portion of the first lens holding frame 21 inwardly in the radial direction to dispose (mount) the second biasing member 33 when assembling as described below.

Each of the pair of contact projection portions 21h has a partially ellipsoidal shape (crescentic or semilunar shape in section orthogonal to the photographic optical axis OA) extending outwardly in a radial direction from the outer circumferential surface of the first lens holding frame 21. Both contact projection portions 21h are capable of coming into contact with the inner circumferential surface of the linearly-moving cylinder 23 in a state where the first lens holding frame 21 is biased in the radial direction from the later-described first biasing member 32 (see FIGS. 4 and 25). Both contact projection portions 21h are, in this embodiment, disposed symmetrically with respect to a line along the biasing direction of the first biasing member 32 to the first lens holding frame 21 in the linearly-moving cylinder 23 (a line connecting a pressing part 32c of the first biasing member 32 and the photographic optical axis OA (see arrow A1 in FIG. 25) on a plane orthogonal to the photographic optical axis OA) (see FIG. 25). That is, the contact projection portions 21h are disposed with an even interval in the circumferential directions inversely each other from the part pressed by the pressing part 32c of the first biasing member 32 about the photographic optical axis OA on a plane orthogonal to the photographic optical axis OA. The contact projection portions 21h are, as described below, provided to position the first lens holding frame 21 on a plane orthogonal to the photographic optical axis OA in the front-side space from the flange portion 23a of the linearly-moving cylinder 23.

The adjustment cam member 30 and the spring receiving member 31 are provided so as to surround the reduced-diameter back side (image side) portion of the first lens holding frame 21 along the plane orthogonal to the photographic optical axis OA (see FIG. 2). The adjustment cam member 30 is, as shown in FIG. 9, an annular flat-plate like member. Each arc-like hole 21c, the pressing projection 21d, and the like are provided on the back side (right side in FIG. 2) of the front end edge portion (see FIG. 8) and in the first lens holding frame 21, the adjustment cam member 30 is capable of being mounted on the back side along the front end edge portion. On the adjustment cam member 30, the engagement edge portion 30a, three adjustment engagement holes 30b, three adjustment cam surfaces 30c, and three peripheral notched portions 30d are provided.

The engagement edge portion 30a is formed with a flat surface along the plane orthogonal to the photographic optical axis on the back side (right side in FIG. 2) of the peripheral portion of the flat-plate member. The engagement edge portions 30a are, in this embodiment, provided at three positions in a circumferential direction and on concyclic positions about the center axis of the adjustment cam member 30, which is matched with the photographic optical axis OA. Each engagement edge portion 30a is capable of being engaged with the corresponding fitting groove 23g of the linearly-moving cylinder 23 in the OA direction and in the radial direction of the linearly-moving cylinder 23 (in the direction orthogonal to the photographic optical axis OA) (see FIGS. 2, 23 and 24). Each engagement edge portion 30a is capable of sliding with respect to the fitting groove 23g to be engaged in the engaged state. Therefore, the adjustment cam member 30 is capable of rotating about the center axis (photographic optical axis OA) on a plane orthogonal to the center axis without changing the position in the direction of the center axis in the linearly-moving cylinder 23, by guiding operation of the fitting groove 23g engaged with each engagement edge portion 30a.

Each adjustment engagement hole 30b is an engagement hole to rotate the adjustment cam member 30 capable of rotating in the linearly-moving cylinder 23. In each adjustment engagement hole 30b, the engagement portion of the not-illustrated rotating member (rotating device) is capable of being inserted from the object side (upper side in FIG. 9) in the photographic optical axis OA. In the inserted state, the adjustment engagement hole 30b is capable of being engaged in a circumferential direction about the photographic optical axis OA.

Figure 23:
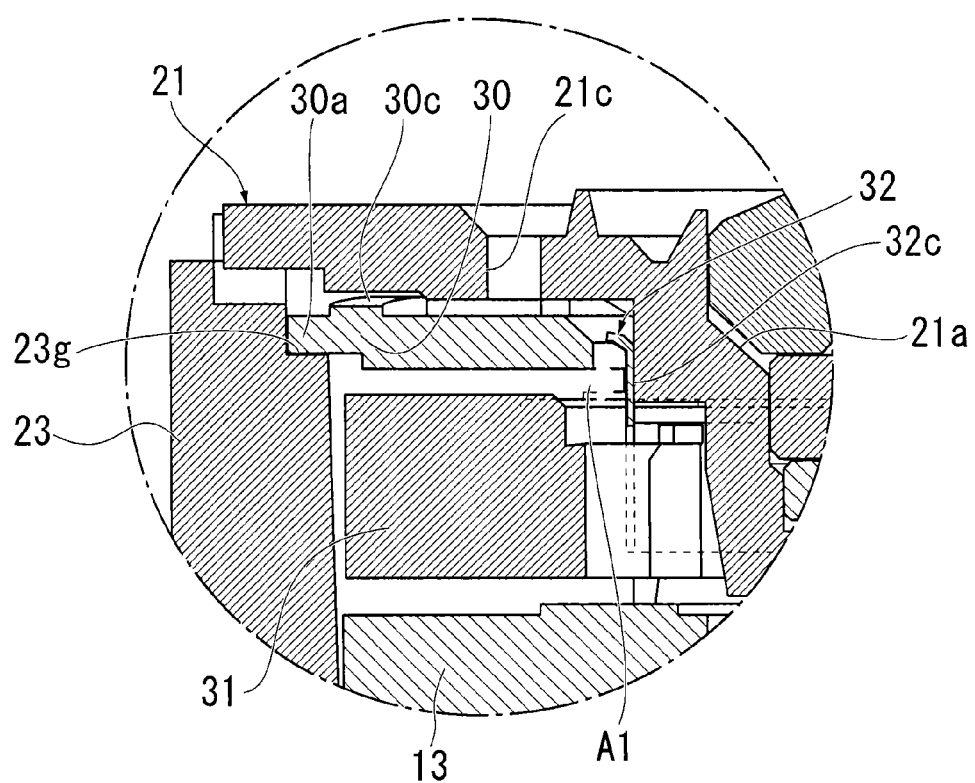
FIG. 23 is an enlarged section view showing a circle C1 shown by a dot chain line in FIG. 22
Figure 24:
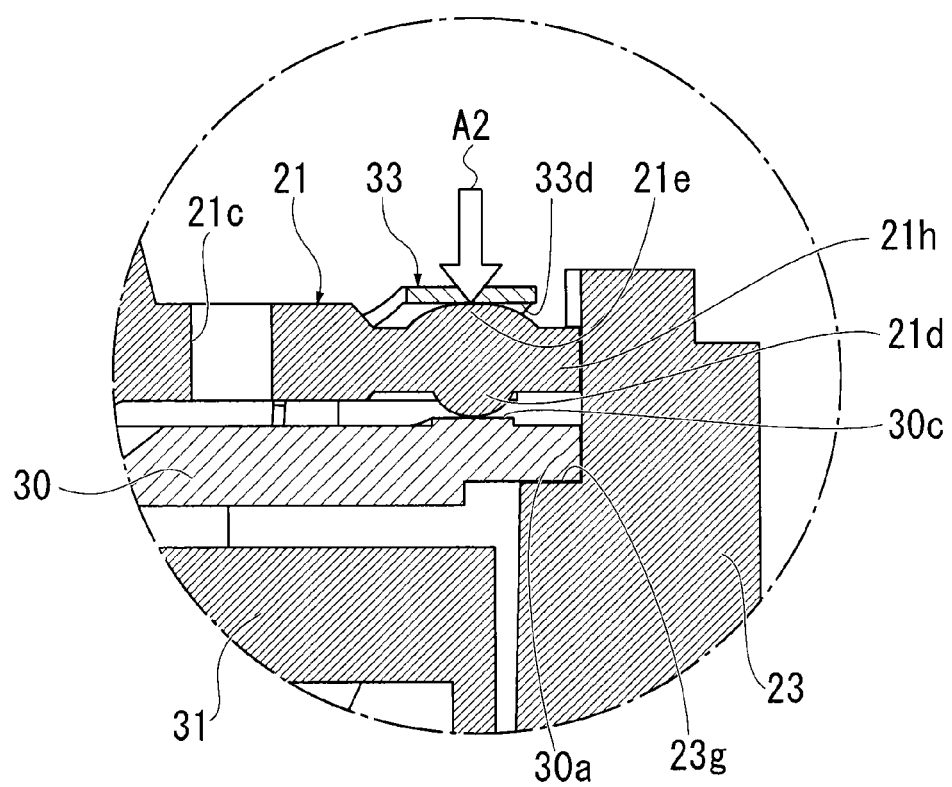
FIG. 24 is an enlarged section view showing a circle C2 shown by a dot chain line in FIG. 22.

The adjustment cam surface 30c is a spiral or helical inclined surface gradationally projected toward object side according to the positional change in the circumferential direction (clockwise direction in FIG. 9) on the front side (upper side in FIG. 9) of the peripheral portion of the flat-plate member (see FIGS. 9, 23 and 24). On the other hand, height of the adjustment cam surface 30c in the OA direction changes gradationally toward the object side according to movement in the clockwise direction in FIG. 9. The adjustment cam surface 30c slidably comes into contact with the pressing projection 21d of the first lens holding frame 21 (see FIG. 24). The adjustment cam surfaces 30c are, in this embodiment, provided at three positions with an even interval in the circumferential direction so as to face or correspond to the pressing projections 21d, respectively. The adjustment cam surfaces 30c have same inclined degrees or angles each other. In this embodiment, three adjustment cam surfaces 30c and respectively corresponding pressing projections 21d come into contact into each other at the position (height position) equal to each other in the OA direction, that is, on a same plane orthogonal to the photographic optical axis OA.

The adjustment cam surface 30c may define or control the position and orientation of the first lens holding frame 21, each pressing projection 21d coming into contact with the position, with respect to the photographic optical axis OA in the linearly-moving cylinder 23. This is because the position of the adjustment cam member 30 in the direction of the center axis (photographic optical axis OA) is prevented from changing with respect to the linearly-moving cylinder 23. Each adjustment cam surface 30c changes the rotational orientation of the adjustment cam member 30 with respect to the linearly-moving cylinder 23, and thereby the position of the first lens holding frame 21 to came into contact with each pressing projection 21d in the OA direction in the linearly-moving cylinder 23 can change. At this time, the inclined degree of each adjustment cam surface is equal to each other so that the orientation of the first lens holding frame 21 with respect to the photographic optical axis OA does not change. In this embodiment, each adjustment cam surface 30c and each pressing projection 21d are set so as to come into contact with each other on the same plane orthogonal to the photographic optical axis OA. However, it is not limited thereto and it is only necessary to have a function of setting the orientation of the first lens holding frame 21 so as to match the center axis with the photographic optical axis OA and a function of moving the first lens holding frame 21 in the OA direction while maintaining the orientation.

Each peripheral notched portion 30d is formed by notching the peripheral portion of the adjustment cam member 30 which is annular flat-plate like member inwardly in the radial direction. As described below, the peripheral notched portion 30d is provided to dispose or mount the second biasing member 33 when assembling. The spring receiving member 31 is provided on the back side (image side, which is the right side in FIG. 2) of the adjustment cam member 30.

Figure 14:
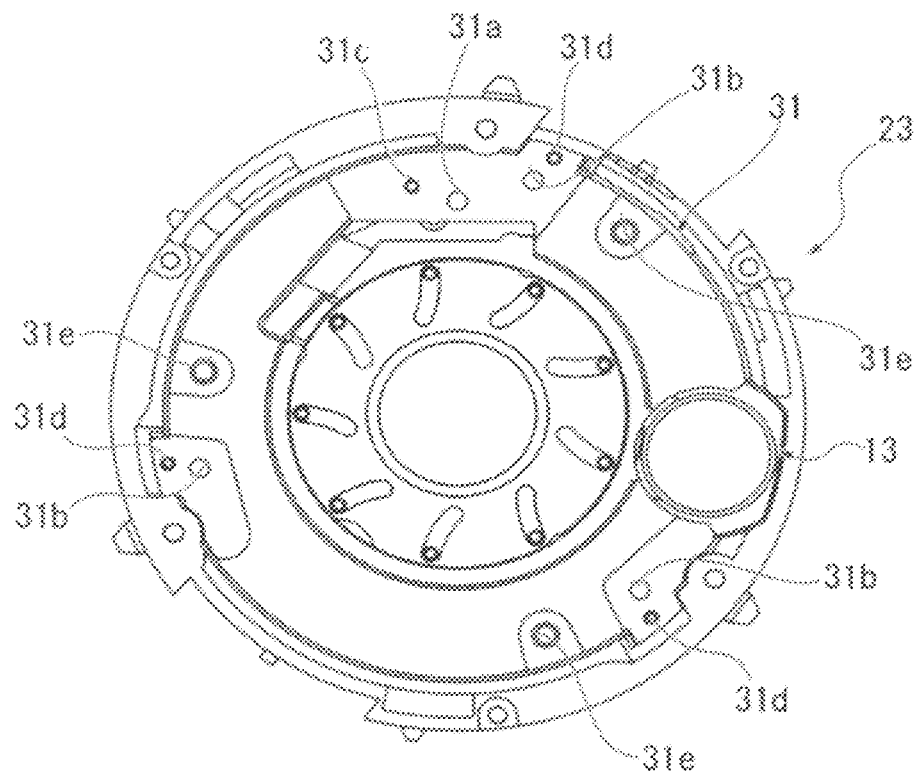
FIG. 14 is an explanatory view showing a state where the spring receiving member is inserted into the linearly-moving cylinder of FIG. 13.

The spring receiving member 31 is disposed on the front side (object side, which is the left side in FIG. 2) of the shutter/aperture unit 13 and, as shown in FIGS. 7 and 14, has an annular shape capable of being contained in the linearly-moving cylinder 23 without inhibiting the function of the shutter/aperture unit 13. The spring receiving member 31 is, as described below, provided to fix the first biasing member 32 and each second biasing member 33 and has a first fixing hole 31a for the first biasing member 32 and three second fixing holes 31b for the second biasing member 33 (see FIG. 14). A first fixing projection 31c is provided in vicinity of the first fixing hole 31a and second fixing projections 31d are provided in vicinity of the second fixing holes 31b, respectively (see FIG. 14). Furthermore, three attachment inserting holes 31e are provided on the spring receiving member 31. The attachment inserting holes 31e are provided to fix the spring receiving member 31 to the flange portion 23a of the linearly-moving cylinder 23 and positioned at positions corresponding to the attachment screw holes 23h of the flange portion 23a (see FIG. 12).

Figure 10A:
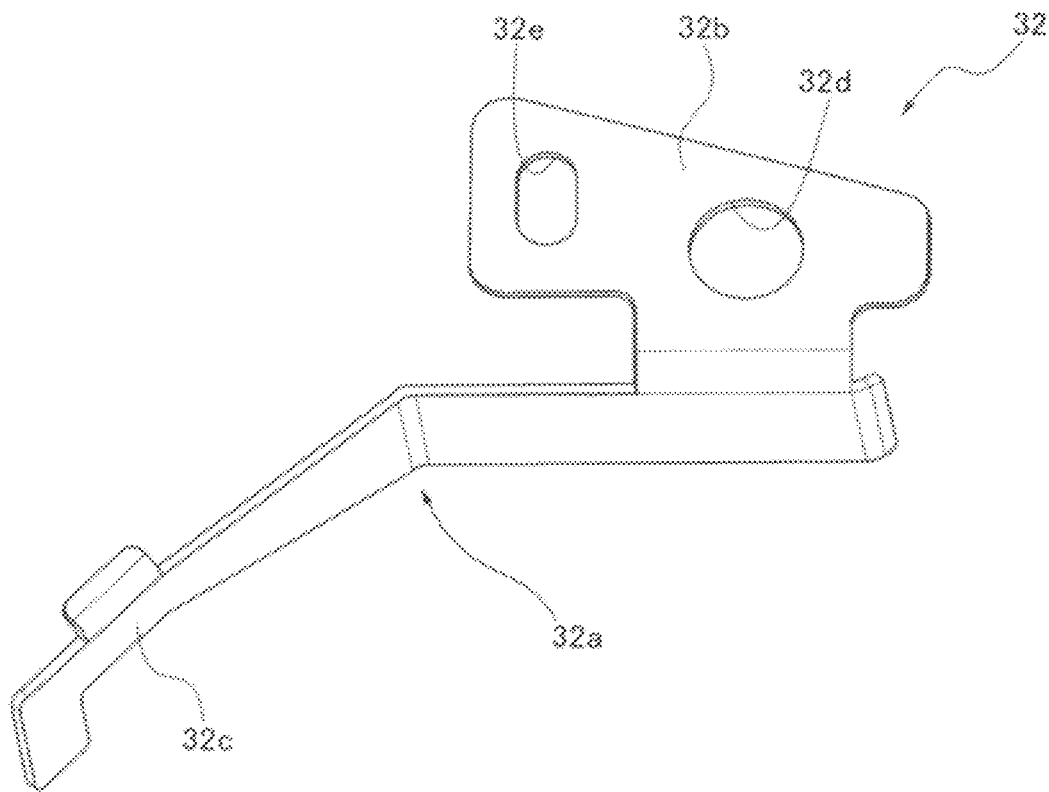
FIG. 10A is a perspective view schematically showing a first biasing member as viewed from the object side in an installed state.
Figure 10B:
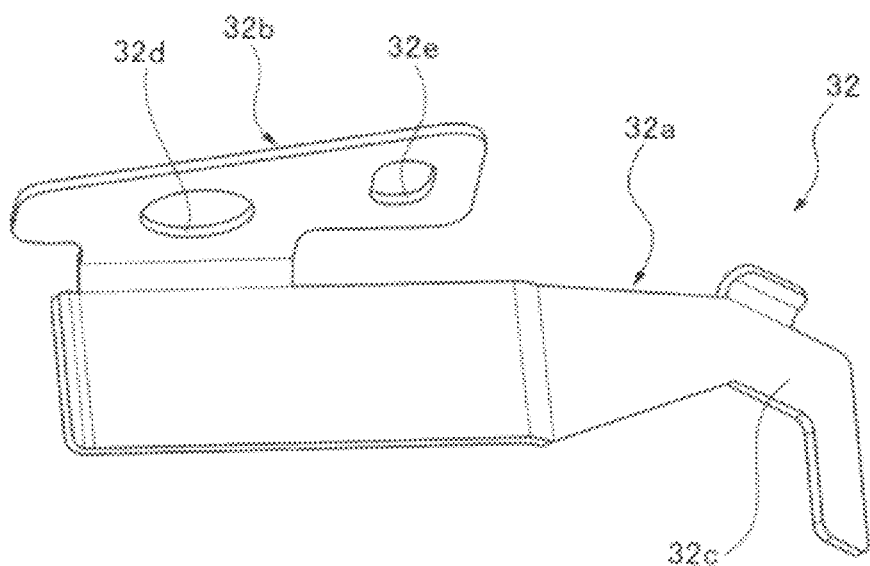
FIG. 10B is a perspective view schematically showing the first biasing member as viewed from the image side in the installed state.

The first biasing member 32 fixed thereto is, as shown in FIG. 10, a plate spring formed by a plate-like member capable of elastically deforming and has a pressing arm portion 32a and an attachment plate portion 32b. The pressing arm portion 32a has a plate-like form curved or bent in accordance with a mounted position and is capable of being disposed along an outer circumferential surface of the first lens holding frame 21 (see FIGS. 8 and 25). The pressing arm portion 32a has an end connected to the attachment plate portion 32b and a pressing part 32c (see FIG. 8) for pressing the outer circumferential surface of the first lens holding frame 21 in vicinity of the other end of the pressing arm portion 32a. The attachment plate portion 32b has a plate-like form and is bent or curved so as to be orthogonal to the pressing arm portion 32a and connected thereto. An attachment inserting hole 32d and a positioning inserting hole 32e are provided on the attachment plate portion 32b. The attachment inserting hole 32d is a through hole to allow the first screw member 37 (see FIG. 7) to insert thereto to be attached to the spring receiving member 31, as described below. The positioning inserting hole 32e is a through hole capable of being engaged with the first fixing projection 31c of the spring receiving member 31 (see FIG. 14). The first biasing member 32 is capable of applying a biasing force in a direction along the attachment surface by the positional relationship between the pressing arm portion 32a (pressing part 32c) and the attachment plate portion 32b.

Figure 11A:
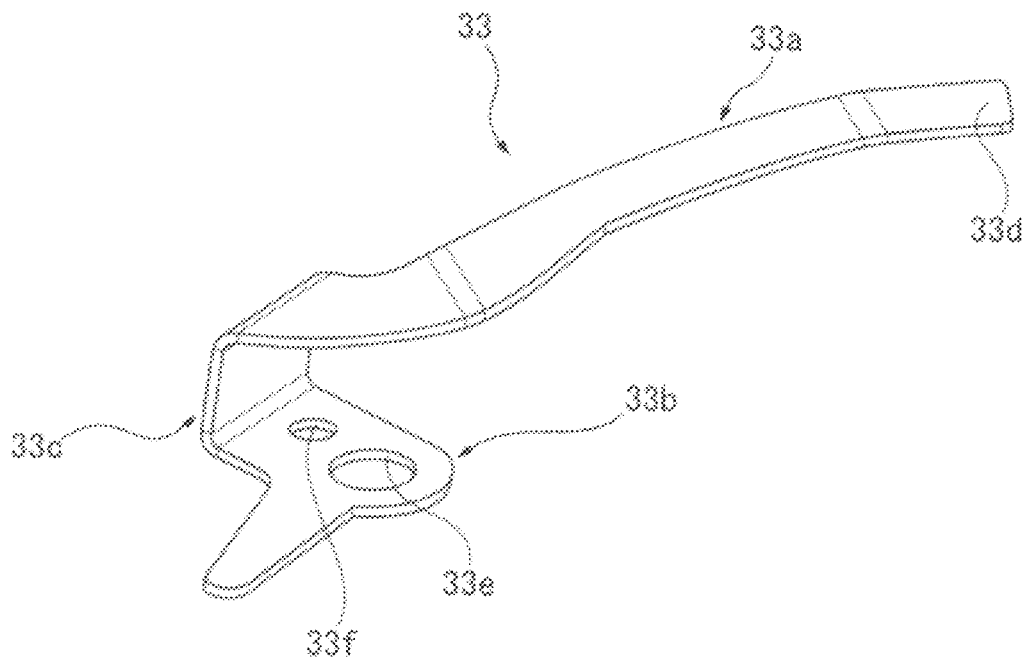
FIG. 11A is a perspective view schematically showing a second biasing member as viewed from the object side in an installed state.
Figure 11B:
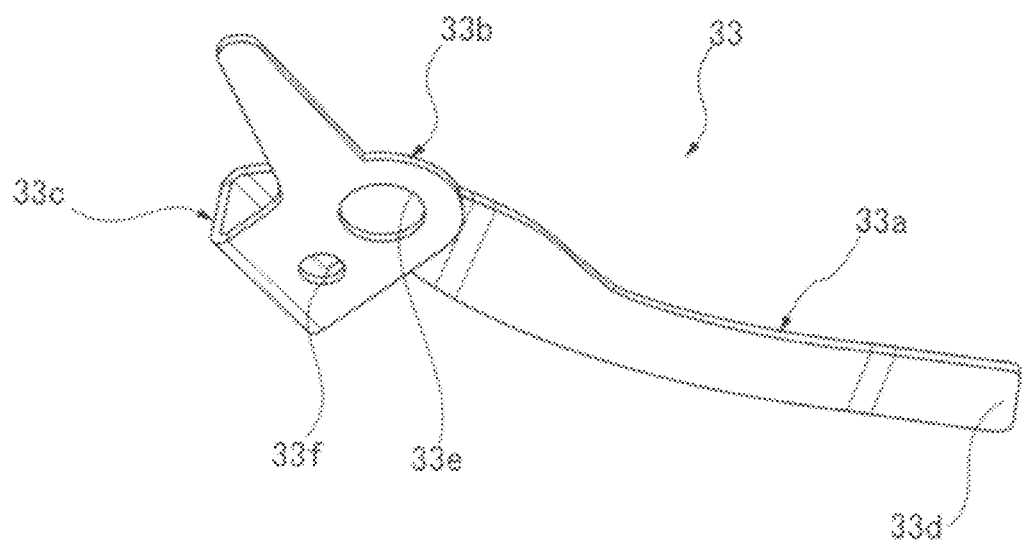
FIG. 11B is a perspective view schematically showing the second biasing member as viewed from the image side in the installed state.

The second biasing member 33 fixed to the spring receiving member 31 is, as shown in FIG. 11, a plate-like spring formed from an elastic deformable plate-like member and has a pressing arm portion 33a, an attachment plate portion 33b and a connection arm portion 33c. The pressing arm portion 33a has a plate-like shape bent or curved in accordance with a mounted part and is capable of being disposed along a surface (object side surface, which is upper side surface in FIG. 4) of the peripheral portion of the first lens holding frame 21. The pressing arm portion 33a has an end connected to the attachment plate portion 33b via a connection arm portion 33c and a pressing part 33d to press the pressing receiving portion 21e (see FIG. 24) of the first lens holding frame 21 in vicinity of another end of the pressing arm portion 33b. The attachment plate portion 33b has a flat-plate like shape and is connected to the pressing arm portion 33a through the connection arm portion 33c. The connection arm portion 33c bridges or connects between the pressing arm portion 33a and the attachment plate portion 33b in a direction orthogonal to extending planes of the pressing arm portion 33a and the attachment plate portion 33b to allow the pressing arm portion 33a and the attachment plate portion 33b to be disposed with a predetermined interval. The predetermined interval is set to a length capable of receiving the peripheral portion of the adjustment cam member 30 in a thickness direction (direction of the photographic optical axis). The attachment plate portion 33b has an attachment insertion hole 33e and a positioning insertion hole 33f. The attachment insertion hole 33e is a through hole to be attached to the spring receiving member 31 allowing the second screw member 38 (FIG. 7) to be inserted. The positioning insertion hole 33f is a through hole capable of being engaged with the first fixing projection 31c (see FIG. 14) of the spring receiving member 31. The second biasing member 33 is capable of applying a biasing force in a direction orthogonal to the attachment surface in accordance with the positional relationship between the pressing arm portion 33a (pressing part 33d) and the attachment plate portion 33b.

In the lens barrel 10, the above-described members are, as shown in FIGS. 12 to 21, assembled in a space of the front side (object side) of the flange portion 23a of the linearly-moving cylinder 23. The later-described assembling processes are shown as an example and therefore it is not limited to this embodiment.

Figure 12:
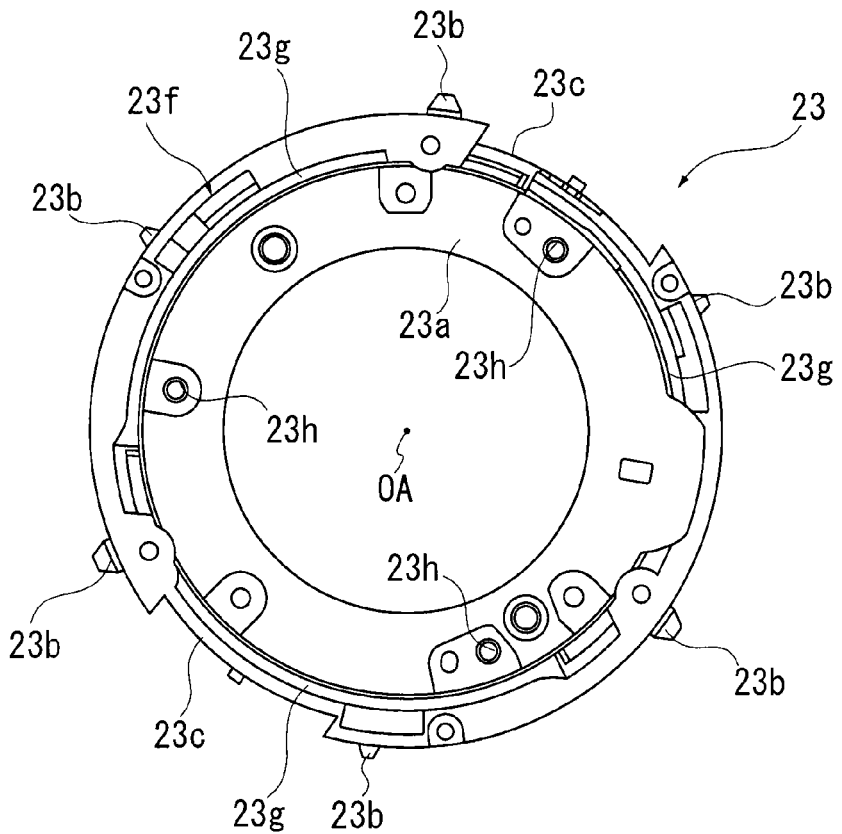
FIG. 12 is an explanatory view schematically showing the linearly-moving cylinder as viewed from the object side.
Figure 13:
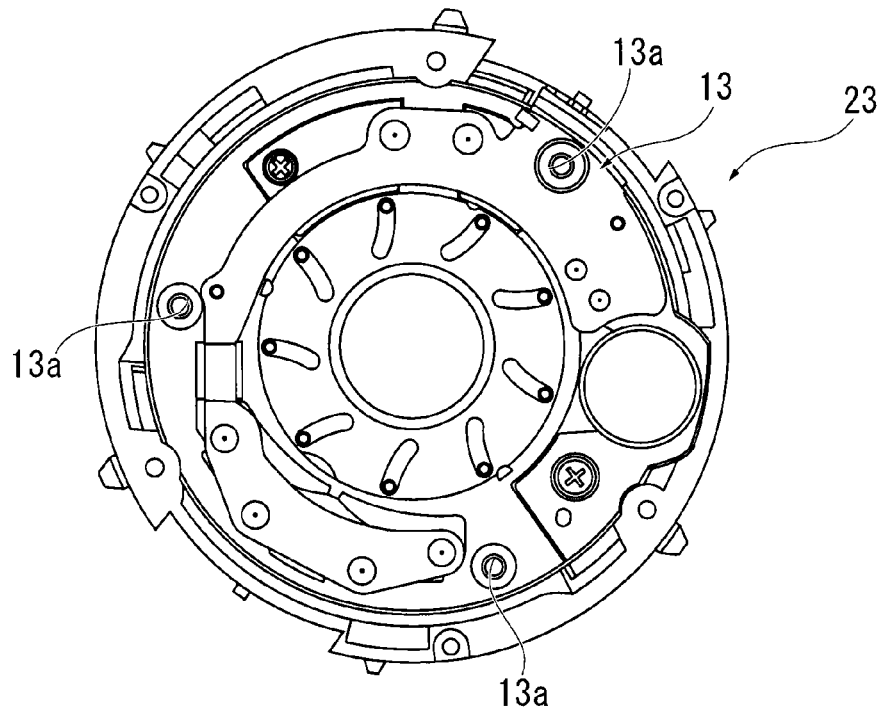
FIG. 13 is an explanatory view showing a state where the shutter/aperture unit is inserted into the linearly-moving cylinder of FIG. 12.

At first, the shutter/aperture unit 13 is, as shown in FIG. 13, inserted in the space of the front side (object side) of the flange portion 23a of the linearly-moving cylinder 23 shown in FIG. 12. At that time, the three screw inserting holes 13a of the shutter/aperture unit 13 are set so as to be positionally matched with the three attachment screw holes 23h (see FIG. 12) of the flange portion 23a in the direction of the photographic optical axis.

Next, as shown in FIG. 14, the spring receiving member 31 is inserted over the shutter/aperture unit 13 (at the object side). At that time, the three attachment inserting holes 31e of the spring receiving member 31 are set to be positionally matched with the three screw inserting holes 13a (see FIG. 13) of the shutter/aperture unit 13 in the OA direction.

Figure 15:
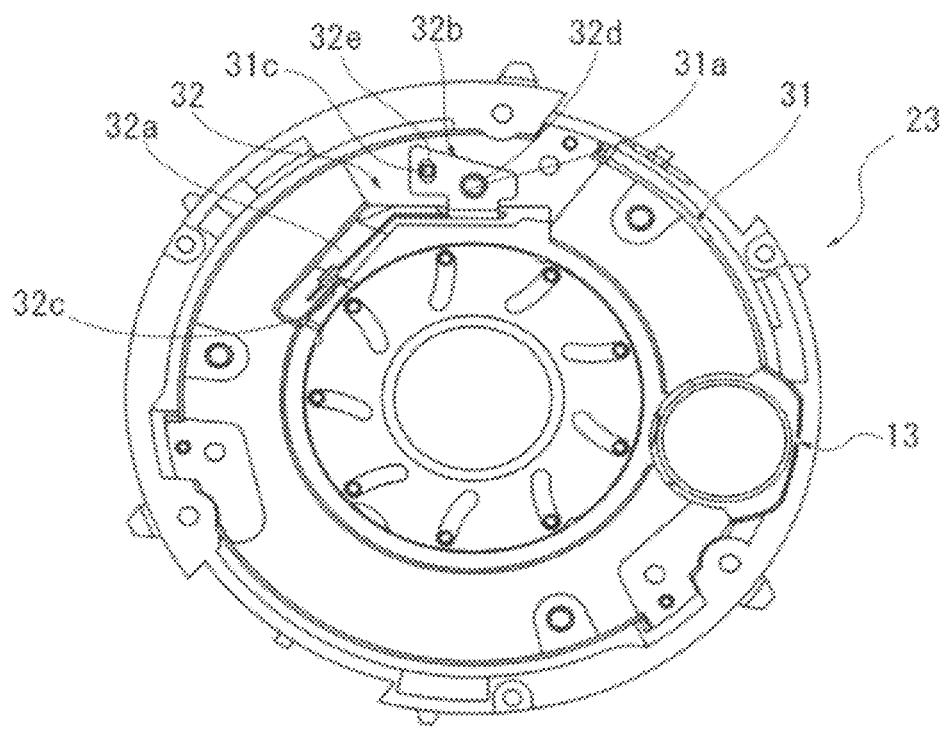
FIG. 15 is an explanatory view showing a state where the first biasing member 32 is disposed on the linearly-moving cylinder of FIG. 14.

Next, as shown in FIG. 15, the first biasing member 32 is disposed over the spring receiving member 31 (object side). The first biasing member 32 is disposed so as to position the pressing arm portion 32a at a side of the shutter/aperture unit 13 (image side) while the attachment plate portion 32b comes into contact with the upper surface (a surface at the object side) of the spring receiving member 31 (see FIG. 7). At that time, the attachment inserting hole 32b is positioned so as to be matched with the first fixing hole 31a of the spring receiving member 31 in the OA direction and the first fixing projection 31c of the spring receiving member 31 is inserted into the positioning inserting hole 32e. When the pressing part 32c receives the outer circumferential surface of the first lens holding frame 21, the first biasing member 32 (see FIG. 7) is positionally set to a contact part where a biasing force (see arrow A1 in FIG. 25) toward the photographic optical axis OA on the first lens holding frame 21 is applied.

Figure 16:
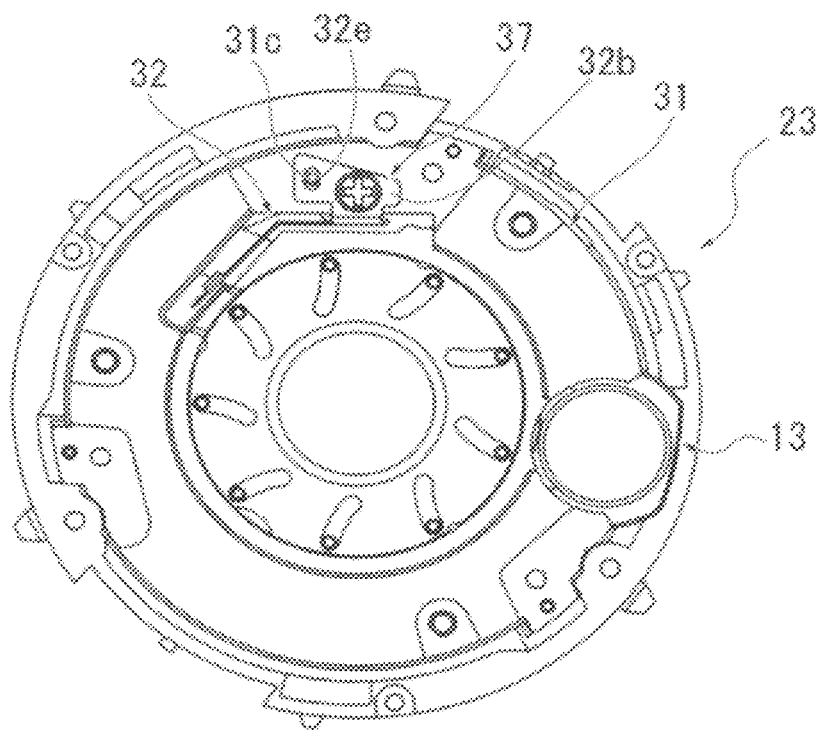
FIG. 16 is an explanatory view showing a state where a first screw member is screwed with the linearly-moving cylinder of FIG. 15.

Then, as shown in FIG. 16, the first biasing member 32 is fixed to the spring receiving member 31 through the first screw member 37. The first screw member 37 is inserted into the attachment inserting hole 32d (see FIG. 15) of the attachment plate portion 32b and screwed with the first fixing hole 31a (see FIG. 14) of the spring receiving member 31, which is positionally matched with the attachment inserting hole 32d. At that time, as described above, the first fixing projection 31c of the spring receiving member 31 is inserted in the positioning inserting hole 32e, so that the first biasing member 32 is prevented from rotating about the first screw member 37 (that is, an axis line thereof) with respect to the spring receiving member 31.

Figure 17:
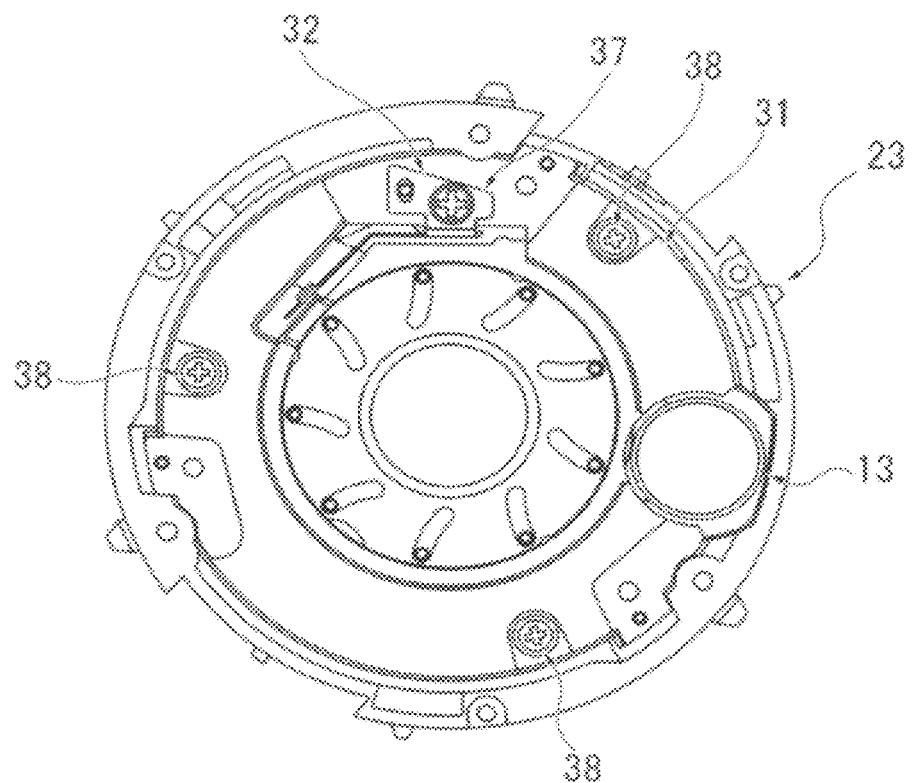
FIG. 17 is an explanatory view showing a state where each second screw member is screwed with the linearly-moving cylinder of FIG. 16.

Next, as shown in FIG. 17, the spring receiving member 31 is fixed on the linearly-moving cylinder 23 through the three second screw members 38. Each second screw member 38 is inserted into the attachment inserting hole 31e (see FIG. 14) of the spring receiving member 31. Each second screw member 38 is, via each screw inserting hole 13a (see FIG. 13) of the shutter/aperture unit 13, which is positionally matched with the respective attachment inserting hole 31e, screwed with the positionally-matched flange portion 23a (see FIG. 12) of the linearly-moving cylinder 23. Thereby, the spring receiving member 31 is fixed to the linearly-moving cylinder 23.

Figure 18:
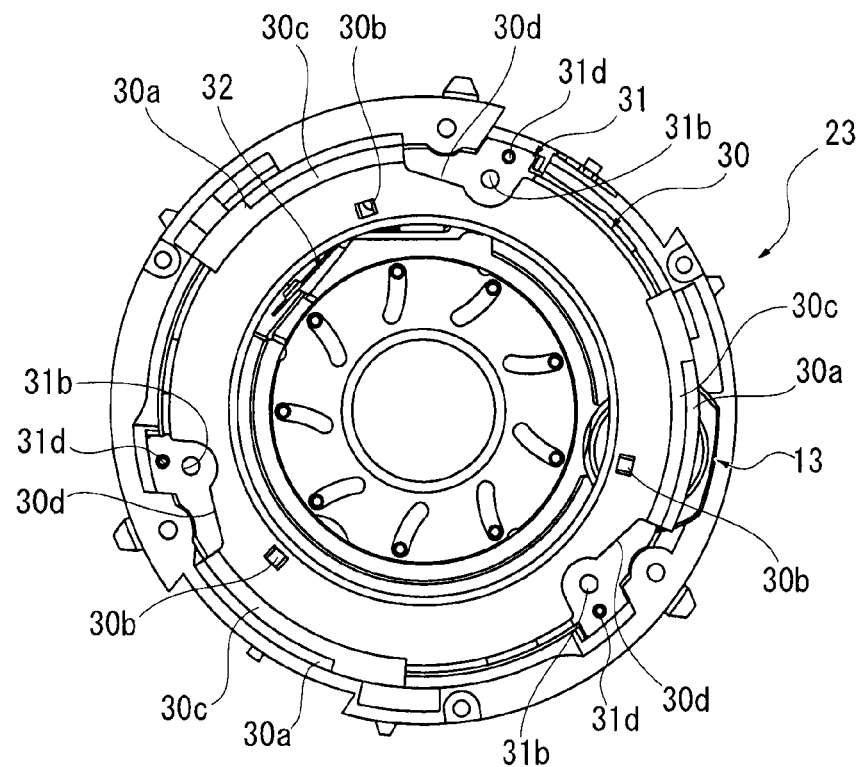
FIG. 18 is an explanatory view showing a state where the adjustment cam member is inserted into the linearly-moving cylinder of FIG. 17.

Next, as shown in FIG. 18, the adjustment cam member 30 is inserted on the spring receiving member 31 (at the object side). At that time, the three engagement edge portions 30a (see FIG. 9) of the adjustment cam member 30 are engaged with the three fitting grooves 23g (see FIG. 12) of the linearly-moving cylinder 23 and the three peripheral notched portions 30d of the adjustment cam member 30 are positioned over the second fixing holes 31b and the second fixing projections 31 in pairs, respectively. Thereby, each second fixing hole 31b and each second fixing projection 31d, which are provided on the spring receiving member 31 positioned at a back side (image side) of the adjustment cam member 30 are exposed at the object side.

Figure 19:
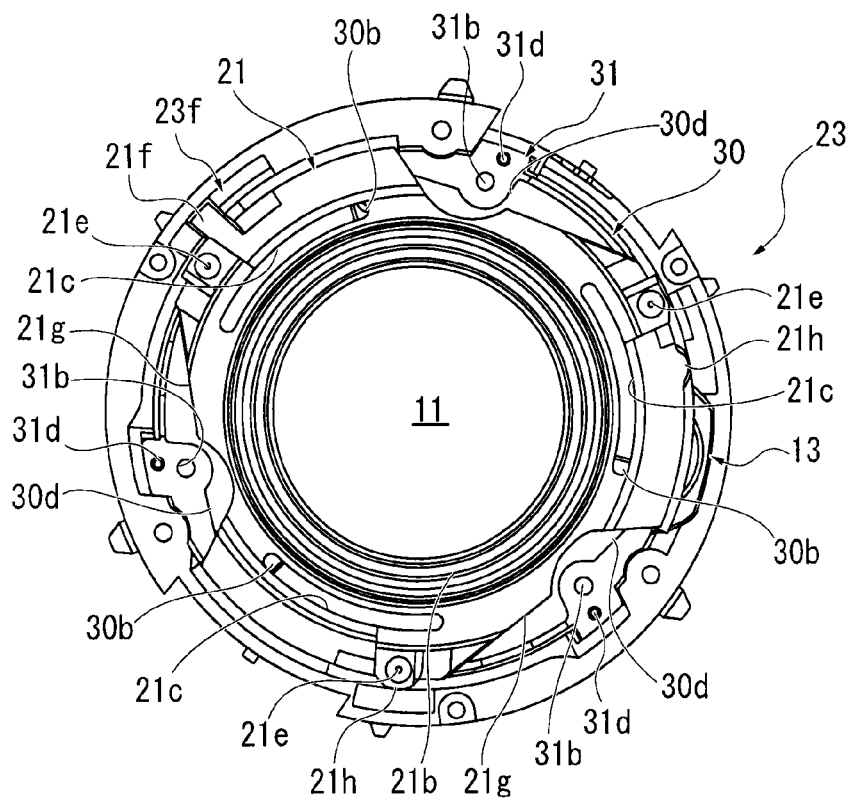
FIG. 19 is an explanatory view showing a state where the first lens holding frame is inserted into the linearly-moving cylinder of FIG. 18.

Next, as shown in FIG. 19, the first lens holding frame 21 holding the first lens group 11 is inserted over the adjustment cam member 30 (at the object side). At that time, the first lens holding frame 21 is disposed such that the outer circumferential surface of the first lens holding frame 21 receives the pressing part 32c of the first biasing member 32 (see FIG. 8), and the fitted projection 21f is fitted into the fitting portion 23f of the linearly-moving cylinder 23 while reacting against the biasing force and each pressing projection 21d comes into contact with the adjustment cam surface 30c of the adjustment cam member 30 (see FIG. 24). The three peripheral notched portions 21g are positioned on each second fixing hole 31b and each second fixing projection 31d, which are exposed through each peripheral notched portion 30d and three arc-like holding portions 21c are positioned on each adjustment engagement hole 30b of the adjustment cam member 30. Thereby, each adjustment engagement hole 30b provided on the adjustment cam member 30 positioned at the back side (image side) of the first lens holding frame 21 is exposed at the object side via the respective arc-like hole 21c and each second fixing hole 31b and each second fixing projection 31d, which are provided on the spring receiving member 31 positioned at a back side (image side) of the adjustment cam member 30, are exposed at the object side.

Figure 20:
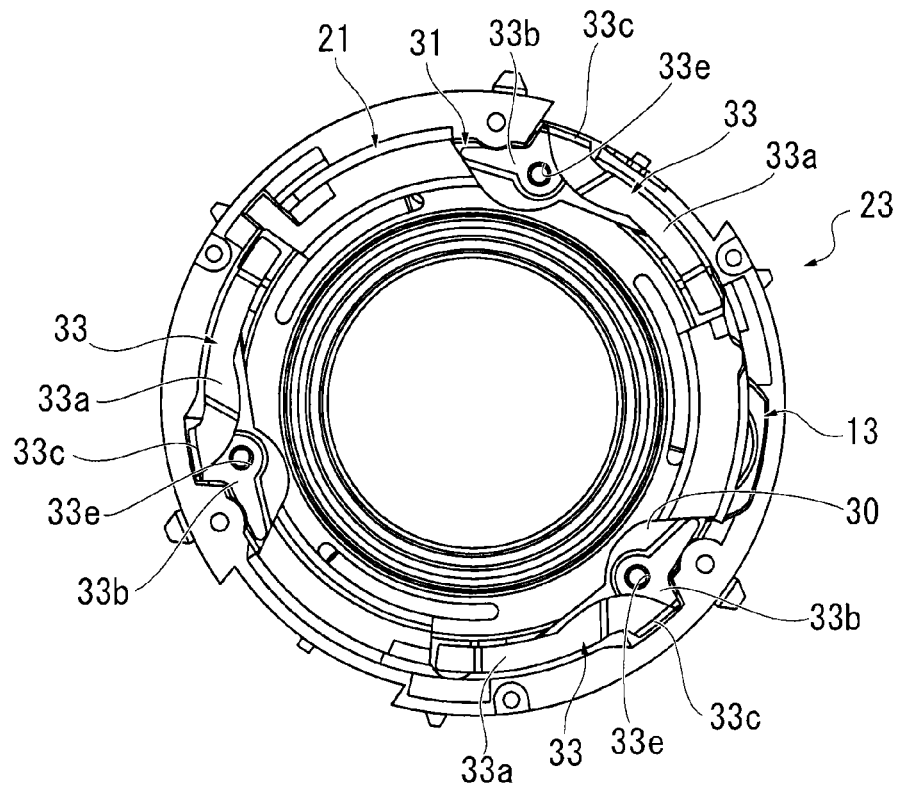
FIG. 20 is an explanatory view showing a state where each second biasing member 33 is disposed in the linearly-moving cylinder 23 of FIG. 19.

Next, as shown in FIG. 20, the second biasing members 33 are disposed on the three second fixing holes 31b and the three second fixing projections 31d (see FIG. 19) of the spring receiving member 31 exposed at the object side, respectively. Each second biasing member 33 is disposed so as to allow the attachment plate portion 33b to come into contact with the upper surface (object-side surface) of the spring receiving member 31 via the peripheral notched portion 21g of the first lens holding frame 21 and the peripheral notched portion 30d of the adjustment cam member 30 while the pressing arm portion 33a is slid along the object-side peripheral portion of the first lens holding frame 21 (see FIGS. 4 and 5). At that time, the attachment inserting hole 33e is positionally matched with the second fixing hole 31b (see FIG. 14) of the spring receiving member 31 in the OA direction and the second fixing projection 31d (see FIG. 14) of the spring receiving member 31 is inserted into the positioning inserting hole 33f (see FIG. 11). Therefore, in each second biasing member 33, the pressing part 33d of the pressing arm portion 33a comes into contact with the pressing receiving portion 21e of the first lens holding frame 21 (see FIG. 24).

Figure 21:
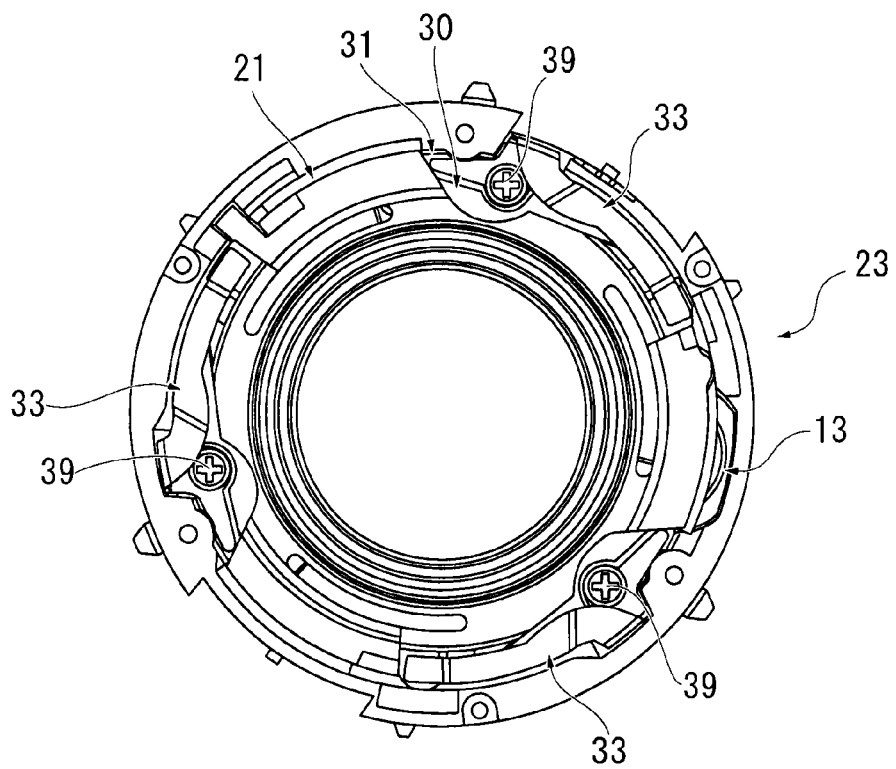
FIG. 21 is an explanatory view showing a state where each third screw member is screwed with the linearly-moving cylinder of FIG. 20.

Next, as shown in FIG. 21, each second biasing member 33 is fixed to the spring receiving member 31 through third screw members 39. The third screw members 39 are inserted into the attachment inserting holes 33e of the attachment plate portions 33b of the second biasing members 33, respectively, and are screwed with the second fixing holes 31b (see FIG. 14) of the positionally-matched spring receiving member 31. At that time, as described above, the second fixing projection 31d (see FIG. 14) of the spring receiving member 31 is inserted into the positioning hole 33f (see FIG. 11), and therefore the second biasing member 33 is prevented from rotating about the third screw member 39 (that is, the axis line) with respect to the spring receiving member 31.

Figure 22:
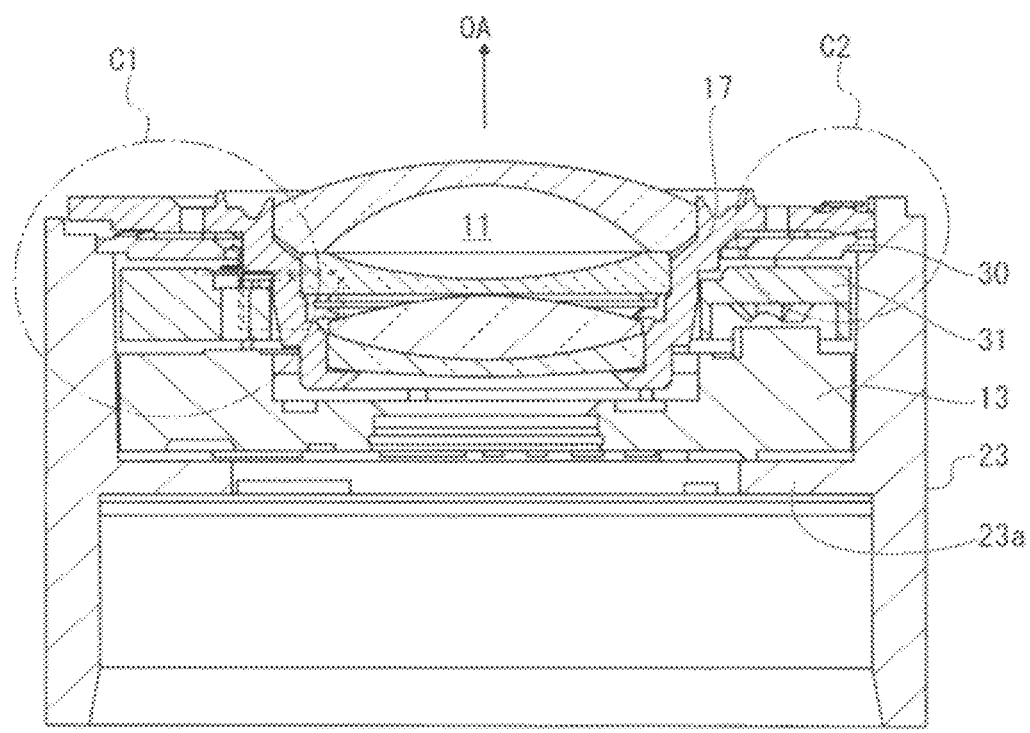
FIG. 22 is a section view schematically showing the linearly-moving cylinder where each part is assembled.
Figure 25:
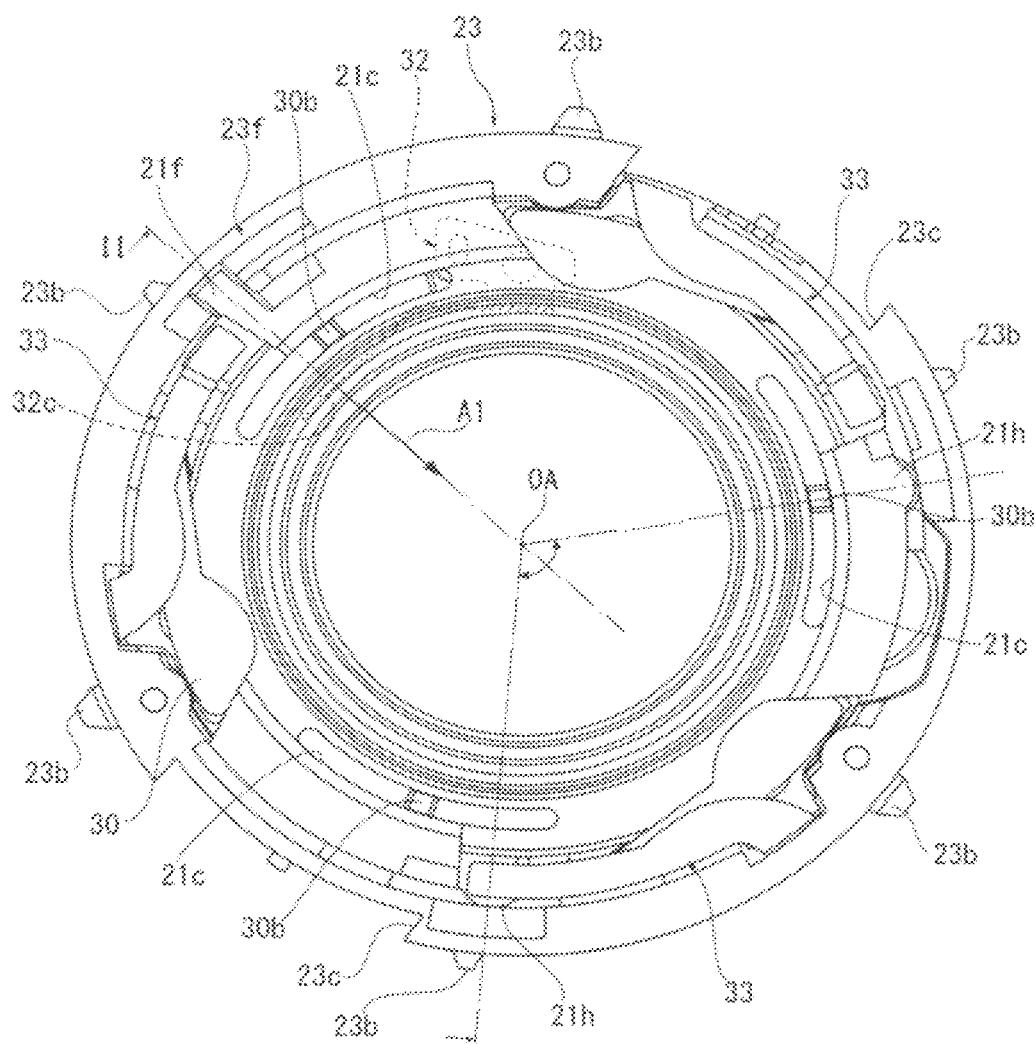
FIG. 25 is an explanatory view showing the linearly-moving cylinder where each member is assembled as viewed from an object side in a direction of a photographic optical axis OA.

Thereby, in the front-side (object-side) space of the flange portion 23a of the linearly-moving cylinder 23, as shown in FIG. 2, the first lens group 11 and the shutter/aperture unit 13 are assembled with the above-described members. The stepped frame portion 34 is provided at an object side from these so as to surround the front-surface peripheral portion (outside position from an effective area) of the first lens group 11. A schematic sectional view of the linearly-moving cylinder 23 assembled as described above is shown in FIG. 2, an enlarged sectional view of a circled area C1 shown by a dot-chain line is shown in FIG. 23, and an enlarged sectional view of a circled area C2 shown by a do-chain line is shown in FIG. 24. FIG. 22 is a sectional view obtained by a line II-II in FIG. 25. FIG. 25 is an explanatory view showing the linearly-moving cylinder 23 where each member is assembled, viewed in the OA direction.

The first lens holding frame 21 contained in the linearly-moving cylinder 23, as shown in FIGS. 22, 23 and 25, is pressed by the first biasing member 32 (that is, the pressing part 32c) received by the outer circumferential surface. The first biasing member 32 is capable of applying a biasing force in a direction along the attachment surface to which the attachment plate portion 32b is attached. The attachment plate portion 32b is attached to the spring receiving portion 31 extending along a plane orthogonal to the photographic optical axis OA and is capable of applying a biasing force (see arrow A1) on the first lens holding frame 21 toward the photographic optical axis OA against the contact part of the pressing part 32c. Therefore, the first lens holding frame 21 is biased toward the photographic optical axis OA from the pressing part 32c (that is, the contact part) along the plane orthogonal to the photographic optical axis OA (see arrow A1 in FIGS. 23 and 25). In the first lens holding frame 21, as shown in FIG. 25, the two contact projection portions 21h come into contact with the inner circumferential surface of the linearly-moving cylinder 23 and therefore the first lens holding frame 21 is positioned in a direction orthogonal to the photographic optical axis OA with respect to the linearly moving cylinder 23. At that time, in the first lens holding frame 21, the fitted projection 21*f* is fitted into the fitting portion 23*f* of the linearly-moving cylinder 23 and therefore the first lens holding frame 21 is prevented from rotating about the photographic optical axis OA with respect to the linearly-moving cylinder 23. Especially, in this embodiment, both of the contact projection portions 21*h* are positioned symmetrically with respect to a line in a biasing direction (see arrow A1) of the first biasing member 32 toward the first lens holding frame 21. Therefore, the biasing force from the first biasing member 32 can be evenly distributed into each contact projection portion 21*h* to be stably positioned. Therefore, the first biasing member 32 (that is, the spring receiving member 31 to which the first biasing member 32 is fixed) and both of the contact projection portions 21*h* function as a mechanism for positioning the first lens holding frame 21 in the direction along the plane orthogonal to the photographic optical axis OA with respect to the linearly-moving cylinder 23. Furthermore, the first biasing member 32 is only necessary to have the above-described function and is not limited to this embodiment and may be a tension spring, a compression spring, a torsion coil spring, or the like, other than a plate spring. Here, the first biasing member 32 has preferably configuration capable of suppressing increase of a length dimension in the OA direction (thickness dimension), as described below.

Furthermore, the first lens holding frame 21 is pressed by each second biasing member 33 (pressing part 33*d*) received by the outer circumferential surface. Each second biasing member 33 is capable of applying a biasing force in the direction orthogonal to the attachment surface to which the attachment plate portion 33*b* is attached and the attachment plate portion 33*b* is attached to the spring receiving member 31 extending along the plane orthogonal to the photographic optical axis OA. Therefore, the pressing part 33*d* biases the corresponding pressing receiving portion 21*e* of the first lens holding frame 21 toward the image side (a side of the flange portion 23*a* within the space in the linearly-moving cylinder 23) in the OA direction (see arrow A2 of FIG. 24). In the first lens holding frame 21, as shown in FIG. 24, the pressing projection 21*d* is provided on the back side, which is opposite to the pressing receiving portion 21*e* in the OA direction and the pressing projection 21*d* comes into contact with the adjustment cam surface 30*c* of the adjustment cam member 30. Each engagement edge portion 30*a* of the adjustment cam member 30 is engaged with each fitting groove 23*g* of the linearly-moving cylinder 23 from the object side in the OA direction. The spring receiving member 31 to which the attachment plate portion 33*b* is attached is fixed to the flange portion 23*a* of the linearly-moving cylinder 23 via the shutter/aperture unit 13 through the three second screw members 38 (see FIGS. 7 and 17). Therefore, each second biasing member 33 biases the first lens holding frame 21 and the adjustment cam member 30 from the object side toward the linearly-moving cylinder 23 in the OA direction (see arrow A2). Thereby, the first lens holding frame 21 is pressed toward the image side (the side of the flange portion 23*a*) and is positioned in the OA direction. The second biasing member 33 is only necessary to have the above-described function and is not limited to this embodiment and may be a tension spring, a compressing spring, a torsion coil spring, or the like, other than a plate spring. The second biasing member 33 has preferably a configuration capable of suppressing increase of a length dimension (thickness dimension) in the OA direction, as described below.

At that time, the fitted projection 21*f* is fitted into the fitting portion 23*f* of the linearly-moving cylinder 23 and therefore the first lens holding frame 21 is prevented from rotating about the photographic optical axis OA with respect to the linearly-moving cylinder 23 and the adjustment cam member 30 is capable of relatively rotating about the photographic optical axis OA in the linearly-moving cylinder 23. Furthermore, in each second biasing member 33, the pressing arm portion 33*a* and the attachment plate portion 33*b* are disposed with an interval capable of receiving the peripheral portion of the adjustment cam member 30 in a thickness direction (OA direction) through the connection arm portion 33*c* and the adjustment cam member 30 is prevented from inhibiting rotation. Moreover, the spring receiving member 31 to which the attachment plate portion 33*b* of each second biasing member 33 is attached is fixed to the flange 23*a* of the linearly-moving cylinder 23 via the shutter/aperture unit 13 through the three second screw members 38 (see FIGS. 7 and 17). In addition, each adjustment engagement hole 30*b* of the adjustment cam member 30 is exposed at the object side via the corresponding arc-like hole 21*c* (see FIGS. 4 and 25) and each arc-like hole 21*c* has an arc-like shape adapted to movement trajectory of each adjustment engagement hole 30*b* in accordance with rotation of the adjustment cam member 30. Therefore, in the linearly-moving cylinder 23 in which each member is assembled, an engagement portion of a not-illustrated rotating member (rotating device) is inserted into each adjustment engagement hole 30*b* via each arc-like hole 21*c*, and each adjustment engagement hole 30*b*, that is, the adjustment cam member 30 is capable of rotating via the engagement portion. The spring receiving member 31 to which each second biasing member 33 is attached and the first lens holding frame 21 pressed by each second biasing member 33 do not rotate with respect to the linearly-moving cylinder 23. Therefore, the contact position of the pressing projection 21*d* pressing the adjustment cam member 30 by the bias of each second biasing member 33 (see arrow A2 in FIG. 24) with the adjustment cam surface 30*c* changes according to the rotational orientation of the adjustment cam member 30. The adjustment cam surface 30*c* is formed as a spiral inclined surface gradationally projecting toward the object side with the positional change in the circumferential direction. Therefore, the first lens holding frame 21 (that is, the first lens group 11 held thereto) is capable of moving in the OA direction while maintaining a positioned state in the direction along a plane orthogonal to the photographic optical axis OA by the first biasing member 32 based on the adjustment cam member 30 as a reference, which does not move in the OA direction with respect to the linearly-moving cylinder 23. Especially, in this embodiment, the adjustment cam surface 30*c* and the pressing projection 21*d* are provided at three positions with an even interval in the circumferential direction to stably move the first lens holding frame 21 (the first lens group 11 held thereto) in the OA direction. Therefore, each second biasing member 33, the spring receiving member 31 to which each second biasing member 33 is fixed, and the adjustment cam member 30 function as a mechanism for positioning the first lens holding frame 21 in the OA direction with respect to the linearly-moving cylinder 23 as well as a mechanism for adjusting a position of the first lens holding frame 21 (that is, the first lens group 11 held thereto) in the OA direction while maintaining a state where the first lens holding frame 21 is positioned in the direction along the plane orthogonal to the photographic optical axis OA by the first biasing member 32. In other words, the above-described positioning mechanism is capable of adjusting a position holding the first lens holding frame 21 in the OA direction in the linearly-moving cylinder 23.

As described above, in the back-side (image side) space of the flange portion 23a of the linearly-moving cylinder 23, the second lens holding frame 22 holding the second lens group 12 and the rotary cam unit 26 is contained and held (see FIG. 2). In the linearly-moving cylinder 23, as shown in FIGS. 2 and 6, in the space, the three guide shafts (the first guide shaft 51, the second guide shaft 52, and the third guide shaft 53) are provided. Each guide shaft is provided to position the second lens holding frame 22 in the space and extends in the OA direction. The three guide shafts 51, 52, and 53 are disposed with predetermined intervals around the photographic optical axis OA. In this embodiment, the second guide shaft 52 and the third guide shaft 53 are disposed symmetrically with respect to a line in a direction from the first guide shaft 51 to the photographic optical axis OA (see FIG. 41). In the flange portion 23a, one end 55b of the later-described fourth biasing member 55 is fixed between the first guide shaft 51 and the second guide shaft 52 and between the second guide shaft 52 and the third guide shaft 53. In this space, the first rotary cam cylinder 56 and the second rotary cam cylinder 57 which form the rotary cam unit 26 are provided to move the second lens holding frame 22 in the linearly-moving cylinder 23 (see FIGS. 26 and 27).

The first rotary cam cylinder 56 has, as shown in FIG. 26, a cylinder shape capable of being fitted in the linearly-moving cylinder 23. An annular concave portion 56a having a convex shape with respect to a cylindrical inner circumferential surface is provided on the first rotary cam cylinder 56, as shown in FIG. 28. The annular concave portion 56a has a forward-backward cam surface 56b at the object-side edge portion (upper side of FIG. 28) and a rotary engagement portion 56c at a predetermined position in the circumferential direction. First key projections 56d and second key projections 56e are provided on the outer circumferential surface of the first rotary cam cylinder 56. The first key projection 56d extends from the image-side end portion (lower side in FIG. 28) on the outer circumferential surface of the first rotary cam cylinder 56 in the radial direction from the photographic optical axis OA along the plane orthogonal to the photographic optical axis OA. The first key projection 56d extends from an extending-out end to the object side (upper side in FIG. 28) as a tip portion and has an L-like plate shape as a whole in section orthogonal to the outer circumferential surface of the first rotary cam cylinder 56. The first key projection 56d is capable of bridging over the image-side end portion of the linearly-moving cylinder 23 and the tip end portion is capable of extending along the outer circumferential surface of the linearly-moving cylinder 23 (see FIG. 26). The tip end portion is engaged with the linear groove 24b (see FIG. 3) formed on the inner circumferential surface of the rotary cylinder 24. Therefore, the first rotary cam cylinder 56 rotates about the photographic optical axis OA integrally with the rotary cylinder 24 in the linearly-moving cylinder 23 and is capable of relatively moving with respect to the rotary cylinder 24 in the OA direction (photographic path).

The second key projection 56e extends from an object-side (upper side in FIG. 28) end portion on the outer circumferential surface of the first rotary cam cylinder 56 in a radial direction. The second key projection 56e is engaged with the annular groove 23d via an opened end 23e formed on an inner circumferential surface of the linearly-moving cylinder 23 (see FIGS. 2 and 6). Therefore, the first rotary cam cylinder 56 is prevented from moving in the OA direction and is capable of rotating with respect to the linearly-moving cylinder 23 in the linearly-moving cylinder 23.

Figure 29A:
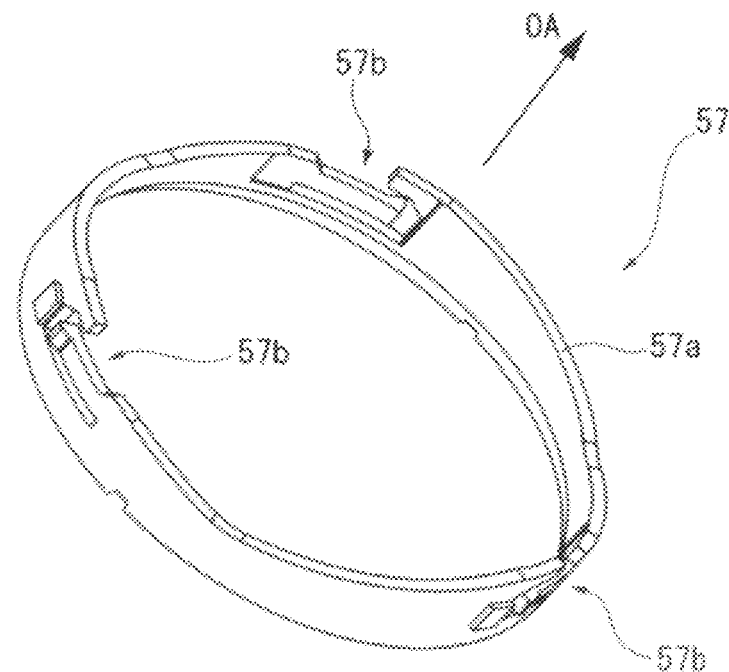
FIG. 29A is a perspective view schematically showing the second rotary cam cylinder as viewed from the object side.
Figure 29B:
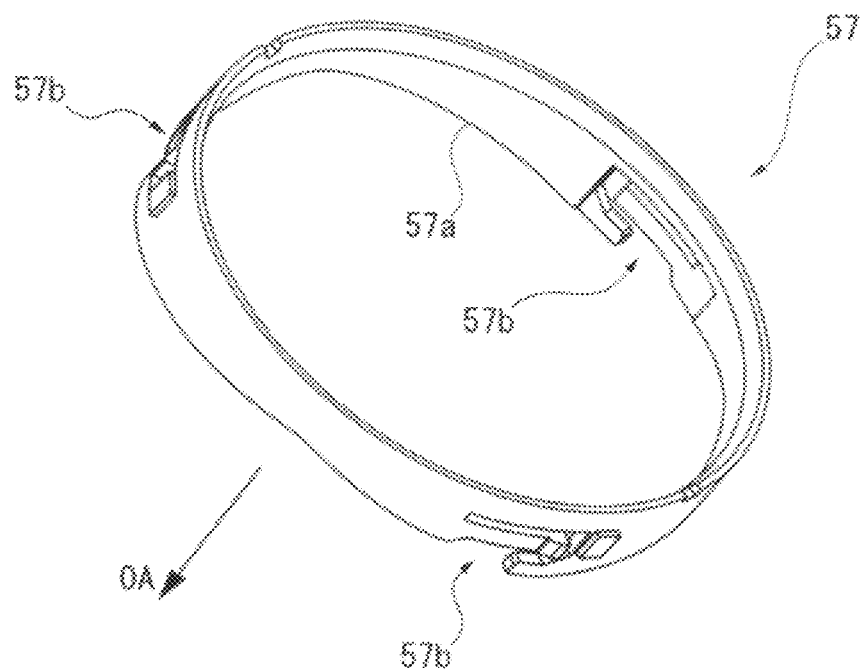
FIG. 29B is a perspective view schematically showing the second rotary cam cylinder as viewed from the image side.

The second rotary cam cylinder 57 is disposed in the annular concave portion 56a of the first rotary cam cylinder 56 (see FIG. 27). The second rotary cam cylinder 57 has, as shown in FIG. 29, a cylindrical form which is an annular plate member and has a size capable of internally coming into contact with the first rotary cam cylinder 56 (see FIGS. 26 and 27). The second rotary cam cylinder 57 has an auxiliary cam surface 57a at the image-side edge portion (upper side in FIG. 29A) and a rotary engagement portion 57b on a circumferential wall surface at a predetermined position in the radial direction. The second rotary cam cylinder 57 is fitted into the annular concave portion 56a of the first rotary cam cylinder 56 from the image-side end portion so as to allow the auxiliary cam surface 57a to face the forward-backward cam surface 56b. The rotary engagement portion 57b is engaged with the rotary engagement portion 56c and thereby the second rotary cam cylinder 57 is installed in the first rotary cylinder 56 (see FIGS. 26 and 27). In a cylindrical body (see FIG. 27) where the second rotary cam cylinder 57 is fitted into the first rotary cam cylinder 56, as shown in FIG. 30, the forward-backward cam surface 56b and the auxiliary cam surface 57a face each other in the OA direction in the inner circumferential surface, that is, the annular concave portion 56a of the first rotary cam cylinder 56. Therefore, a forward-backward cam groove is formed on the inner circumferential surface by the forward-backward cam surface 56b and the auxiliary cam surface 57a. The later-described guide fitting portion 43 (cam projection 43a) of the second lens holding frame 22 is engaged with the forward-backward cam groove. The cylindrical body is, as described above, capable of rotating integrally with the rotary cylinder 24 about the photographic optical axis OA and capable of moving with respect to the rotary cylinder 24 in the OA direction. The cylindrical body is prevented from moving in the OA direction with respect to the linearly-moving cylinder 23 and is capable of rotating with respect to the linearly-moving cylinder 23. The cylindrical body is provided in the back-side space of the flange portion 23a of the linearly-moving cylinder 23. In the space, the second lens group 12 is held by the second holding frame 22 supported in the linearly-moving cylinder 23 via the rotary cam unit 26 (see FIGS. 2 and 41).

Figure 31A:
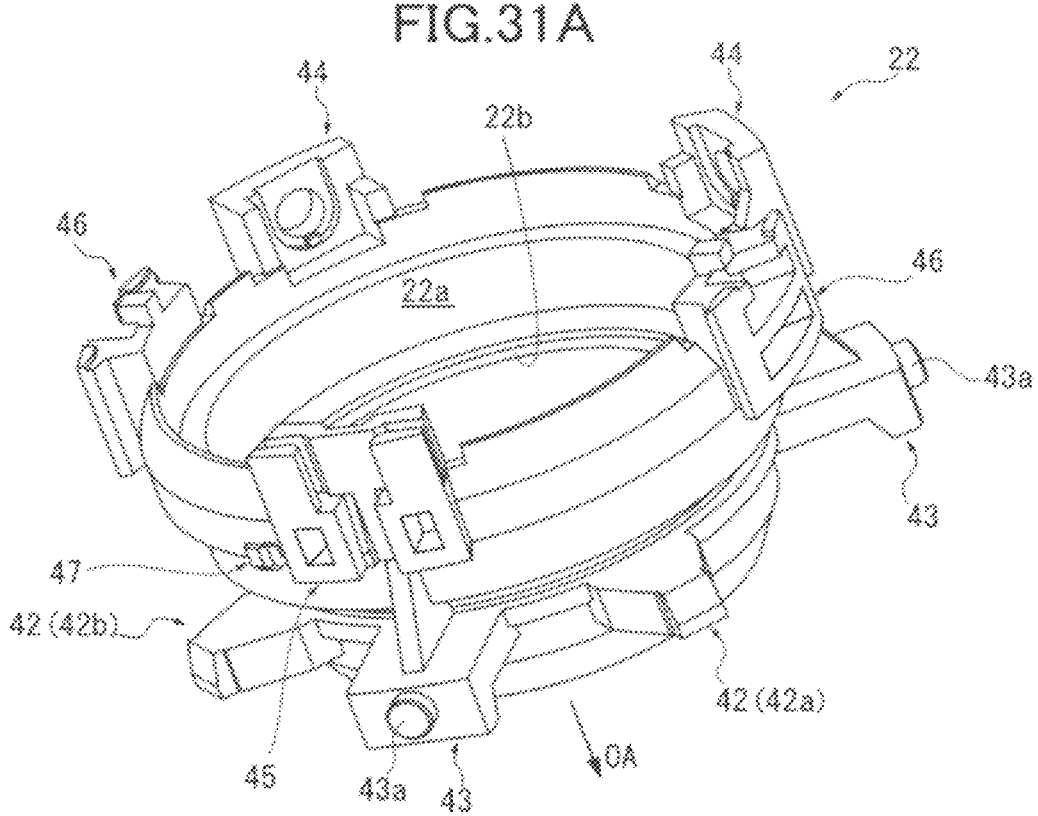
FIG. 31A is a perspective view schematically showing the second lens holding frame in an orientation where a radial biasing member holding portion is positioned at a near side.
Figure 31B:
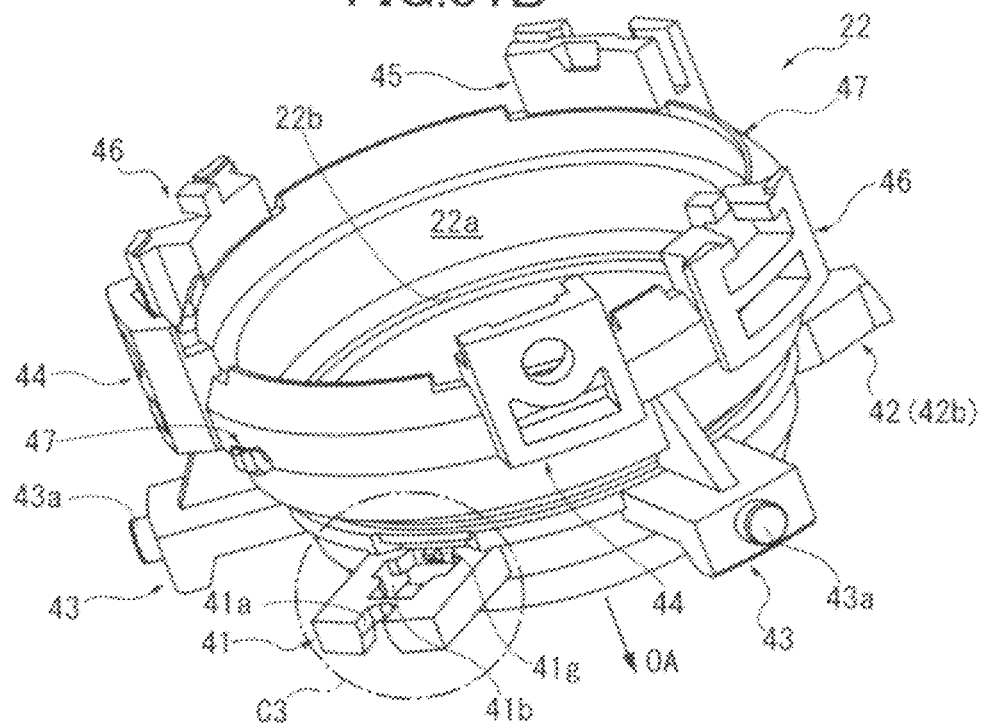
FIG. 31B is a perspective view schematically showing the second lens holding frame in an orientation where a biasing mechanism holding portion is positioned at the near side.

The second lens holding frame 22 has, as shown in FIG. 31, a cylindrical shape as a whole and a large-stepped shape, which has relatively large diameter (outer diameter based on the photographic optical axis OA as a reference in a radial direction) at a back side (image side) end (upper side in FIG. 31). The second lens holding frame 22 has an outer diameter capable of being inserted into the back side of the flange portion 23a of the linearly-moving cylinder 23 and is not capable of being inserted into an inner side of the flange portion 23a (inner-diameter position defined by the flange portion 23a) (see FIGS. 2 and 41).

In the second lens holding frame 22, the holding hole 22a penetrating along the photographing optical axis OA at a center position is provided to hold the second lens group 12. The holding hole 22a has a large inner diameter portion capable of fitting a spacing ring 66 and the adjustment lens holding frame 61 (see FIG. 2) at the back side (image side, which is an upper side in FIG. 31). The holding hole 22a has a small inner diameter portion, which has a smaller diameter than the large inner diameter portion and is adapted to each lens of the second lens group 12 except for the most image side (right side in FIG. 2) lens at the front side (see FIG. 2). Therefore, a center axis line of the holding hole 22a is an optical axis of the second lens group 12 and, in this embodiment, basically, the optical axis of the second lens group 12 is matched with the photographic optical axis OA. An inner edge projection portion 22b for preventing the contained and fitted second lens group 12 from falling or removing is provided at a front side (object side) of the small inner diameter portion, that is, a front end of the second lens holding frame 22. In the second lens holding frame 22, the second lens group 12 (except for the most image side lens), the spacing ring 66, and the adjustment lens holding frame 61 (the most image-side lens) are inserted via an opening at the large inner diameter portion side in this order and contained (see FIG. 2).

The lens barrel 10 may further include a biasing mechanism holding portion 41 provided on the lens holding frame 22. The biasing mechanism (48, 54) is held by the biasing mechanism holding portion 41 so as to bias the lens holding frame 22 in a radial direction from the optical axis of the lens group 12. The biasing mechanism (48,54) may have a spring receiving member 48 capable of coming into contact with the first guide shaft 51 and a biasing member 54 configured to press the first guide shaft 51 via the spring receiving member 48, and the biasing mechanism holding portion 41 is configured to hold the spring receiving member 48 movably along the biasing direction of the biasing mechanism 48.

In this embodiment, the biasing mechanism holding portion 41, two contact projection portions 42, three guide fitting portions 43, two cam receiving portions 44, a radial biasing member holding portion 45, two axis biasing member holding portion 46, and two engagement projection portions 47 are provided in the second lens holding frame 22.

Figure 32:
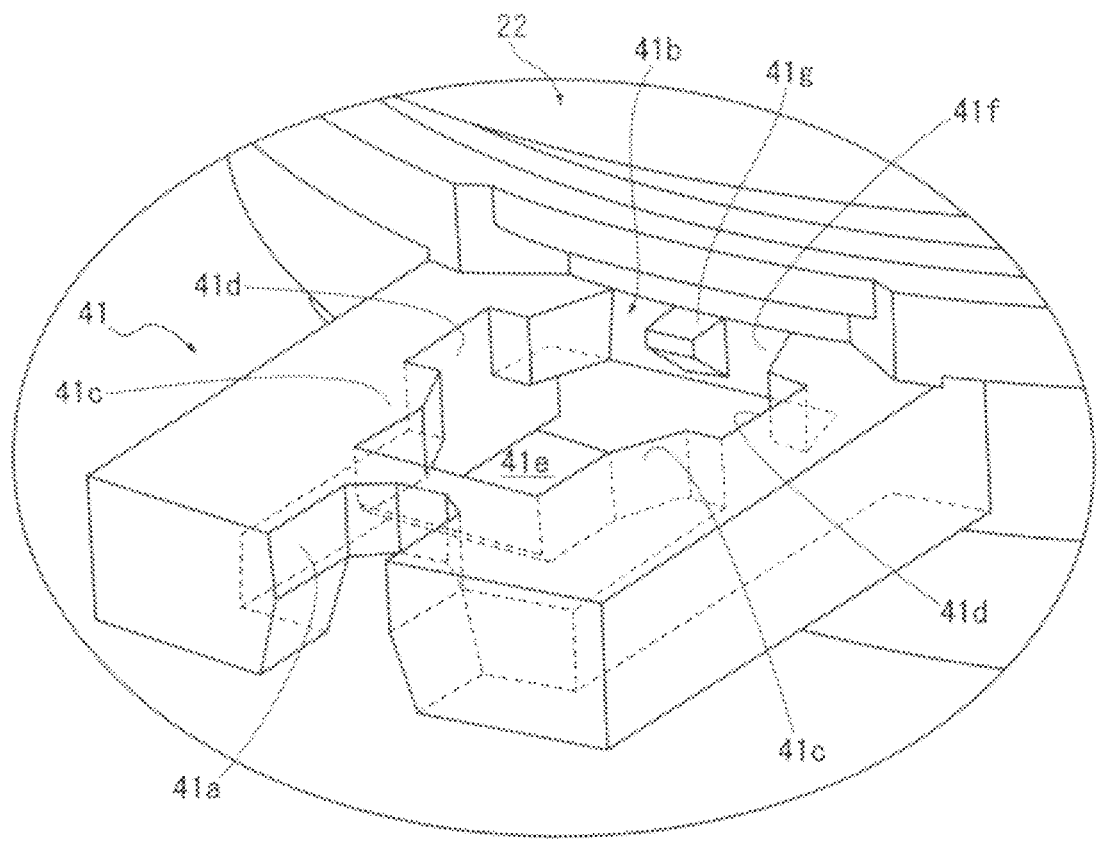
FIG. 32 is an enlarged section view of C3 shown by a dot chain line in FIG. 31B.

The biasing mechanism holding portion 41 has, as shown in FIG. 32, a plate like form extending in a radial direction from the outer circumferential surface of the second lens holding frame 22 and a bearing concave part 41a and a holding through hole 41b are provided in the biasing mechanism holding portion 41. The bearing concave part 41a is formed by notching an extending end of the biasing mechanism holding portion 41 to be opened. The bearing concave part 41a has an U-shape in section along a plane orthogonal to the photographic optical axis OA (an axis line of the second lens holding frame 22 and is capable of receiving, slidably in an extending direction, the first guide shaft 51 provided on the flange portion 23a of the linearly-moving cylinder 23 (see FIGS. 37 to 39).

The holding through hole 41b is a part holding the later-described spring receiving member 48 and the third biasing member 54 (see FIG. 33) and is formed by penetrating the biasing mechanism holding portion 41 in the OA direction. The holding through hole 41b and the bearing concave part 41a communicate with each other at the front side part (object side, which is a lower side in FIG. 32) (see FIGS. 32 and 35). At the back side portion in the holding through hole 41b (image side, which is an upper side in FIG. 32), guide projections 41c which are in a pair in the circumferential direction about the photographic optical axis OA are provided. The pair of guide projections 41c has plate-like forms extending in radial directions of the second lens holding frame 22 and notched parts 41d are provided in a pair in the circumferential direction thereon at center positions in the extending direction. Therefore, at the back side portion of the holding through hole 41b, the interval is reduced in the circumferential direction by the pair of guide projections 41c. At the parts where the pair of notched parts 41d are provided, the interval is increased in the circumferential direction. Thereby, in the holding through hole 41b, at a front-side (object side, which is a lower side in FIG. 32) part communicating with the bearing concave part 41a, an engagement concave part 41e is formed in a rectangular form which has a relatively large interval to that at the back side portion in a circumferential direction and is elongated in a radial direction. In the engagement concave part 41e, as mentioned above, the bearing concave part 41a and the holding through hole 41b communicate with each other. In the holding through hole 41b, a supporting projection 41g is provided at an inner end surface (an outer circumferential surface of the second lens holding frame 22) 41f at a side of the photographic optical axis OA.

Figure 33:
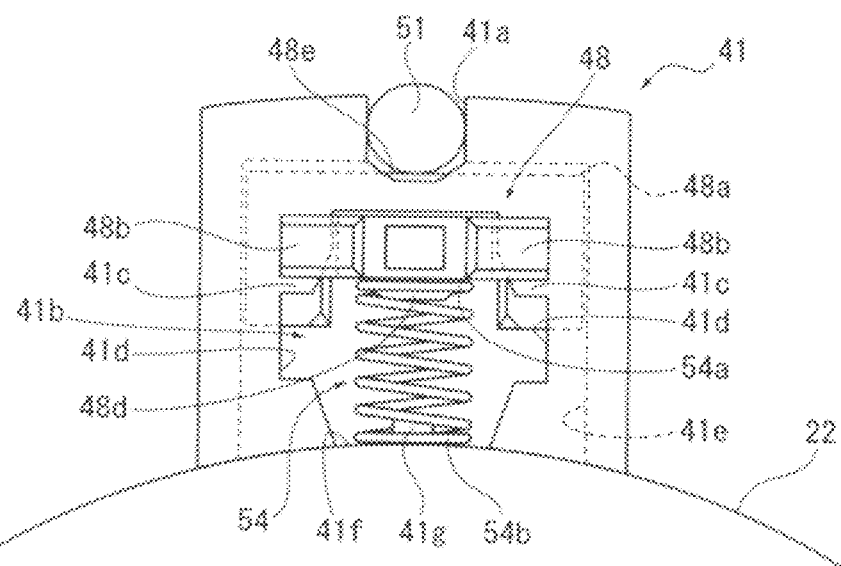
FIG. 33 is an explanatory view showing the biasing mechanism holding portion holding the spring receiving member and the third biasing member as viewed from the image side.
Figure 34A:
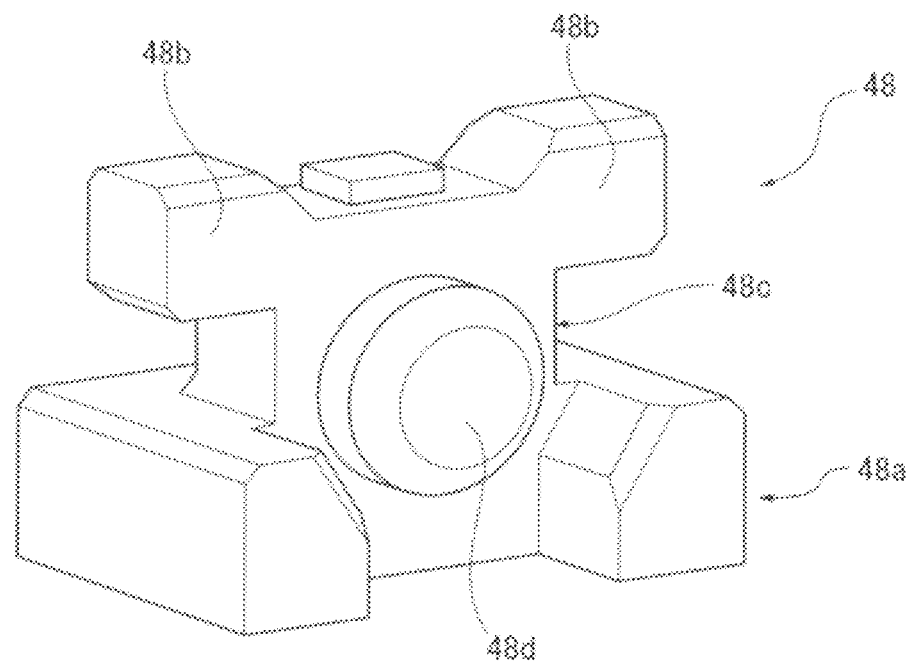
FIG. 34A is a perspective view schematically showing the spring receiving member as viewed from a side of a supporting projection.
Figure 34B:
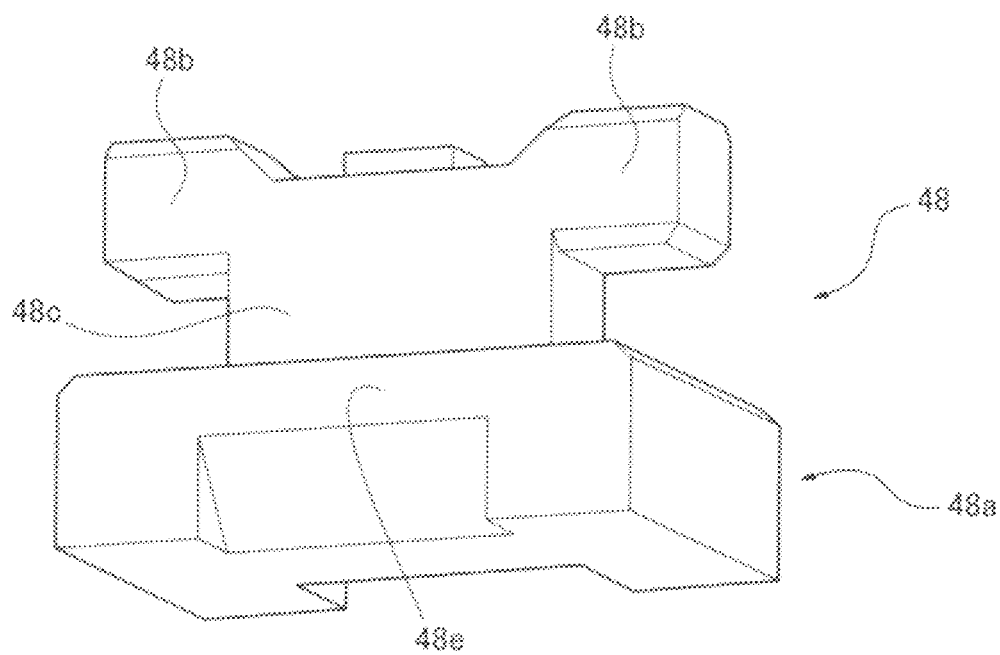
FIG. 34B is a perspective view schematically showing the spring receiving member as viewed from a side of a pressing end portion.
Figure 35A:
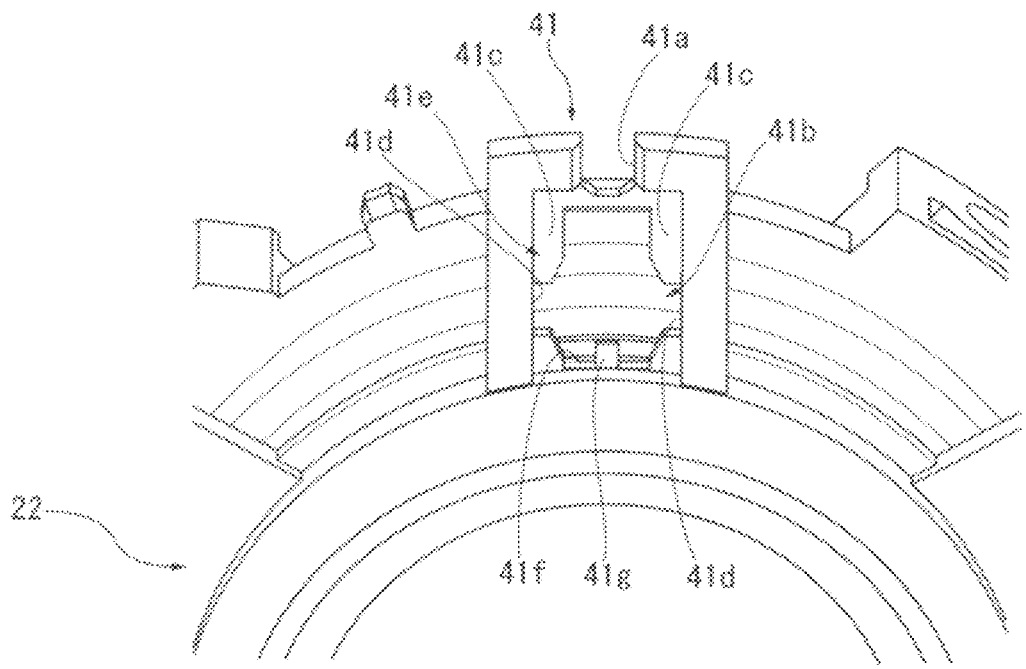
FIG. 35A is an explanatory view showing the biasing mechanism holding portion 41 as viewed from the object side.
Figure 35B:
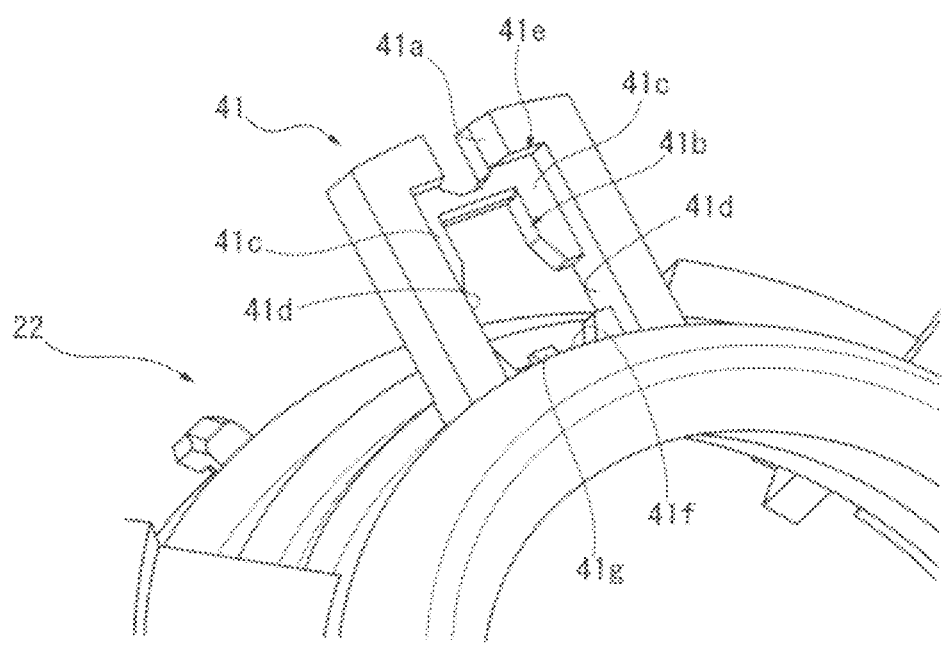
FIG. 35B is an explanatory view showing the biasing mechanism holding portion as viewed diagonally from the object side.

The spring receiving member 48 held in the holding through hole 41b is, as shown in FIG. 34, formed by an engagement portion 48a and an arm portion 48b, which are connected by a trunk portion 48c. The engagement portion 48a has a box shape capable of being inserted into the engagement concave part 41e (see FIG. 32) of the holding through hole 41b and capable of being engaged with the engagement concave part 41e in the circumferential direction. In the engaged state, the engagement portion 48a is capable of sliding in the radial direction in the engagement concave part 41e (see FIGS. 33 and 36). In the spring receiving member 48, on the trunk portion 48c, the arm portions 48b are provided so as to extend to be in a pair from both end portions opposite to the ends where the engagement portion 48a extends. The pair of arm portions 48b have a width dimension capable of being inserted between the pair of notched parts 41d and not capable of being inserted between the pair of guide projections 41c. The pair of arm portion 48b has an interval with the engagement portion 48a (which is an interval in height in FIG. 34), where the guide projection 41c (see FIG. 32) of the holding through hole 41b is capable of being inserted. On the trunk portion 48c connecting therebetween, a supporting projection 48d is provided. The engagement portion 48a has a flat plane pressing end portion 48e, which is opposite plane in the extending direction of the supporting projection 48d.

The spring receiving member 48 is moved with respect to the holding through hole 41b of the biasing mechanism holding portion 41, outwardly in the radial direction in a state where the pair of arm portions 48b are inserted between the pair of notched parts 41d from a side of the engagement concave part 41e (object side, which is a lower side in FIG. 32) and the engagement portion 48a is engaged with the engagement concave part 41e. Thereby, the spring receiving member 48 is provided movably in the radial direction of the second lens holding frame 22 in the holding through hole 41b (see FIGS. 36 to 40). In this state, the bearing concave part 41a and the holding through hole 41b communicate with each other by the engagement concave part 41e so that the pressing end portion 48e of the engagement portion 48a is capable of being inserted into the bearing concave part 41a (see FIG. 33). Therefore, the spring receiving member 48 movably held by the holding through hole 41b in the radial direction allows the first guide shaft 51 held by the bearing concave part 41a to come into contact with the pressing end portion 48e (see FIG. 33). The spring receiving member 48 is provided to transmit the biasing force from the third biasing member 54 appropriately to the first guide shaft 51.

Figure 36A:
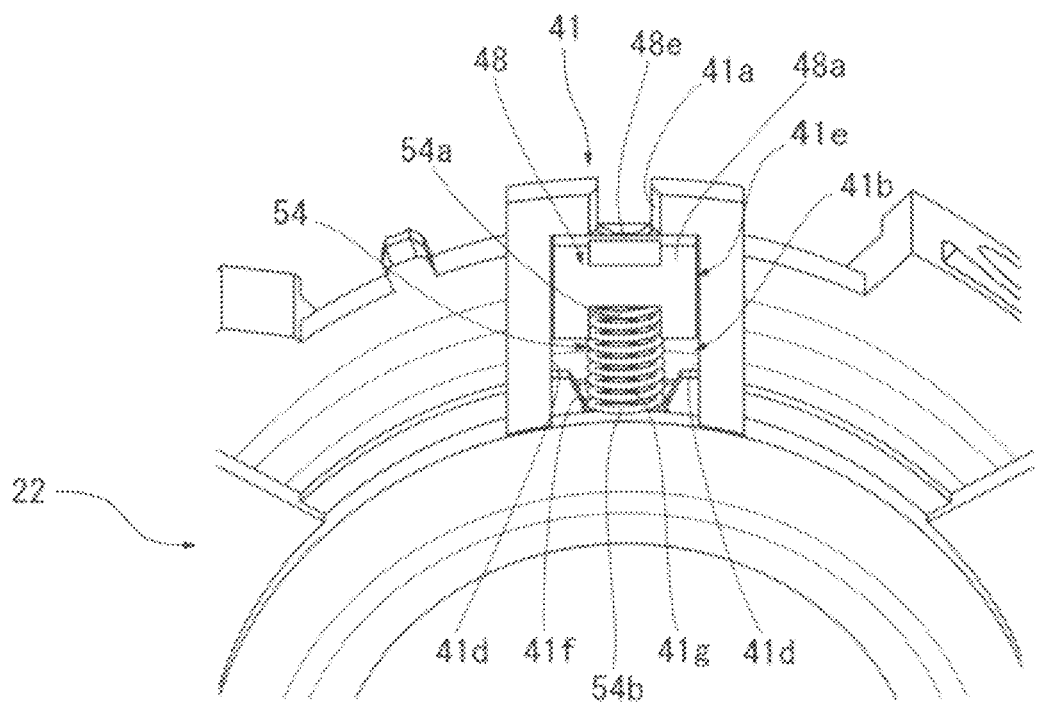
FIG. 36A is an explanatory view showing the biasing mechanism holding portion holding the spring receiving member and the third biasing member.
Figure 36B:
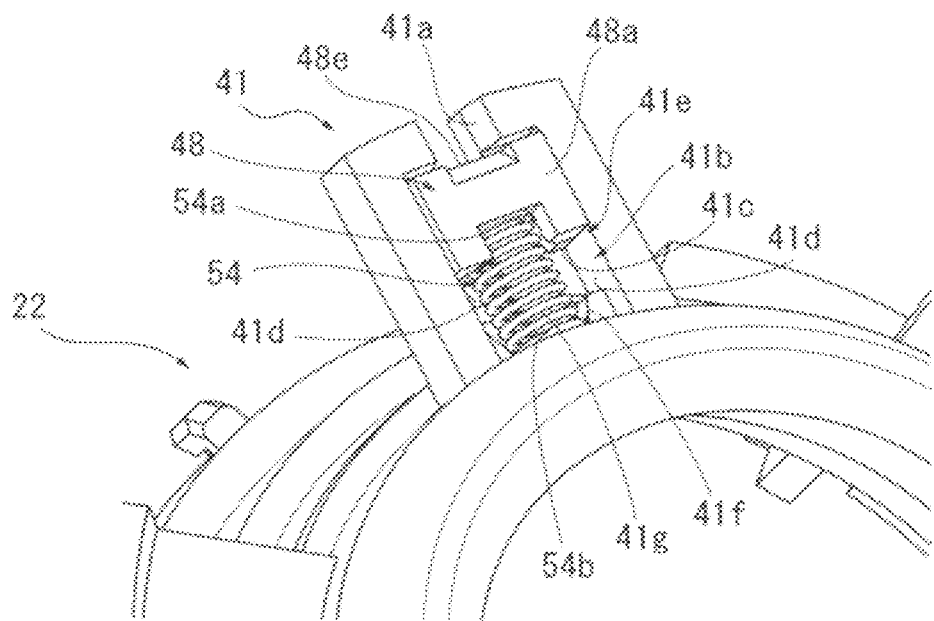
FIG. 36B is an explanatory view showing the biasing mechanism holding portion holding the spring receiving member and the third biasing member.

The third biasing member 54, as shown in FIGS. 33 and 36, biases the spring receiving member 48 toward the first guide shaft 51 between the inner end surface 41f and the spring receiving member 48 in the holding through hole 41b. The third biasing member 54 is, in this embodiment, a compressing spring and is provided such that an end 54a receives the supporting projection 48d of the spring receiving member 48 and comes into contact with the trunk portion 48c and the other end 54b receives the supporting projection 41g and comes into contact with the inner side end surface 41f in the holding through hole 41b. Therefore, the other end 54b is positioned by the supporting projection 41g in the biasing mechanism holding portion 41 and the biasing mechanism holding portion 41 biases the first guide shaft 51 via the spring receiving member 48, the movement direction of the spring receiving member 48 is controlled in the radial direction passing the supporting projection 41g by the biasing mechanism holding portion 41, so that the third biasing member 54 is configured to bias the spring receiving member 48 in a direction connecting the first guide shaft 51 and the photographic optical axis OA on the plane orthogonal to the photographic optical axis OA. The third biasing member 54 is only necessary to have the above-described function and may be a compression coil spring, a tension spring, a plate spring, a torsion coil spring, or the like and is not limited to this embodiment.

Each of the two contact projection portions 42 has, as shown in FIG. 31, a column like shape extending from the outer circumferential surface of the second lens holding frame 22 in the radial direction. One of the contact projection portions 42 (42a) is capable of coming into contact with the second guide shaft 52 and the other one of the contact projection portions 42 (42b) is capable of coming into contact with the third guide shaft 53 (see FIGS. 37 and 41) in a state where the second lens holding frame 22 is contained in the back side space of the flange 23a of the linearly-moving cylinder 23 so as to hold the first guide shaft 51 in the bearing concave part 41a of the biasing mechanism holding portion 41. Each of the contact projection portions 42 has a flat surface at an extending end surface with which the guide shaft comes into contact. The contact projection portions 42 are disposed symmetrically with respect to a biasing direction of the third biasing member 54 in the holding though hole 41b of the biasing mechanism holding portion 41 (a line in a direction connecting the first guide shaft 51 and the photographic optical axis OA on a plane orthogonal to the photographic optical axis OA) (see FIG. 37). The contact projection portions 42 are, in this embodiment, positionally set to be capable of coming into contact with the second guide shaft 52 or the third guide shaft 53 on the same plane orthogonal to the photographic optical axis as the pressing end portion 48e of the spring receiving member 48 coming into contact with the first guide shaft 51 in a state where the center axis line (lens optical axis) of the second lens holding frame 22 (the holding hole 22a) are matched with the photographic optical axis OA. The contact projection portions 42 are, as described below, provided to positioning the second lens holding frame 22 on a plane orthogonal to the photographic optical axis OA in the back-side space of the flange portion 23a of the linearly-moving cylinder 23.

Each of the three guide fitting portions 43 has a column like shape extending in the radial direction from the outer circumferential surface of the second lens holding frame 22 and has a cam projection 43a on the extending end. Each cam projection 43a is capable of being engaged with the forward-backward cam groove formed by the above-described first rotary cam cylinder 56 and the second rotary cam cylinder 57 (see FIG. 41).

Figure 38:
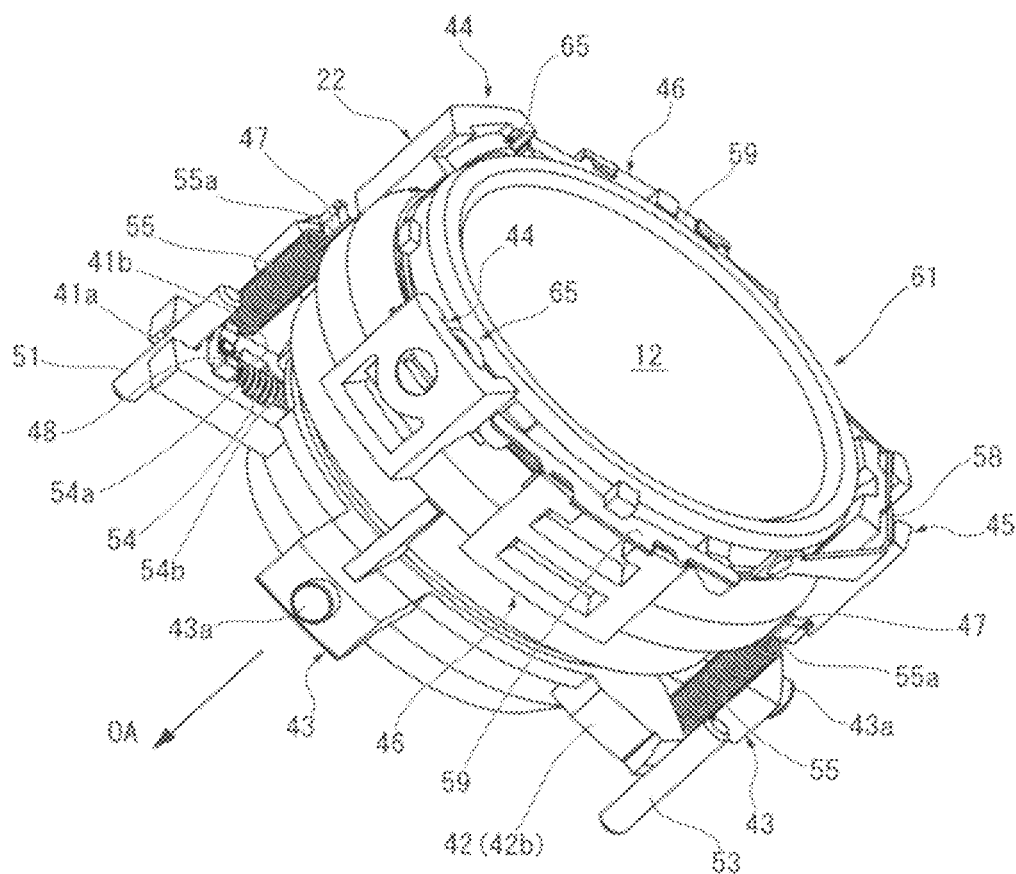
FIG. 38 is a perspective explanatory view schematically showing the configuration when the second lens holding frame is contained in the space at the back side (the image side) of the flange portion of the linearly-moving cylinder.
Figure 40:
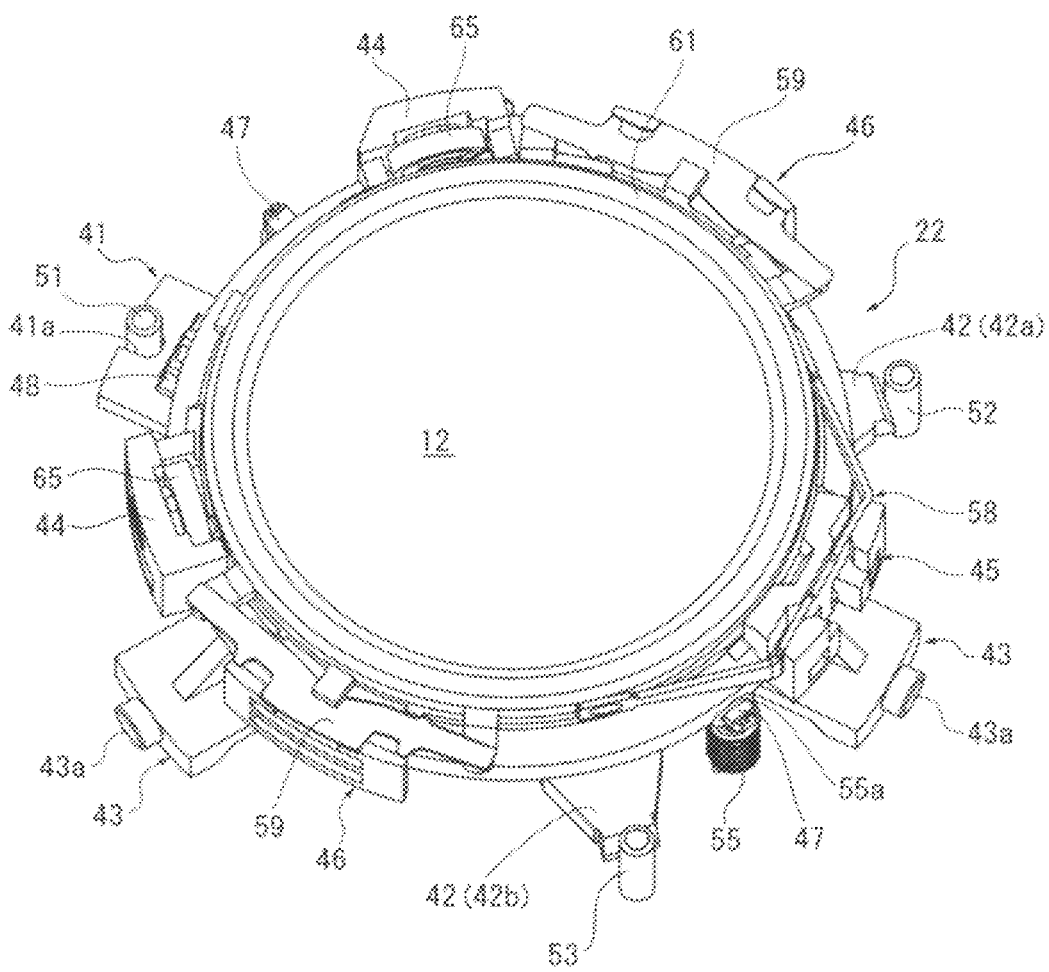
FIG. 40 is an explanatory view showing the configuration when the second lens holding frame is contained in the space at the back side (image side) of the flange portion of the linearly-moving cylinder.

Each of the two cam receiving portions 44 has a plate-like shape extending in the OA direction from the back-side (image side) edge portion of the second lens holding frame 22 (see FIGS. 38 and 40). Both of the came receiving portions 44 are capable of supporting the adjustment lens holding frame 61 via the adjustment cam member 65 (see FIG. 41).

Figure 41:
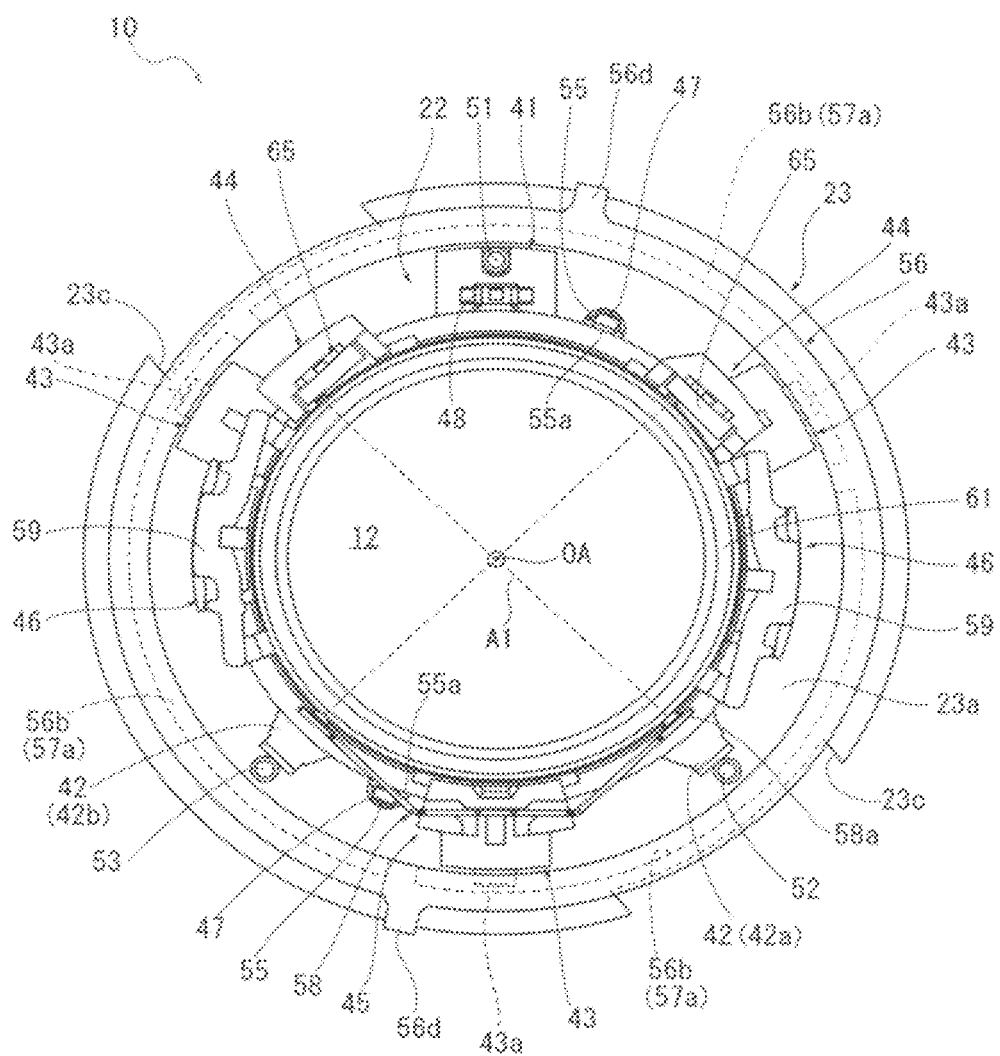
FIG. 41 is an explanatory view showing a state where the second lens holding frame is contained in the space at the back side (image side) of the flange portion of the linearly-moving cylinder on a plane viewed in an OA direction from the image side.

The radial biasing member holding portion 45 has a plate-like shape extending in the OA direction from the back-side (image side) edge portion of the second lens holding frame 22 and is provided to hold the radial biasing member 58 which is a plate spring member (see FIGS. 38 and 40). The radial biasing member 58 holds the adjustment holding frame 61 in cooperation with both of the adjustment cam member 65 by applying a biasing force to the adjustment lens holding frame 61 toward the two adjustment cam member 65 along the plane orthogonal to the photographic optical axis OA, as shown in FIGS. 38 and 41.

Figure 39:
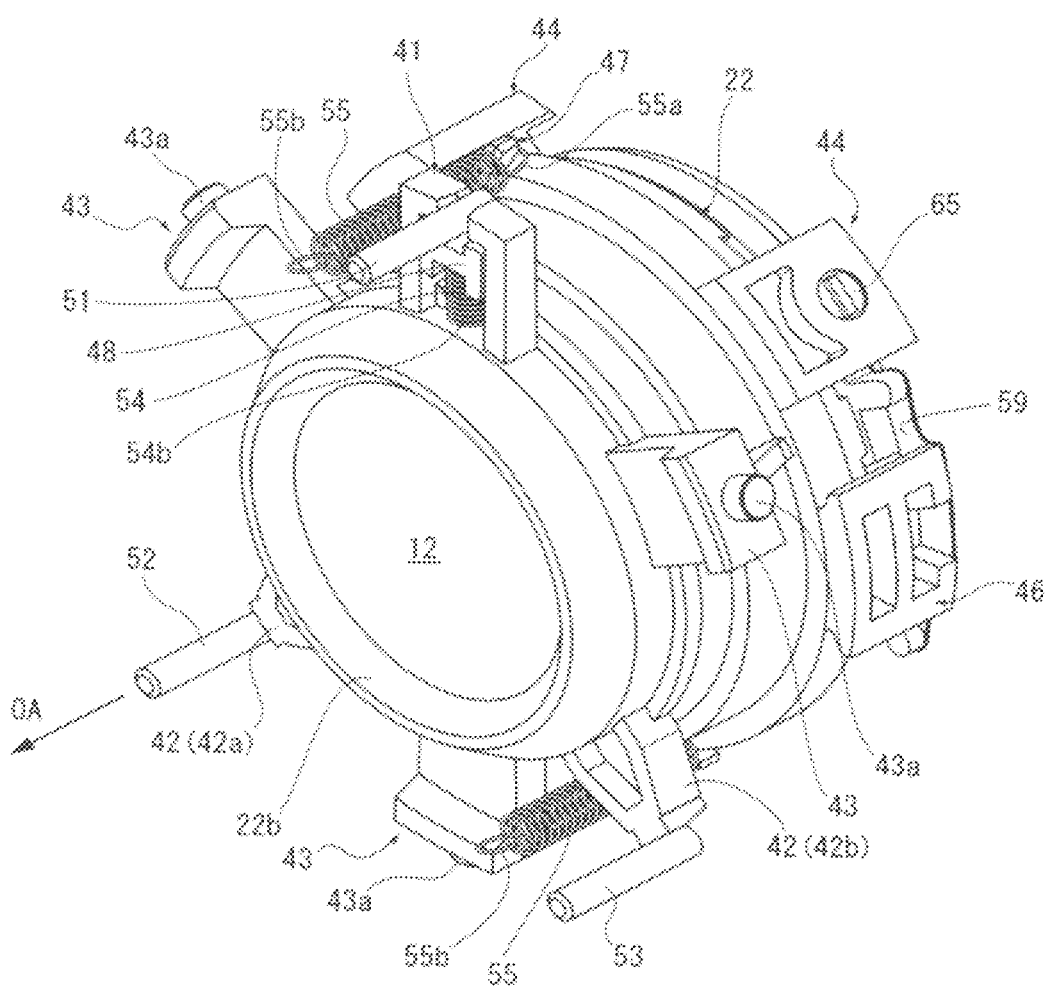
FIG. 39 is an explanatory view showing the configuration when the second lens holding frame is contained in the space at the back side (image side) of the flange portion of the linearly-moving cylinder.

Each of the two axis biasing member holding portion 46 has, as shown in FIG. 31, a plate like shape extending in the OA direction from the back-side (image side) edge portion of the second lens holding frame 22 and is provided to hold the axis biasing member 59 (see FIGS. 38 to 40). The axis biasing member 59 is, as shown in FIGS. 38 to 40, provided to apply the biasing force toward the object side in the OA direction onto the adjustment lens holding frame 61 and is formed by a plate-like spring member. Thereby, in the holding hole 22a of the second lens holding frame 22, the adjustment lens holding frame 61 (the most image-side lens of the fitted and held second lens group 12) is continuously pressed onto the spacing ring 66 toward the object side and the spacing ring 66 is continuously pressed onto the other lenses of the second lens group 12 toward the object side (see FIG. 2).

Each of the two engagement projection portions 47, as shown in FIG. 31, extends in a radial direction from the outer circumferential surface of the second lens holding frame 22 and has a plate-like shape extending from the extending end toward the image side (an upper side in FIG. 31) and an L-shaped form in section including the OA direction and the radial direction as a whole. The engagement projection portions 47 are provided with a predetermined interval in the circumferential direction (rotating direction about the photographic optical axis OA) of the second lens holding frame 22. In this embodiment, the engagement projection portions 47 are positioned symmetrically with respect to the photographic optical axis OA (see FIGS. 37 and 41). An end 55a of the fourth biasing member 55 is hooked with each engagement projection portion 47 (see FIG. 38). In this embodiment, the holding cylinder 23 may have an axis-direction biasing device (for example, the fourth biasing member 55) configured to bias the lens holding frame 22 in one of forward and backward directions of the optical axis direction. The axis-direction biasing device may be a coil spring.

The fourth biasing member 55 is provided to pull or hook in the second lens holding frame 22 and the flange portion 23a to each other to bias the second lens holding frame 22 toward the flange portion 23a of the linearly-moving cylinder 23 and, in this embodiment, is a tension coil spring which is a coil spring (see FIGS. 38 and 39). The fourth biasing member 55 is only necessary to have the above-described function and may be a compression spring, a plate spring, a torsion coil spring, or the like other than the tension coil spring, and therefore is not limited to this embodiment.

Figure 37:
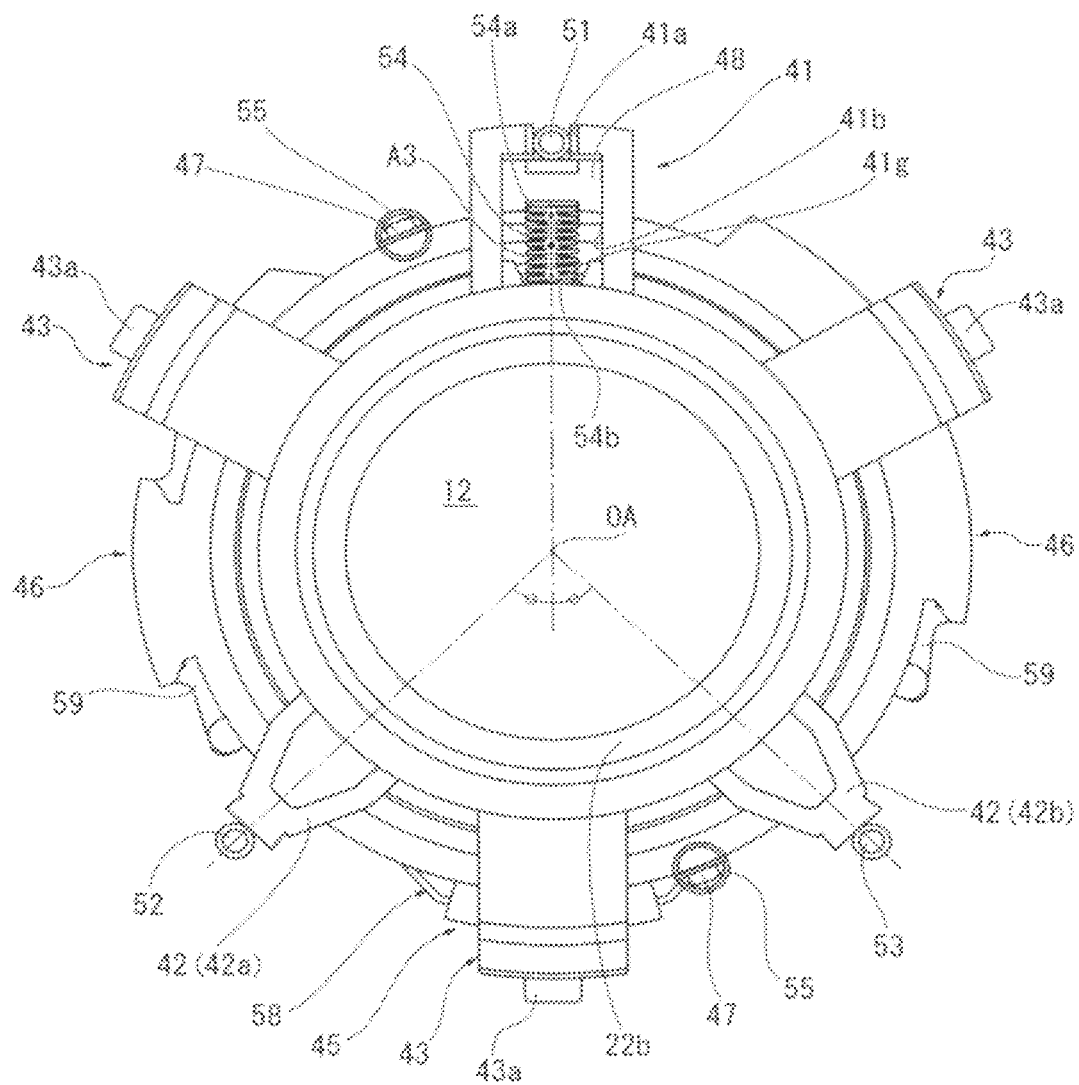
FIG. 37 is an explanatory view showing the configuration when the second lens holding frame is contained in a space at a back side (an image side) of a flange portion of the linearly moving cylinder and the linearly-moving cylinder is omitted on a plane viewed from the object side.

The second lens holding frame 22, as shown in FIG. 37, holds the first guide shaft 51 by the bearing concave part 41a of the biasing mechanism holding portion 41 on which the spring receiving member 48 and the third biasing member 54 are provided and is contained in the back-side (image side) space (see FIG. 2) of the flange portion 23a of the linearly-moving cylinder 23 into which the first rotary cam cylinder 56 is fitted so as to allow the one of the contact projection portions 42a to come into contact with the second guide shaft 52 and the other one of the contact projection portions 42b to come into contact with the third guide shaft 53. At that time, on the biasing mechanism holding portion 41, the third biasing member 54 held in the holding through hole 41b biases the first guide shaft 51 and the inner end surface 41f of the holding through hole 41b, that is, the second lens holding frame 22 so as to be separated from each other (see arrow A3) via the spring receiving member 48. Therefore, the second lens holding frame 22 is pressed onto the second guide shaft 52 and the third guide shaft 53 via both of the contact projection portions 42 by the biasing force of the third biasing member 54 according to the first guide shaft 51 fixed on the flange portion 23a as a reference. The spring receiving member 48 is pressed onto the first guide shaft 51 via the pressing end portion 48e by the biasing force (see arrow A3) of the third biasing member 54 according to the second guide shaft 52 and the third guide shaft 53 (that is, the second lens holding frame 22 pressed thereon), which are fixed on the flange portion 23a as references. Therefore, in this embodiment, the first guide shaft 51 functions as a reference guide shaft and the spring receiving member 48 and the third biasing member 54 function as a biasing mechanism held by the second lens holding frame 22 to press or bias the second lens holding frame 22 in a direction to be separated from the reference guide shaft (51) and toward the other two guide shafts (52, 53) along the plane orthogonal to the photographic optical axis OA. Thereby, in the three guide shafts (51, 52, 53) surrounding the photographic optical axis OA, that is, the second lens holding frame 22, the second lens holding frame 22 including the biasing mechanism is pressed along the plane orthogonal to the photographic optical axis OA in a direction from the inner side to the outer side. Therefore, the second lens holding frame 22 is substantially pressed in three directions, that is, toward the first guide shaft 51, the second guide shaft 52, and the third guide shaft 53 to be positioned in the direction along the plane orthogonal to the photographic optical axis OA with respect to the linearly-moving cylinder 23. At that time, the bearing concave part 41a of the biasing mechanism holding portion 41 holds the first guide shaft 51 and therefore, the second lens holding frame 22 is prevented from rotating about the photographic optical axis OA relatively with respect to the linearly-moving cylinder 23. Therefore, the first guide shaft 51, the second guide shaft 52, the third guide shaft 53, the biasing mechanism holding portion 41, the third biasing member 54, the spring receiving member 48 and both of the contact projection portions 42 function as a positioning mechanism for positioning the second lens holding frame 22 in the direction along the plane orthogonal to the photographic optical axis with respect to the linearly-moving cylinder 23.

In addition, in the second lens holding frame 22, one end 55a (see FIG. 6) of each fourth biasing member 55 having the other 55b end fixed on the flange portion 23a of the linearly-moving cylinder 23 is hooked with each of the two engagement projection portions 47. Therefore, the second lens holding frame 22 is biased toward the flange portion 23a (the object side) in the linearly-moving cylinder 23 by the fourth biasing member 55 and each cam projection 43a is pressed onto the forward-backward cam surface 56b (see FIG. 30) of the first rotary cam cylinder 56, which defines the forward-backward cam groove. In the linearly-moving cylinder 23, the second rotary cam cylinder 57 is fitted and mounted in the first rotary cam cylinder 56 to form the forward-backward cam groove (see FIG. 30) by the forward-backward cam surface 56b and the auxiliary cam surface 57a so as to receive each cam projection 43a pressed on the forward-backward cam surface 56b. Therefore, the second lens holding frame 22 is linearly moved (see FIGS. 2A and 2B) in the OA direction with respect to the linearly-moving cylinder 23 according to a cam trajectory of the forward-backward cam surface 56b (forward-backward groove, see FIG. 30) if the first rotary cam cylinder 56 engaged with each cam projection 43a by the rotary drive of the rotary cylinder 24 with respect to the fixed cylinder 25 in accordance with the rotary orientation of the cylindrical body formed by the first rotary cam cylinder 56 and the second rotary cam cylinder 57 when the cylindrical body is rotationally driven in the linearly-moving cylinder 23. At that time, the second lens holding frame 22 is provided in the linearly-moving cylinder 23 such that the spring receiving member 48 (the pressing end portion 48e) is pressed onto the first guide shaft 51 which is received in the bearing concave part 41a and the contact projection portions 42 are pressed onto the second guide shaft 52 and the third guide shaft 53. Accordingly, the second lens holding frame 22 is capable of linearly moving in the OA direction while maintaining the positioned state without inhibiting linearly moving in the OA direction with respect to the linearly-moving cylinder 23. Furthermore, the second lens holding frame 22 is continuously biased toward object side by the fourth biasing member 55 when linearly moving in the OA direction to suppress rattling and to increase a positional accuracy of the first lens group 11 (the linearly-moving cylinder 23 fixing and holding the first lens group 11). Therefore, the first rotary cam cylinder 56 (the forward backward cam surface 56b), the second rotary cam cylinder 57 (the auxiliary cam surface 57a), and each cam projection 43a of the second lens holding frame 22 function as the rotary cam unit 26 for moving the second lens holding frame 22 (the second lens group 12) in forward and backward directions with respect to the linearly-moving cylinder 23 in the OA direction according to the rotary drive of the rotary cylinder 24 with respect to the fixed cylinder 25 (base member 28). Furthermore, the rotary cam unit 26 and the driving device 36 (see FIG. 1) for rotationally driving the rotary cylinder 24 function as a forward backward moving mechanism for applying a moving force so as to move the second lens holding frame 22 in forward and backward directions with respect to the linearly-moving cylinder 23 in the OA direction. Moreover, the second lens holding frame 22 functions as the lens holding frame and the linearly-moving cylinder 23 functions as the holding cylinder capable of linearly moving the second lens holding frame 22 in the OA direction. Therefore, the lens holding frame 21 functions as the secondary lens holding frame.

The lens barrel 10 is assembled as described below. The following described steps are shown as an example and therefore are not limited to this embodiment.

At first, the adjustment cam member 65 is mounted on each cam receiving portion 44 of the second lens holding frame 22 and the second lens group 12 including the spacing ring 66 and the adjustment lens holding frame 61 is inserted into the holding hole 22a. The radial biasing member 58 is mounted on the radial biasing member holding portion 45 of the second lens holding frame 22 and the axis biasing member 59 is mounted on each of the two axis biasing member holding portions 46 (see FIGS. 38 and 40).

The second lens holding frame 22 is contained in the backside (image side) space of the flange 23a of the linearly-moving cylinder 23 into which the first rotary cam cylinder 56 is fitted such that the first guide shaft 51 is inserted into the bearing concave part 41a of the biasing mechanism holding portion 41 and the one contact projection portion 42a comes into contact with the second guide shaft 52 and the other contact projection portion 42b comes into contact with the third guide shaft 53 (see FIGS. 37 and 41). The one end 55a of the fourth biasing member 55, the other end 55b of the fourth biasing member 55 being fixed on the flange portion 23a of the linearly-moving cylinder 23, is hooked with the engagement projection portion 47 of the second lens holding frame 22 (see FIGS. 38 to 40).

As described above, the first lens group 11 and the shutter/aperture unit 13 are assembled with the above-described parts in the front-side (object side) space of the flange portion 23a of the linearly-moving cylinder 23. In this state, the adjustment cam member 30 is rotated with respect to the linearly-moving cylinder 23 by using the not-illustrated rotary member (rotary device) and the position of the first lens group 11 in the OA direction is adjusted and determined. Then, while observing optical characteristics of the second lens group 12, both of the adjustment cam member 65 is appropriately rotated and an operation for adjusting the center of the second lens group 12 in the second lens holding frame 22 so as to set the optical characteristics to be in appropriate state to determine the position. The linearly-moving cylinder 23 is assembled with the solid-state image pickup device 14, the rotary cylinder 24, the fixed cylinder 25, the connection frame 27, the base member 28, the liner 29, the stepped frame portion 34 and the base 35 in the lens barrel 10.

In the lens barrel 10, the rotary cylinder 24 is rotationally driven with respect to the fixed cylinder 25 by transmitting the driving force from the driving device 36. The linearly-moving cylinder 23 is linearly moved in the OA direction with respect to the base member 28 (the fixed cylinder 25) so as to follow the cam trajectory of the cam groove 24c of the rotary cylinder 24 which is engaged with the cam follower in accordance with the rotary orientation of the rotary cylinder 24 rotationally driven with respect to the fixed cylinder 25 (see FIG. 2). At that time, the cylindrical body formed by the first rotary cam cylinder 56 and the second rotary cam cylinder 57 as the rotary cam unit 56 is rotationally driven with respect to the fixed cylinder 25 (base member 28) together with the rotary cylinder 24. Thereby, the second lens holding frame 22 is linearly moved in the OA direction with respect to the linearly-moving cylinder 23 so as to follow the cam trajectory of the forward backward cam surface 56b (the forward backward cam groove, see FIG. 30) of the first rotary cam cylinder 56 which is engaged with each cam projection 43a in accordance with the rotary orientation of the cylindrical body (see FIG. 2).

Figure 42:
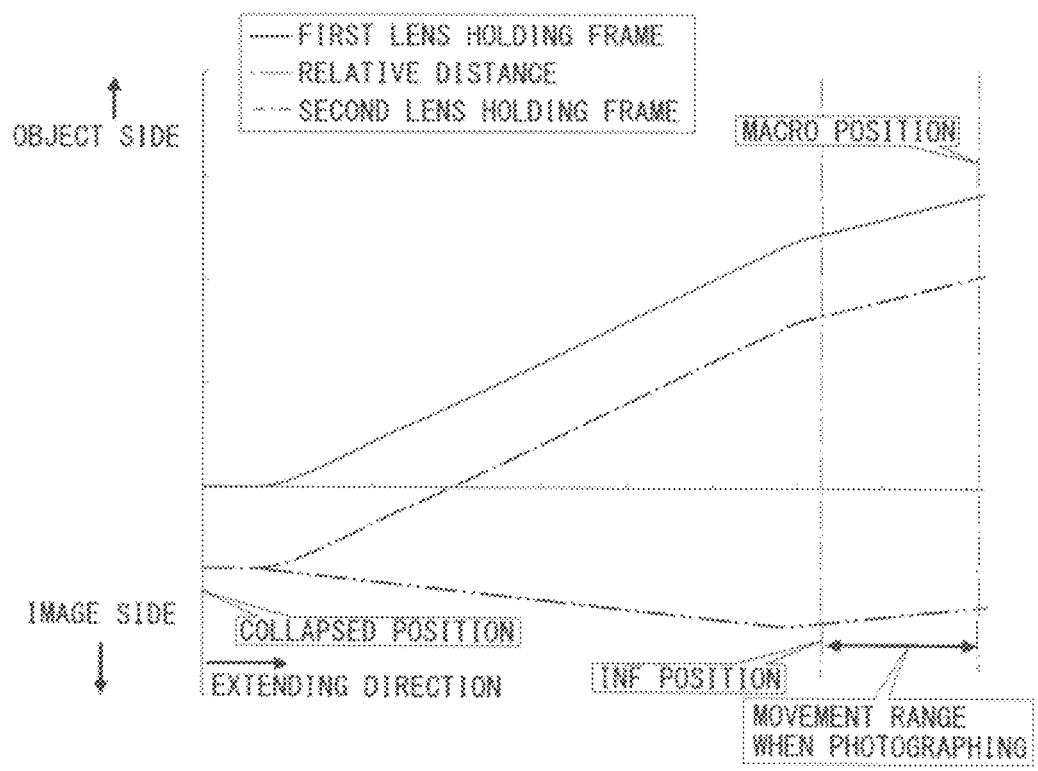
FIG. 42 is a graph showing operations of the first lens group and the second lens group between the collapsed state and the photographing state, where a vertical axis indicates positions of the first and second lens groups and relative distances therebetween as a forward direction is set to be a direction from the position of the first lens group in the collapsed state toward an object side in the photographic optical axis OA direction and a horizontal direction indicates transition of the states (the collapsed state and the photographing state) in the photographic optical system.

Therefore, in the lens barrel 10, in the operations between a collapsed state (see FIG. 2A) and a photographing state (see FIG. 2B), the first lens group 11 held by the first lens holding frame 21 and the second lens group 12 held by the second lens holding frame 22 are linearly moved on the photographic optical axis OA and intervals from the second lens group 12 to the first lens group 11 and the shutter/aperture unit 13 appropriately change. FIG. 42 shows a graph of the movement. The graph in FIG. 42 shows operations of the first lens group 11 and the second lens group 12 between the collapsed state and the photographing state. In FIG. 42, the vertical axis shows positions of the first lens group 11 and the second lens group 12 and relative distances therebetween with the object side as a positive direction in the photographic optical axis OA based on the position of the first lens group 11 in the collapsed state as a reference position and the horizontal axis shows a transition of states (for example, the collapsed state and the photographing state) in the photographic optical system. The relative distances are interval distances from the first lens group 11 to the second lens group 12. The lens barrel 10 is, in this embodiment, configured by combining the second lens holding frame 22 holding the second lens group 12, the first lens holding frame 21 holding the first lens group 11. As shown in FIG. 42, the lens barrel 10 forms a photographic optical system capable of changing the relative distance between the second lens group 12 and the first lens group 11 (so-called floating). Therefore, the linearly-moving cylinder 23, the rotary cylinder 24, the fixed cylinder 25, the connection frame 27, the base member 28 and the liner 29 function as a lens barrel movably holding the first lens holding frame 21 and the second lens holding frame 22 therein.

Figure 44:
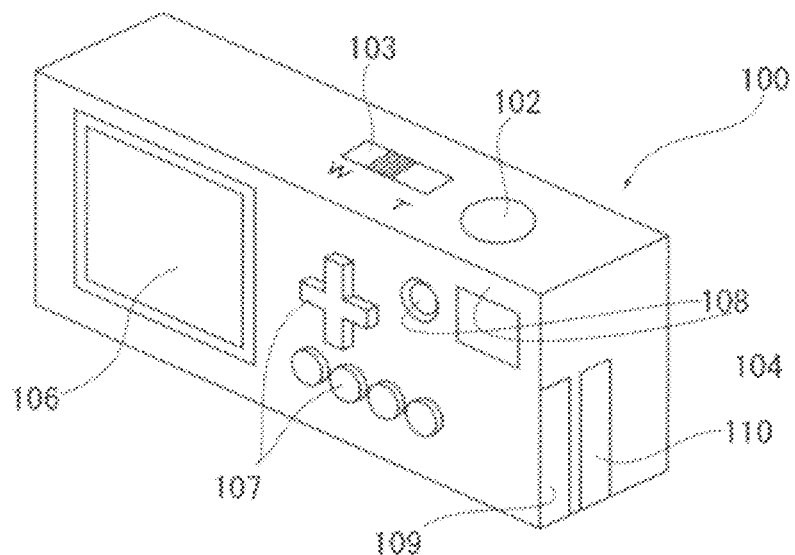
FIG. 44 is a perspective view schematically showing the appearance of the camera, as viewed from a back side which is a photographer side.
Figure 45:
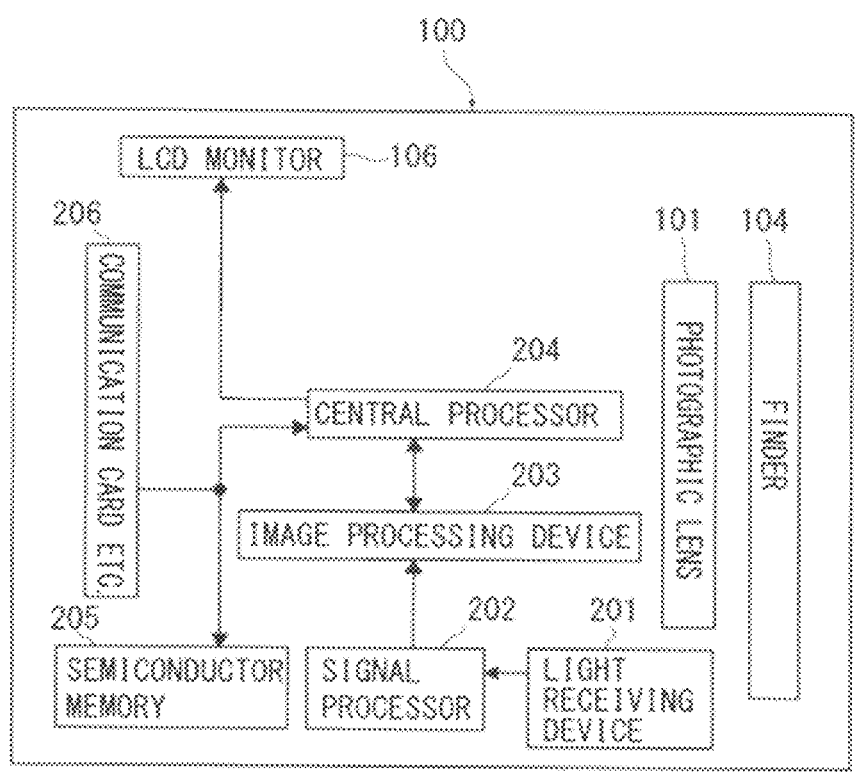
FIG. 45 is a block diagram showing a functional configuration of the camera.

Next, an example in which the optical device including the lens barrel 10 described in the above embodiment is used as a photographic optical system in a camera (an imaging apparatus) 100 will be explained with reference to FIGS. 43 to 45. FIG. 43 is a perspective view showing an appearance of the camera 100 viewed from a front side, that is, an object side. FIG. 44 is a perspective view showing an appearance of the camera 100 viewed from a back side, that is, a photographer side. FIG. 45 is a block diagram showing a functional configuration of the camera 100. Although the camera 100 is explained in this embodiment, it may be, for example, a so-called PDA (personal data assistant), or a mobile information terminal device such as a mobile phone, in which a camera function is installed.

Since such a mobile information terminal device has substantially the same function and configuration as the camera 100 although the appearance is slightly different, the lens barrel 10 according to an embodiment of the present invention may be used in such a mobile information terminal device. Similarly, the optical device including the lens barrel according to an embodiment of the present invention may be used in an image inputting device.

As shown in FIGS. 43 and 44, the camera 100 has a photographic lens 101, a shutter button 102, a zoom lever 103, a finder 104, a strobe 105, an LCD monitor 106, an operation button 107, a power switch 108, a memory card slot 109, and a communication card slot 110, and the like. As shown in FIG. 45, the camera 100 has also a light-receiving device 201, a signal processor 202, an image processor 203, a central processing unit (CPU) 204, a semiconductor memory 205, a communication card 206, and the like. Although it is not clearly illustrated, a battery as a driving power source feeds electricity to operate each part.

The camera 100 has the photographic lens 101, the light-receiving device 201 as an area sensor such as a CCD (charge-coupled device) imaging device and is configured so as to allow the light-receiving device 201 to read an object to be photographed, that is, a subject image which is formed by photographic lens 101 which is the photographing optical system. As the photographic lens 101, the optical system device including the lens barrel 10 according to the above described embodiment is used. More specifically, the optical system device is configured by using lenses which are optical element forming the lens barrel 10 (for example, the light-receiving device 201 is configured by using the solid-state image pickup device 14 (see FIG. 2)). The lens barrel 10 has a mechanism holding each lens and the like so as to move at least each lens group. The photographic lens 101 assembled in the camera 100 is, normally, assembled as the optical system device.

Output of the light-receiving device 201 is processed by the signal processor 202 controlled by the CPU 204 and is converted into digital image information. The image information obtained by the signal processor 202 is processed with a predetermined image processing in the image processor 203 controlled by the CPU 204 and then the obtained date is recording in the semiconductor memory 205 such as an nonvolatile memory, or the like. In this case, the semiconductor memory 205 is a memory card inserted into the memory card slot 109 or a built-in semiconductor memory in the camera body. On the LCD monitor 106, an image to be photographed can be displayed, and an image recorded in the semiconductor memory 205 can be displayed. The image recorded in the semiconductor memory 205 can be sent outside via the communication card 206 or the like which is inserted in the communication card slot 110.

Figure 43A:
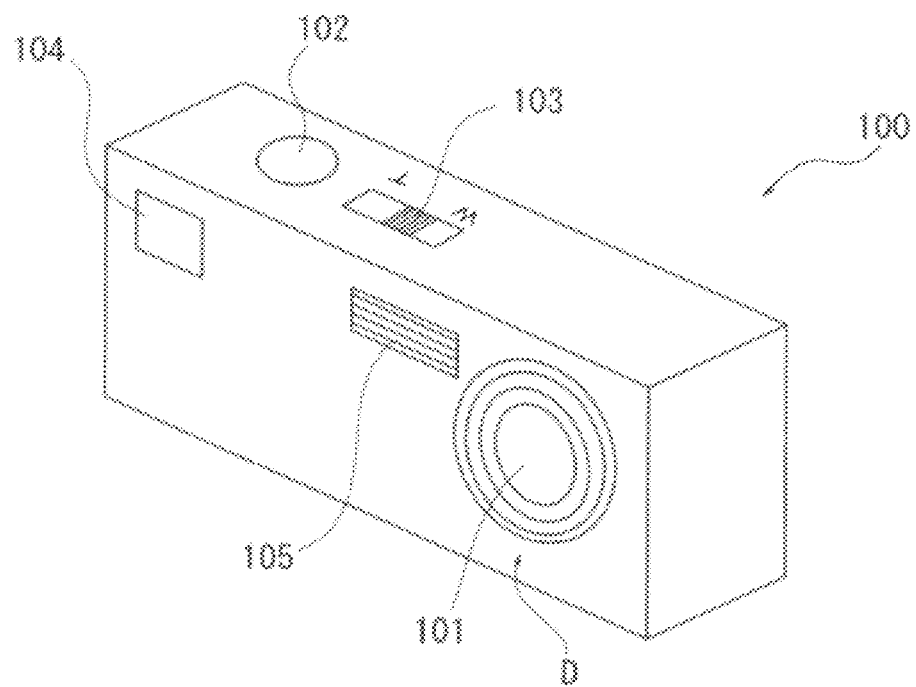
FIG. 43A is a perspective view schematically showing an appearance configuration of a camera in which a lens barrel 10 according to an embodiment of the present invention is used and a photographic lens is collapsed in a camera body, as viewed from the object side.
Figure 43B:
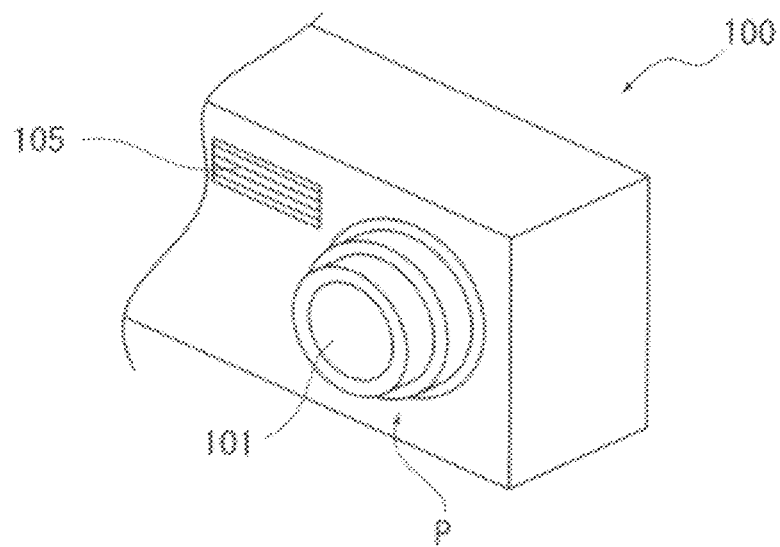
FIG. 43B is a perspective view schematically showing an appearance configuration of a camera in which a lens barrel 10 according to an embodiment of the present invention is used and the photographic lens extends out from the camera body, as viewed from the object side.

The photographic lens 101 is in a collapsed state (see FIG. 2A) as shown in FIG. 43A when the camera 100 is not used or is carried and is embedded in the body of the camera 100. When the user operate the power switch 108, the power is turned on and then the barrel extends as shown in FIG. 43B to be projected from the body of the camera 100 to be in the photographing state (see FIG. 2B). At that time, in a case where the first lens group 11 to the second lens group 12 form a zoom lens with variable focal length, in the lens barrel 10 of the photographic lens 101, the optical system of each group forming the zoom lens is disposed, for example, at a wide angle position. By operating the zoom lever 103, the position of the optical system of each group changes to a telephoto position to change the focal length. The optical system of the finder 104 is preferably configured so as to change the focal length in synchronization with the change of field angle of the photographic lens 101.

Focusing is performed by half-pressing operation of the shutter button 102. Photographing is performed when the shutter button is further pressed to be in a full pressed state and then the above described processing is performed.

The operation button 107 is operated as predetermined to display an image stored in the semiconductor memory 205 on the LCD monitor 106 or to send it outside via the communication card 206. The semiconductor memory 205 and the communication card 206 are used by inserting into an exclusive or a universal slot such as the memory card slot 109 or the communication card slot 110.

In the lens barrel 10 according to this embodiment, the second lens holding frame 22 is pressed onto the first guide shaft 51, the second guide shaft 52 and the third guide shaft 53, which are fixed to the linearly-moving cylinder 23 (the flange portion 23a) and extend in the OA direction, which is forward and backward directions of the second lens holding frame 22 with respect to the linearly-moving cylinder 23 as the holding cylinder. Thereby, the second lens holding frame 22 is positioned in the direction along the plane orthogonal to the photographic optical axis OA with respect to the linearly-moving cylinder 23. Therefore, the position of the second lens holding frame 22, that is, second lens group 12 with respect to the linearly-moving cylinder 23 regardless of the forward-backward direction can be appropriately positioned (in this embodiment, the lens optical axis is matched with the photographic optical axis OA).

In the lens barrel 10, the second lens holding frame 22 is substantially pressed in the three directions toward the first guide shaft 51, the second guide shaft 52, and the third guide shaft 53 by the biasing force of the third biasing member 54 provided on the second lens holding frame 22 to be positioned in a direction along the plane orthogonal to the photographic optical axis OA with respect to the linearly-moving cylinder 23. Thereby, even if the second lens holding frame 22 is moved in the OA direction in the linearly-moving cylinder 23, the spring receiving member 48 of the second lens holding frame 22 (including the biasing mechanism) and both of the contact projection portions 42 are continuously positioned in positions capable of coming into contact with the three guide shafts 51, 52 and 53. Therefore, the contact parts on the second lens holding frame 22 with respect to the three guide shafts 51, 52 and 53 as supporting points can be constant regardless of the forward-backward position, that is, in a supporting state viewed from the second lens holding frame 22. Thereby, the second lens holding frame 22, that is the second lens group 12 can be in an appropriate position on the photographic optical axis OA regardless of the forward-backward position.

In the lens barrel 10, the second lens holding frame 22 can be pressed onto the three guide shafts 51, 52 and 53 as the supporting points along the plane orthogonal to the photographic optical axis OA in the direction from the inner side to the outer side so that the second lens holding frame 22 (including the biasing mechanism) is stably positioned with respect to the linearly-moving cylinder 23. In the conventional configuration where the lens holding frame comes into contact with two projected line portions in the fixed cylinder by a plate spring provided on the fixed frame holding the lens holding frame pressing the lens holding frame, when viewed from the lens holding frame, the lens holding frame is pressed from the outside to the inside at one supporting point and is pressed from the inside to the outside at the other two supporting points.

In the lens barrel 10, the third biasing member 54 (biasing mechanism) to press the second lens holding frame 22 toward the three guide shafts 51, 52, and 53 is provided on the second lens holding frame 22. Therefore, regardless of the forward backward position of the second lens holding frame 22, the biasing part with respect to the second lens holding frame 22 can be constant so that the biasing force acting the second holding frame 22 and an acting state are kept constant. Therefore, regardless of the forward-backward position, the second lens holding frame 22, that is, the second lens group 12 can be in an appropriate position on the photographic optical axis OA.

In the lens barrel 10, the second lens holding frame 22 is pressed onto the three guide shafts 51, 52 and 53 as the supporting points along the plane orthogonal to the photographic optical axis OA in the direction from the inside to the outside. Thereby, the second lens holding frame 22 (including the biasing mechanism) are stably positioned with respect to the linearly-moving cylinder 23 so that the second lens holding frame 22 is stably moved forward and backward.

In the lens barrel 10, the spring receiving member 48 and both contact projection portions 42, which are the contact positions with respect to the three guide shafts 51, 52, and 53, are positioned on the same plane orthogonal to the photographic optical axis OA regardless of the forward-backward position. Therefore, the second lens holding frame 22 (including the biasing mechanism) can be stably positioned with respect to the linearly-moving cylinder 23.

In the lens barrel 10, the forward-backward moving mechanism applies the moving force in the OA direction to the second lens holding frame 22 positioned by the three guide shafts 51, 52, and 53. Accordingly, the second lens holding frame 22 can be stably moved forward and backward while maintaining the positioned state by each guide shafts.

In the lens barrel 10, the biasing force of the single third biasing member 54 is applied in the direction where the second lens holding frame 22 is separated from the first guide shaft 51 and in the direction where the second lens holding frame 22 is pressed towards the second guide shaft 51 and the third guide shaft 53. Therefore, regardless of the forward and backward position of the second lens holding frame 22, the second lens holding frame 22 can be pressed in the direction from the inner side to the outer side along the plane orthogonal to the photographic optical axis OA with the simple configuration.

In the lens barrel 10, the third biasing member 54 to press the second lens holding frame 22 onto the three guide shafts 51, 52, and 53 is provided on the second lens holding frame 22. Therefore, a setting freedom degree of forward-backward movement amount of the second lens holding frame 22 can be improved. In the conventional configuration where the plate spring is provided on the fixed frame holding the lens holding frame capable of moving forward and backward, only one part of the lens holding frame in the forward and backward directions is necessary to be continuously in the position pressed by the plate spring.

In the lens barrel 10, the biasing direction of the third biasing member 54 is set in the direction from the first guide shaft 51 to the photographic optical axis OA. Therefore, the second lens holding frame can be stably pressed onto the second guide shaft 52 and the third guide shaft 53 so that the second lens holding frame is stably positioned.

In the lens barrel 10, the biasing direction of the third biasing member 54 is set to be in the direction from the first guide shaft 51 to the photographic optical axis OA and the second guide shaft 52 and the third guide shaft 53 are positioned symmetrically with respect to a line in the direction from the first guide shaft 51 to the photographic optical axis OA, that is, are positioned so as to have an even interval with the first guide shaft 51 as the reference guide shaft in the radial directions opposite to each other about the photographic optical axis OA. Therefore, the biasing force from the third biasing member 54 can be substantially evenly distributed into the second guide shaft 52 and the third guide shaft 53 so that the second lens holding frame is stably positioned.

In the lens barrel 10, the biasing direction of the third biasing member 54 is controlled by the biasing mechanism holding portion 41 so that the second lens holding frame 22 can be stably pressed on the second guide shaft 52 and the third guide shaft 53 to be stably positioned.

In the lens barrel 10, in the biasing mechanism holding portion 41, the moving direction of the spring receiving member 48 is controlled and the third biasing member 54 biases the spring receiving member 48 along the moving direction. Therefore, it is possible to form the biasing mechanism held by the second lens holding frame 22 so as to press or bias the second lens holding frame 22 in the direction to be separated from the first guide shaft 51 as the reference guide shaft and toward the second guide shaft 52 and the third guide shaft 53, which are other two guide shafts.

In the lens barrel 10, the three guide shafts 51, 52, 53 have cylindrical shapes and the contact parts (the pressing end portions 48e of the spring receiving member 48 and the extending end surfaces of both of the contact projection portions 42) are formed in flat surfaces. Therefore, the contact parts can be in lines so that friction resistance is reduced and three point support with a good balance is achieved.

In the lens barrel 10, the second lens holding frame 22 is continuously biased toward the object side by the fourth biasing member 55. Therefore, rattling when moving forward and backward in the directions of the photographic optical axis OA can be prevented and the positional accuracy with respect to the first lens group 11 (the linearly-moving cylinder 23 fixing and holding the first lens group 11) can be increased.

In the lens barrel 10, the fourth biasing member 55 continuously biasing the second lens holding frame 22 toward the object side with respect to the flange portion 23a of the linearly-moving cylinder 23 is configured by the tension coil spring (coil spring). Therefore, the second lens holding frame 22 is prevented from interrupting the forward and backward movement in the OA direction in the linearly-moving cylinder 23 and rattling can be prevented. In a case where a large movement amount of the second lens holding frame 22 is set, for the fourth biasing member 55, a large distance capable of biasing and a low value of constant of spring are required. This is because the tension coil spring can easily have both requirements.

In the lens barrel 10, the fourth lens biasing member 55 continuously biasing the second lens holding frame 22 toward the object side with respect to the flange portion 23a of the linearly-moving cylinder 23 is configured by the tension coil spring. Therefore, the position accuracy of the second lens group 12 can be increased and rattling can be prevented. This is because, for example, in a case where the plate spring is used as the fourth biasing member and screwed to be fixed, it is possible that change of a fixing pressure onto the fixing part affects the biasing force onto the fourth biasing member 55. In a case of the tension coil spring, the affection can substantially be prevented. Therefore, the optical member (lens) which requires high positional accuracy can be used.

In the lens barrel 10, the second lens holding frame 22 is pressed onto the first guide shaft 51, the second guide shaft 52, and the third guide shaft 53, which are fixed on the linearly-moving cylinder 23 (the flange portion 23a) and thereby the second lens holding frame is positioned in the direction along the plane orthogonal to the photographic optical axis OA with respect to the linearly-moving cylinder 23. Therefore, the member relating to the positioning can be clarified so that dimension management in each component from a viewpoint of positioning accuracy can be simplified.

In the lens barrel 10, in the linearly-moving cylinder 23, the second lens holding frame 22 is biased toward the object side and the first lens holding frame 21 is biased toward the image side. Therefore, the interval between the first lens group 11 and the second lens group 12 is appropriately set so that the optical performance as a whole is improved.

In the lens barrel 10, each second biasing member 33 biasing the first lens holding frame 21 toward the image side is configured by a plate spring. Increase of the length (thickness) in the OA direction can be prevented. This is because the first lens group 11 held by the first lens holding frame 21 is positioned at the most object side among the lens groups in the photographic optical system and the other members positioned at the object side of the first lens group 11 cause the increase of the thickness of the lens barrel 10.

In the lens barrel 10, each second biasing member 33 biasing the first lens holding frame 21 toward the image side is capable of being assembled from the object side so that increase of the thickness is prevented and a good assembling is ensured. The first lens holding frame 21 having the large diameter at the object side is contained in the front side (object side) space of the flange portion 23a of the linearly-moving cylinder 23 and the shutter/aperture unit 13 is contained at the back side (image side) space. Therefore, it is difficult to ensure a space in which a member for biasing the first lens holding frame 21 toward image side at the back side of the first lens holding frame 21 and it is also difficult to install the biasing member at the back side of the first lens holding frame 21.

In the lens barrel 10, in the first biasing member 32, the attachment plate portion 32b is bent or turned so as to be orthogonal to the pressing arm portion 32a and is continued. Therefore, increase of thickness due to fixing the attachment plate portion 32b can be suppressed and the first lens holding frame 21 can be biased in the direction (radial direction) orthogonal to the photographic optical axis OA.

In the lens barrel 10, the position of the first lens holding frame 21 is capable of being adjusted in the OA direction while maintaining the positioned state in the direction orthogonal to the photographic optical axis OA with respect to the linearly-moving cylinder 23 by each second biasing member 33, the spring receiving member 31 on which each second biasing member 33 is fixed, and the adjustment cam member 30. Therefore, the first lens group 11 can be in an appropriate position.

In the lens barrel 10, the linearly-moving cylinder 23 which appropriately positions the second lens holding frame 22 (including the biasing mechanism) and holds the second lens holding frame 22 movably forward and backward can hold the first lens holding frame 21. Therefore, the second lens holding frame 22 capable of stably moving forward and backward while maintaining the appropriately positioned state can be assembled as the photographic optical system so that high imaging performance is achieved.

Accordingly, in the lens barrel 10 of an embodiment of the present invention, the position of the second lens group 12 with respect to the photographic optical axis OA viewed in the direction orthogonal to the photographic optical axis OA can be in a predetermined position regardless of the forward-backward position.

In the lens barrel according to an embodiment of the present invention, the lens holding frame is pressed onto the three guide shafts fixedly provided on the holding cylinder and extending in the lens optical axis direction which is the forward and backward direction of the lens holding frame with respect to the holding cylinder. Thereby, the lens holding frame can be positioned in the direction along the plane orthogonal to the lens optical axis with respect to the holding cylinder and the lens holding frame, that is, the lens group held thereby with respect to the holding cylinder can be appropriately positioned regardless of the forward and backward position.

In the lens barrel, the lens holding frame is pressed substantially in the directions of the three guide shafts by the biasing force of the biasing mechanism provided on the lens holding frame to be positioned in the direction along the plane orthogonal to the lens optical axis with respect to the holding cylinder. Therefore, even though the lens holding frame is moved in the lens optical axis direction in the holding cylinder, the predetermined part of the lens holding frame including the biasing mechanism can be continuously at the contact positions to the three guide shafts. Therefore, the supporting state viewed from the lens holding frame can be maintained constant regardless of the forward backward position.

Furthermore, in the lens barrel, the lens holding frame can be pressed in the direction along the plane orthogonal to the lens optical axis in the direction from the inner side to the outer side with respect to the three guide shafts as the supporting points. Therefore, the lens holding frame including the biasing mechanism can be stably positioned with respect to the holding cylinder and the lens holding frame can be stably moved in the forward and backward direction.

In the lens barrel, the biasing mechanism to press the lens holding frame onto the three guide shafts is provided on the lens holding frame, so that the biasing parts with respect to the lens holding frame can be maintained constant regardless of the forward and backward positions of the lens holding frame. Therefore, the biasing force affecting the lens holding frame and the affecting state can be maintained constant regardless of the forward backward position. Therefore, the lens holding frame (the lens group held thereby) can be appropriately positioned on the lens optical axis regardless of the forward and backward positions.

In the lens barrel, the biasing force of the biasing mechanism is applied in the direction allowing the lens holding frame to be separated from the reference guide shaft and pressing the lens holding frame toward the other two guide shafts. Accordingly, with the simple configuration, regardless of the forward and backward positions of the lens holding frame, the lens holding frame (lens optical axis) can be pressed in the direction from the inner side to the outer side along the plane orthogonal to the lens optical axis.

In addition to the above configurations, each guide shaft may be fixed to the holding cylinder. In this case, each guide shaft can be provided so as to be references to position the lens holding frame with respect to the holding cylinder with the simple configuration.

In addition to the above configurations, the forward and backward mechanism may apply the moving force in the lens optical axis direction to the lens holding frame guided by each guide shaft. Thereby, the state in which the lens holding frame is positioned by each guide shaft can be maintained and the lens holding frame is stably moved in forward and backward directions.

In addition to the above configurations, the biasing member may be held by the biasing mechanism holding member provided on the lens holding frame so as to set the biasing direction to be the radial direction from the lens optical axis. Thereby, the lens holding frame can be stably pressed onto the other two guide shafts so that the lens holding frame is stably positioned.

In addition to the above configurations, the biasing mechanism may have the spring receiving member capable of coming into contact with the reference guide shaft and the biasing member pressing the reference guide shaft via the spring receiving member and the biasing member holding member may hold the spring receiving member movably along the biasing direction of the biasing mechanism. In this case, with the simple configurations, the biasing mechanism which is held by the lens holding frame so as to press or bias the lens holding frame in the direction to be separated from the reference guide shaft and toward the other two guide shafts.

In addition to the above configurations, in the holding cylinder, the axis direction biasing device biasing the lens holding frame toward one of the lens optical axis directions may be provided. In this case, the lens holding frame can be prevented from rattling when linearly moving in the lens optical axis direction.

In addition to the above configurations, the axis direction biasing device may be a coil spring. In this case, the lens holding frame can be prevented from inhibiting the forward and backward movement in the lens optical axis direction and from rattling. Furthermore, the position accuracy of the lens holding frame can be improved.

In addition to the above configurations, the lens barrel according to an embodiment of the present invention may further include a secondary lens group 11 having at least one lens, and a secondary lens holding frame 21 configured to hold the secondary lens group 11, wherein the holding cylinder 23 is configured to hold the lens holding frame 22 and the secondary lens holding frame 21. In this case, the first lens holding frame capable of stably moving in forward and backward directions while maintaining the appropriately positioned state can be assembled as the photographic optical system so that high photographic performance can be obtained.

In addition to the above configurations, the axis-direction biasing device(55) may be configured to bias the lens holding frame (22) toward the secondary lens holding frame (21), and a secondary axis-direction biasing device (33) may be provided on the holding cylinder (23), the secondary axis-direction biasing device (33) being configured to bias the secondary lens holding frame (21) toward the lens holding frame (22) in the optical axis direction. In this case, the interval between the second lens group and the first lens group can be appropriately set so that the optical performance is improved at a whole.

In addition to the above configuration, the secondary lens group (11) may be positioned at an object side viewed in the optical axis direction, and the secondary axis-direction biasing device (33) may be a plate spring. In this case, the thickness can be prevented from increasing.

In addition to the above configurations, an adjustment cam member (30) may be provided on the holding cylinder (23), the adjustment cam member (30) having an adjustment cam surface (30c) configured to receive the second lens holding frame (22) at a position facing the secondary axis-direction biasing device (33) in the biasing direction of the secondary axis-direction biasing device (33). In this case, the second lens holding frame can be positionally adjusted in the lens optical axis direction while maintaining the state where the second lens holding frame is positioned in the direction orthogonal to the lens optical axis with respect to the holding cylinder.

In the above embodiment, the lens barrel 10 as an example of the lens barrel according to the present invention is explained. However, it is not limited thereto and it is only necessary that the lens barrel includes a lens group having at least two lenses, a lens holding frame configured to hold the lens group, a holding cylinder configured to hold the lens holding frame movably in an optical axis direction of the lens group, a forward-backward moving mechanism configured to move the lens holding frame forward and backward with respect to the holding cylinder, first to third guide shafts fixedly provided in the holding cylinder so as to surround the lens holding frame and each extend in the optical axis direction, and a biasing mechanism configured to be held by the lens holding frame between the first guide shaft and the lens holding frame and bias the lens holding frame in a direction so as to separate the lens holding frame from the first guide shaft toward the second and third guide shafts on a plane orthogonal to the optical axis direction.

In the above embodiment, the biasing mechanism is configured by the spring receiving member 48. The moving direction of the third biasing member 54 and the spring receiving member 48 is controlled and the spring receiving member 48 is biased along the moving direction by the third biasing member 54. However, it is not limited thereto and it is only necessary that the biasing mechanism (48, 54) is held by the lens holding frame 22 between the first guide shaft 51 and the lens holding frame 22 and is configured to bias the lens holding frame 22 in a direction so as to separate the lens holding frame 22 from the first guide shaft toward the second and third guide shafts on a plane orthogonal to the optical axis direction.

Furthermore, in the above embodiment, the second lens holding frame 22 (the second lens group 12) as the lens holding frame is biased by the biasing mechanism in the direction so as to allow the second lens holding frame 22 to be separated from the reference guide shaft of the three guide shafts toward the other two guide shafts along the plane orthogonal to the lens optical axis (the photographic optical axis OA). However, it is only necessary that the lens holding frame is movable in forward and backward directions with respect to the holding cylinder (the linearly moving cylinder 23 in the above embodiment) and the lens holding frame may be the other lens holding frame, for example, the first lens holding frame 21 and therefore it is not limited thereto.

In the above embodiment, the second lens holding frame 22 (the second lens group 12) is biased by the fourth biasing member 55 toward the object side (the side of the flange portion 23a) in the lens optical axis (the photographic optical axis OA) direction. However, it is only necessary that the second lens holding frame 22 (the second lens group 12) is prevented from rattling when linearly moving in forward and backward directions and it is not limited thereto. That is, the second lens holding frame 22 may be biased toward the image side.

In the above embodiment, the three guide shafts 51, 52 and 53 are fixed to the flange portion 23a of the linearly-moving cylinder 23. However, it is only necessary that the three guide shafts may be fixedly provided with respect to the holding cylinder (the linearly-moving cylinder 23 in the above embodiment) holding movably in forward and backward directions the lens holding frame (the second lens holding frame 22 in the above embodiment) and it is not limited thereto, that is, may not be directly fixed to the holding cylinder.

In the above embodiment, the lens optical axis of the second lens group 12 of the second lens holding frame 22 are matched with the photographic optical axis OA of the photographic optical system (lens barrel 10). However, it is only necessary that the position of the lens holding frame (the second lens holding frame 22 in the above embodiment), that is, the lens optical axis with the photographic optical axis OA, viewed in the direction orthogonal to the photographic optical axis is positioned at the predetermined position and therefore it is not limited to this embodiment.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens barrel comprising:
    a lens group having at least two lenses;
    a lens holding frame configured to hold the lens group;
    a holding cylinder configured to hold the lens holding frame movably in an optical axis direction of the lens group;
    a forward-backward moving mechanism configured to move the lens holding frame in forward and backward directions with respect to the holding cylinder;
    first to third guide shafts fixedly provided in the holding cylinder so as to surround the lens holding frame and each extend in the optical axis direction; and
    a biasing mechanism held by the lens holding frame between the first guide shaft and the lens holding frame and configured to bias the lens holding frame in a direction so as to separate the lens holding frame from the first guide shaft toward the second and third guide shafts on a plane orthogonal to the optical axis direction,
    wherein the second and third guide shafts are each free of a biasing mechanism between the respective guide shaft and the lens holding frame.

2. The lens barrel according to claim 1, wherein each guide shaft is fixed to the holding cylinder.

3. The lens barrel according to claim 1, wherein each guide shaft is configured to guide the lens holding frame; and
    the forward-backward moving mechanism is configured to apply a moving force in the optical axis direction to the lens holding frame guided by each guide shaft.

4. The lens barrel according to claim 1, further comprising:
    a biasing mechanism holding portion provided on the lens holding frame, wherein
    the biasing mechanism is held by the biasing mechanism holding portion so as to bias the lens holding frame in a radial direction from the optical axis of the lens group.

5. The lens barrel according to claim 4, wherein the biasing mechanism has a spring receiving member capable of coming into contact with the first guide shaft and a biasing member configured to press the first guide shaft via the spring receiving member; and the biasing mechanism holding portion is configured to hold the spring receiving member movably along the biasing direction of the biasing mechanism.

6. The lens barrel according to claim 1, wherein the holding cylinder has an axis-direction biasing device configured to bias the lens holding frame in one of forward and backward directions of the optical axis direction.

7. The lens barrel according to claim 6, wherein the axis-direction biasing device is a coil spring.

8. The lens barrel according to claim 1, further comprising:
a secondary lens group having at least one lens, and
a secondary lens holding frame configured to hold the secondary lens group,
wherein the holding cylinder is configured to hold the lens holding frame and the secondary lens holding frame.

9. The lens barrel according to claim 6, wherein
the axis-direction biasing device is configured to bias the lens holding frame toward the secondary lens holding frame; and
a secondary axis-direction biasing device is provided on the holding cylinder, the secondary axis-direction biasing device being configured to bias a secondary lens holding frame toward the lens holding frame in the optical axis direction.

10. The lens barrel according to claim 9, wherein the secondary lens group is positioned at an object side viewed in the optical axis direction; and
the secondary axis-direction biasing device is a plate spring.

11. The lens barrel according to claim 9, wherein an adjustment cam member is provided on the holding cylinder, the adjustment cam member having an adjustment cam surface configured to receive the second lens holding frame at a position facing the secondary axis-direction biasing device in the biasing direction of the secondary axis-direction biasing device.

12. An imaging apparatus, comprising the lens barrel according to claim 1.

13. A digital camera, comprising the lens barrel according to claim 1.

14. A mobile information terminal device, comprising the lens barrel according to claim 1.

15. An image inputting apparatus, comprising the lens barrel according to claim 1.

* * * * *